US012159751B2

(12) United States Patent
Marcouille et al.

(10) Patent No.: US 12,159,751 B2
(45) Date of Patent: Dec. 3, 2024

(54) TWO-PERIOD INVERTER, ASSOCIATED METHOD, DEVICE AND INSTALLATION

(71) Applicant: SYNCHROTRON SOLEIL, Saint-Aubin (FR)

(72) Inventors: Olivier Marcouille, Fresnes (FR); Arnaud Mary, Cachan (FR); Marie-Emmanuelle Couprie, Paris (FR); Keihan Tavakoli, Gif-sur-Yvette (FR)

(73) Assignee: SYNCHROTRON SOLEIL, Saint-Aubin (FR)

( * ) Notice: Subject to any disclaimer, the term of this patent is extended or adjusted under 35 U.S.C. 154(b) by 0 days.

(21) Appl. No.: 18/248,329

(22) PCT Filed: Jul. 6, 2022

(86) PCT No.: PCT/EP2022/068698

§ 371 (c)(1),
(2) Date: May 9, 2024

(87) PCT Pub. No.: WO2023/001555

PCT Pub. Date: Jun. 26, 2023

(65) Prior Publication Data

US 2024/0282494 A1 Aug. 22, 2024

(30) Foreign Application Priority Data

Jul. 20, 2021 (FR) ....................................... 2107827

(51) Int. Cl.
*H01F 7/02* (2006.01)
*H05H 13/04* (2006.01)

(52) U.S. Cl.
CPC ........... *H01F 7/021* (2013.01); *H01F 7/0221* (2013.01); *H05H 13/04* (2013.01); *H05H 2242/22* (2021.05)

(58) Field of Classification Search
CPC .... H05H 13/04; H05H 2242/22; H01F 7/021; H01F 7/0221
See application file for complete search history.

(56) References Cited

U.S. PATENT DOCUMENTS

| | | | | |
|---|---|---|---|---|
| 4,994,778 | A | 2/1991 | Leupold | |
| 5,014,028 | A * | 5/1991 | Leupold | H01F 7/0278 315/3.5 |
| 2019/0075646 | A1 | 3/2019 | Kuo et al. | |

FOREIGN PATENT DOCUMENTS

| | | | | |
|---|---|---|---|---|
| JP | H06140195 | A * | 5/1994 | |
| WO | WO-2009077407 | A1 * | 6/2009 | H01J 23/005 |
| WO | WO-2015155853 | A1 * | 10/2015 | H05H 13/04 |

OTHER PUBLICATIONS

English Translation of Written Opinion received for PCT/EP2022/068698, mailed Oct. 18, 2022.

(Continued)

*Primary Examiner* — Mohamad A Musleh
(74) *Attorney, Agent, or Firm* — Greer, Burns & Crain, Ltd

(57) ABSTRACT

A two-period inverter, including a series of permanent magnets with a spatial periodicity of $\lambda_0$ or $(2n+1)\lambda_0$ or $2n\lambda_0$ along a longitudinal axis Y and first moving apparatus arranged to modify along the axis Y, with respect to a reference position along the axis Y, the relative position of the first and second series, which move as one, with respect to the position of the third and fourth series, which move as one, by a distance $(2n+1)\lambda_0/2$ or $(2n-1)\lambda_0/2$, so that the inverter is placed in an offset position along the axis Y is discussed.

22 Claims, 56 Drawing Sheets

(56) References Cited

OTHER PUBLICATIONS

International Search Report and Written Opinion received for PCT/EP2022/068698, mailed Oct. 18, 2022.
French Search Report received for Application No. 2107827, dated Apr. 5, 2022.
Sasaki, S., et al., "Design of a new type of planar undulator for generating variably polarized radiation," Nuclear Instruments and Methods in Physics Research A, vol. 331, Nos. 1/3, Jul. 1993, pp. 763-767.
Shenoy, G., et al., "Variable-period undulators as synchrotron radiation sources," Addenda and Errata, J. Appl. Cryst. 12, 2005, 542 (Erratum) and J. Synchrotron Rad. 10, 2003, pp. 205-213 (Original Publication).
Vagin, P., "Variable period helical undulator with tunable polarization," ID2017 Undulator workshop, Berkeley Lab, May 4-5, 2017, 23 pages.
Vagin, P., et al., "Variable period undulator with tunable polarization," Proceedings of the 13th International Conference on Synchrotron Radiation Instrumentation, AIP Conference Proceedings 2054, 2019, pp. 030024-1 to 030024-7.
Vinokurov, N., et al., "Variable-period permanent magnet undulators," Physical Review Special Topics, Accelerators and Beams 14, No. 4, 2011, 040701-1 to 040701-7.
Yang, Y., et al., "A practical design and field errors analysis of a merged APPLE-Knot undulator for High Energy Photo Source," Nuclear Instruments and Methods in Physics Research A 1011, 165579, 2021, 9 pages.

* cited by examiner

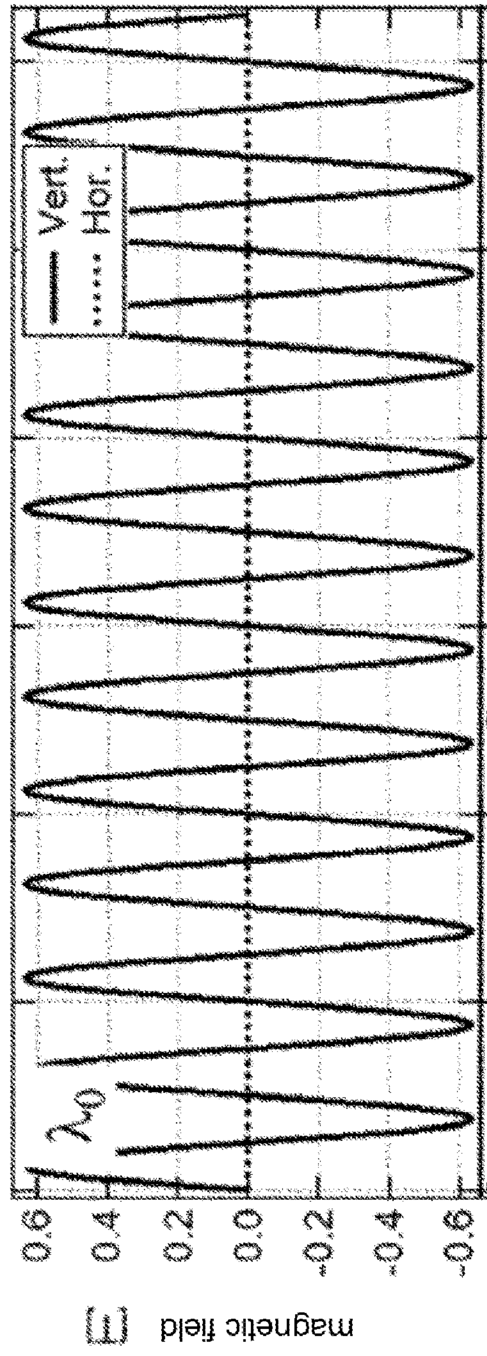
[Fig. 4a]
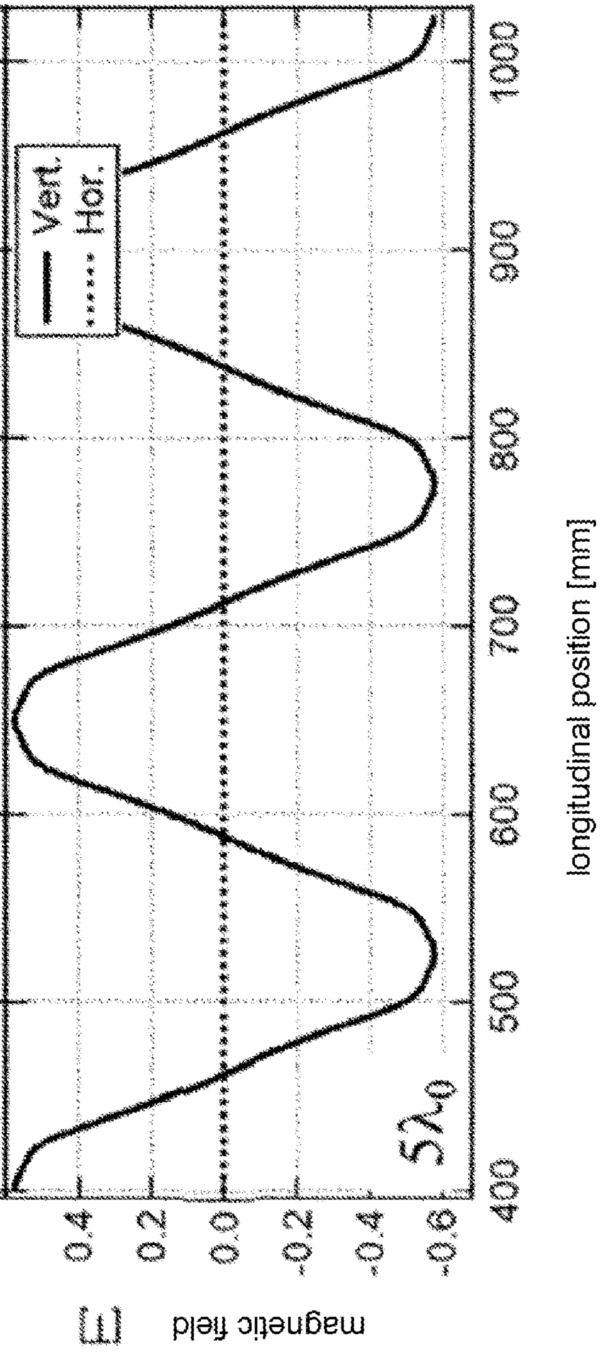
[Fig. 4b]

[Fig. 4c]
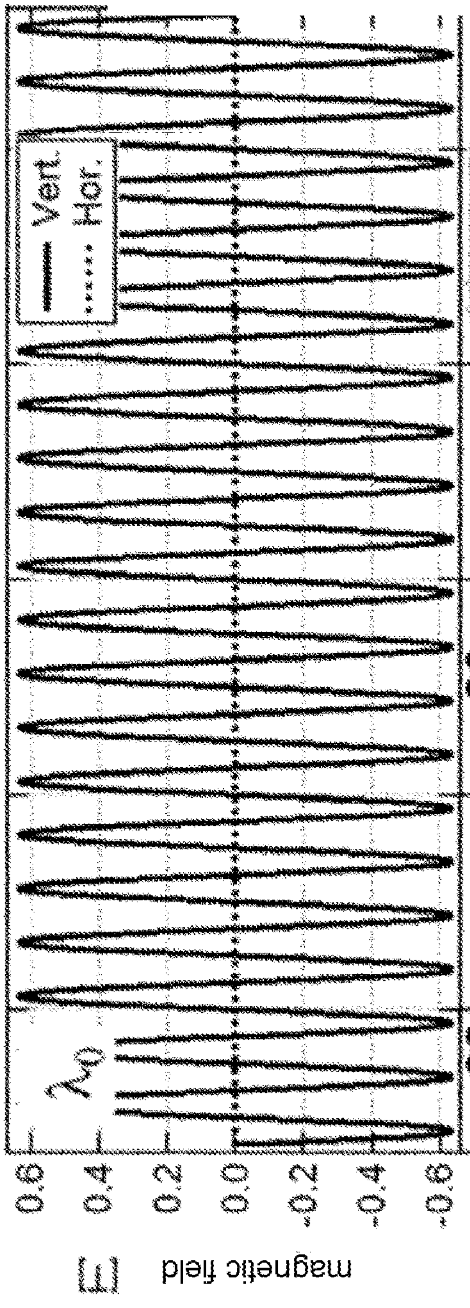
[Fig. 4d]
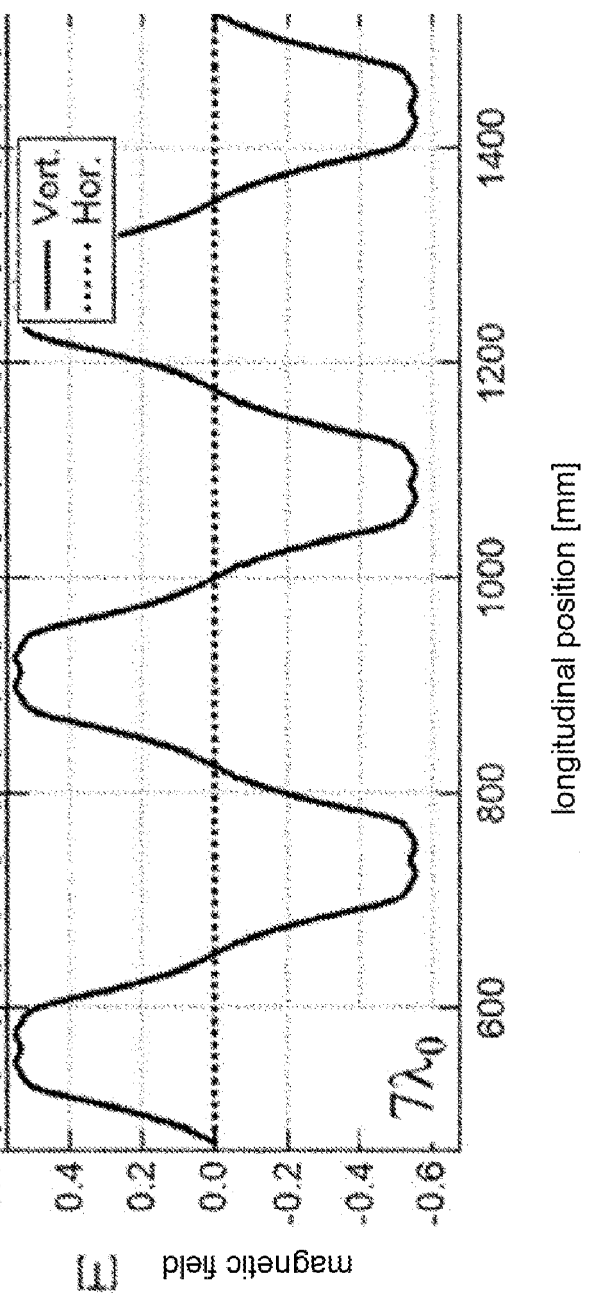

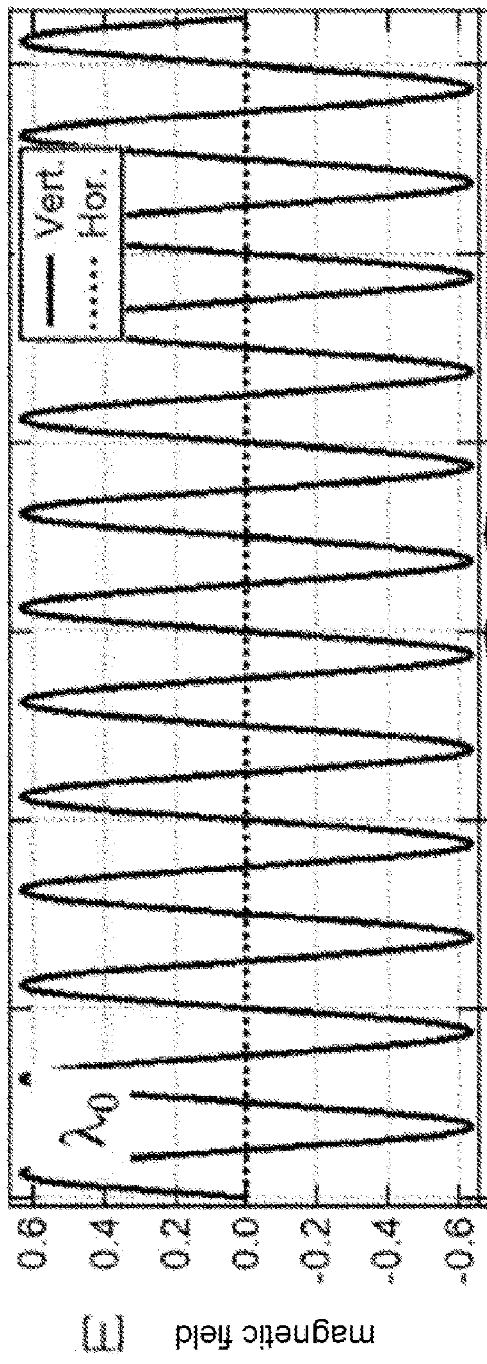
[Fig. 4e]
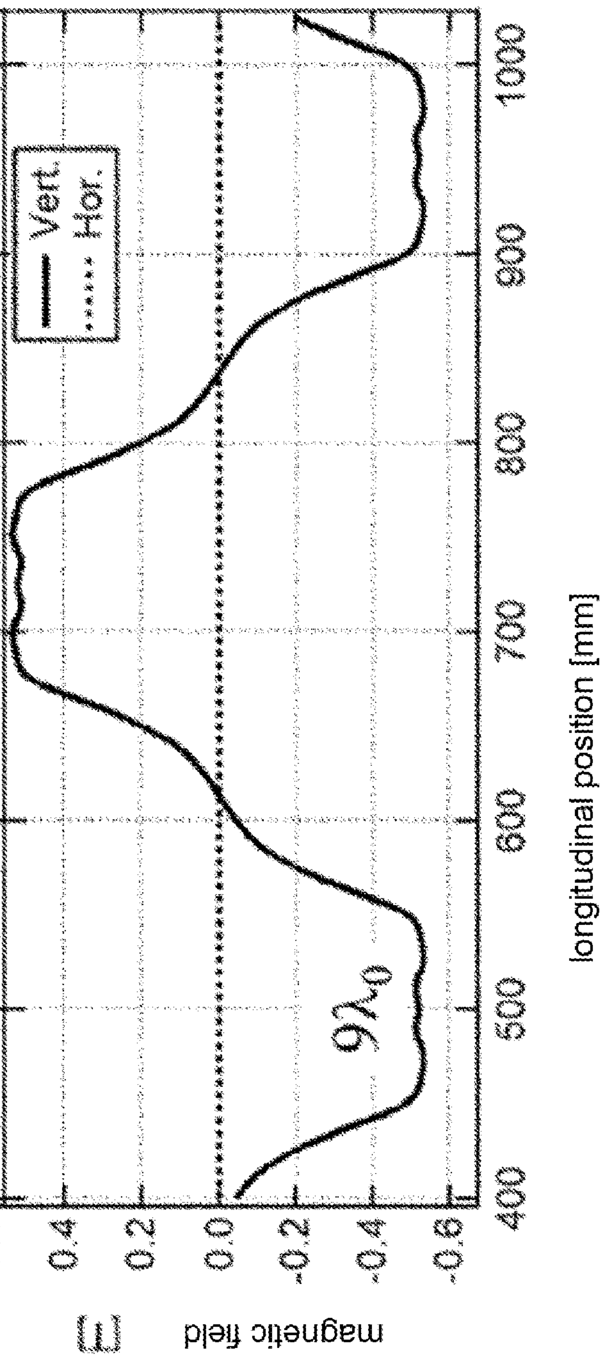
[Fig. 4f]

c) $\lambda_0$-4$\lambda_0$

[Fig. 6a]
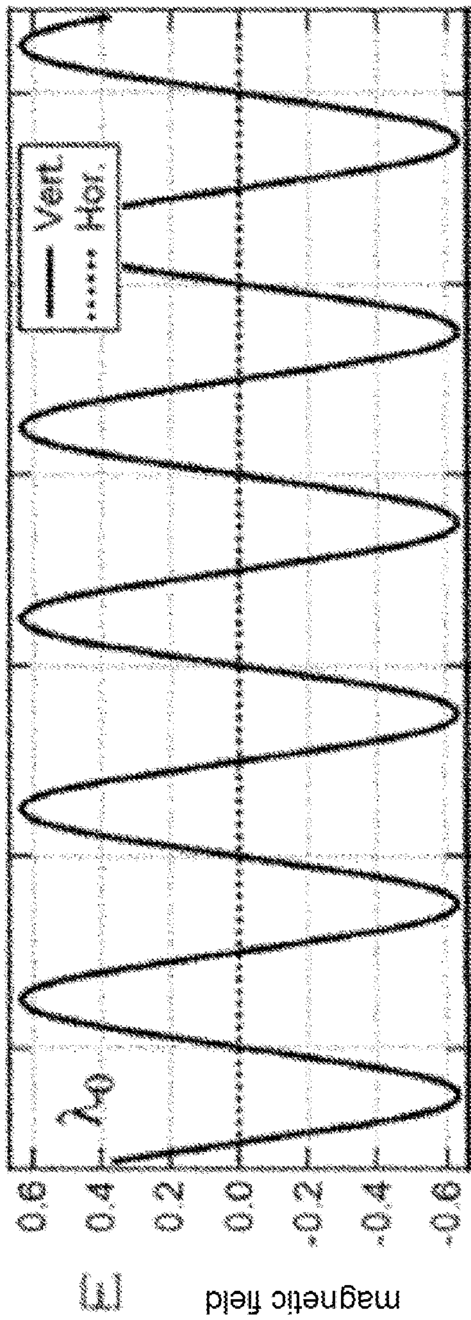
[Fig. 6b]
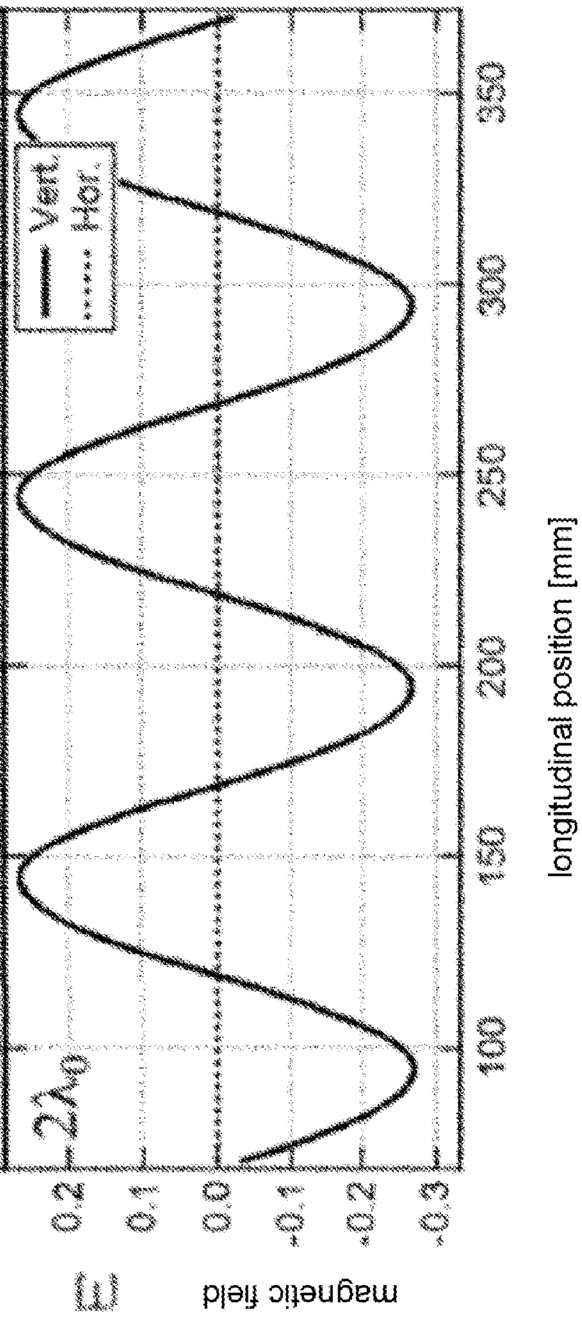

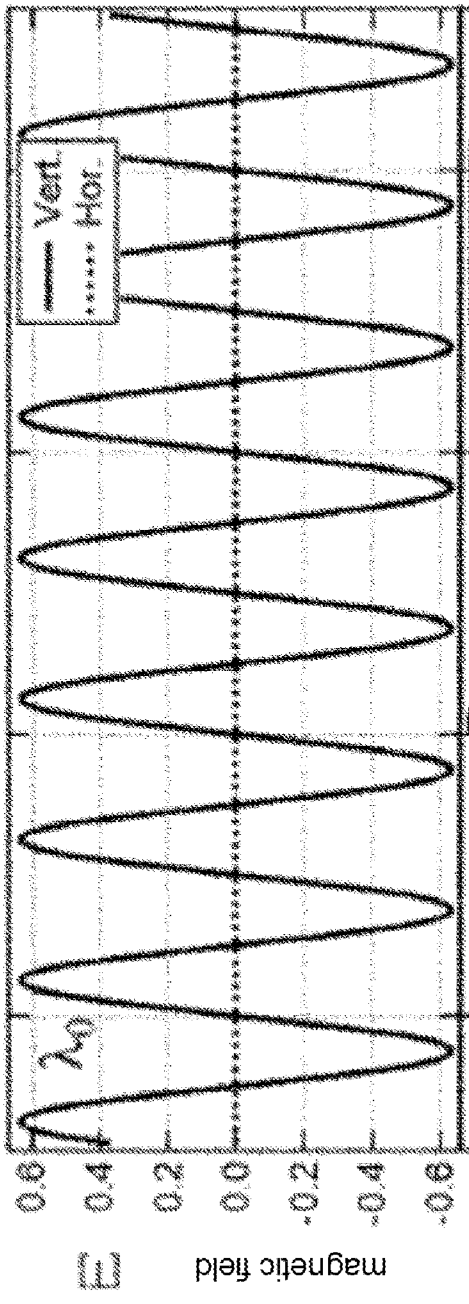
[Fig. 6c]
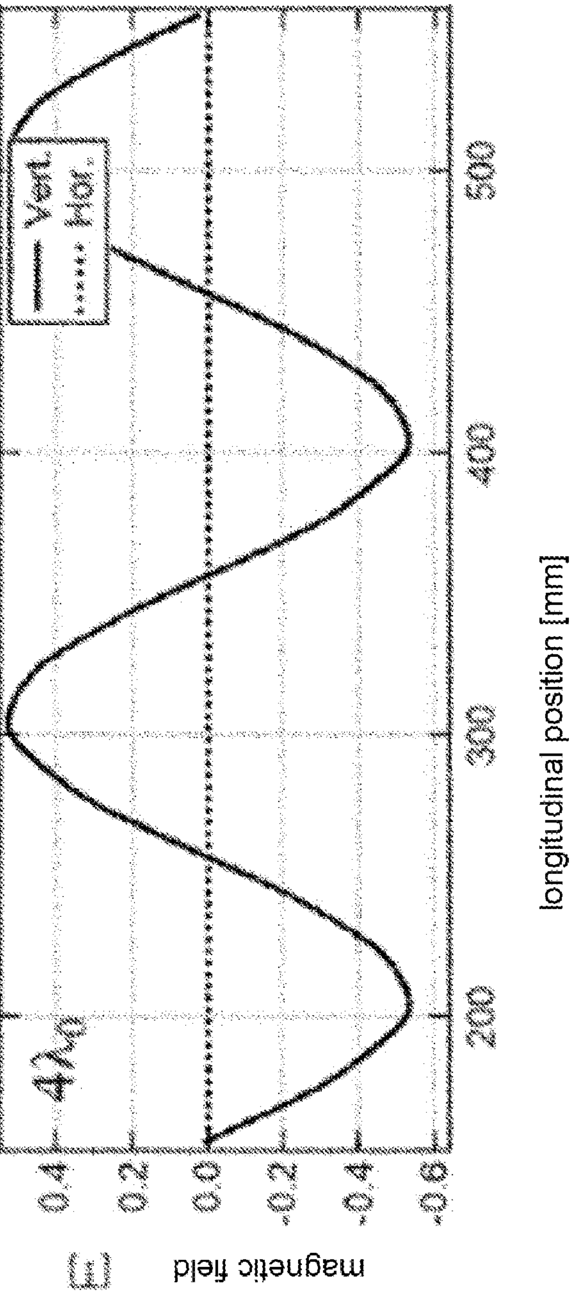
[Fig. 6d]

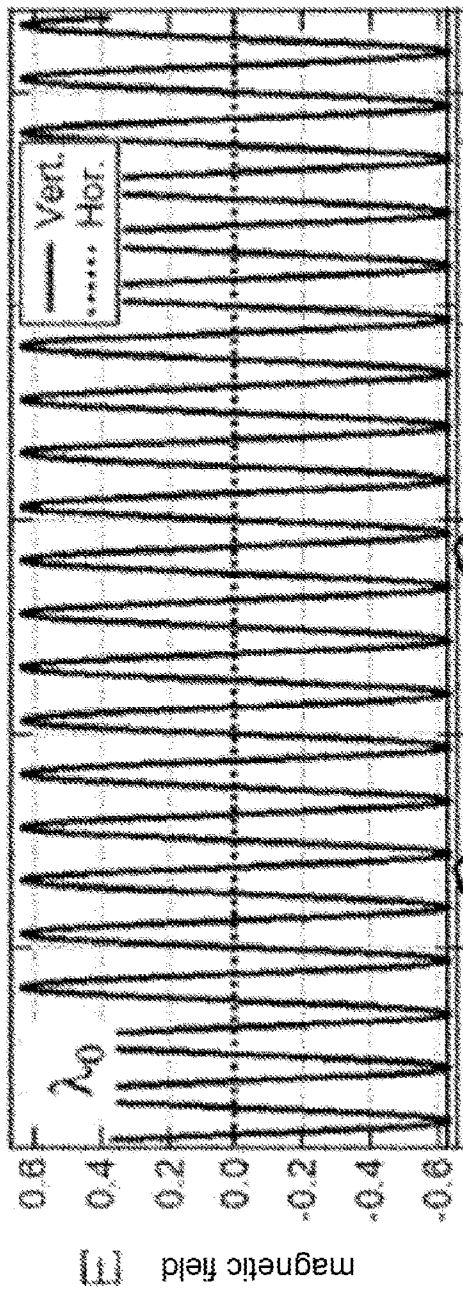
[Fig. 6e]
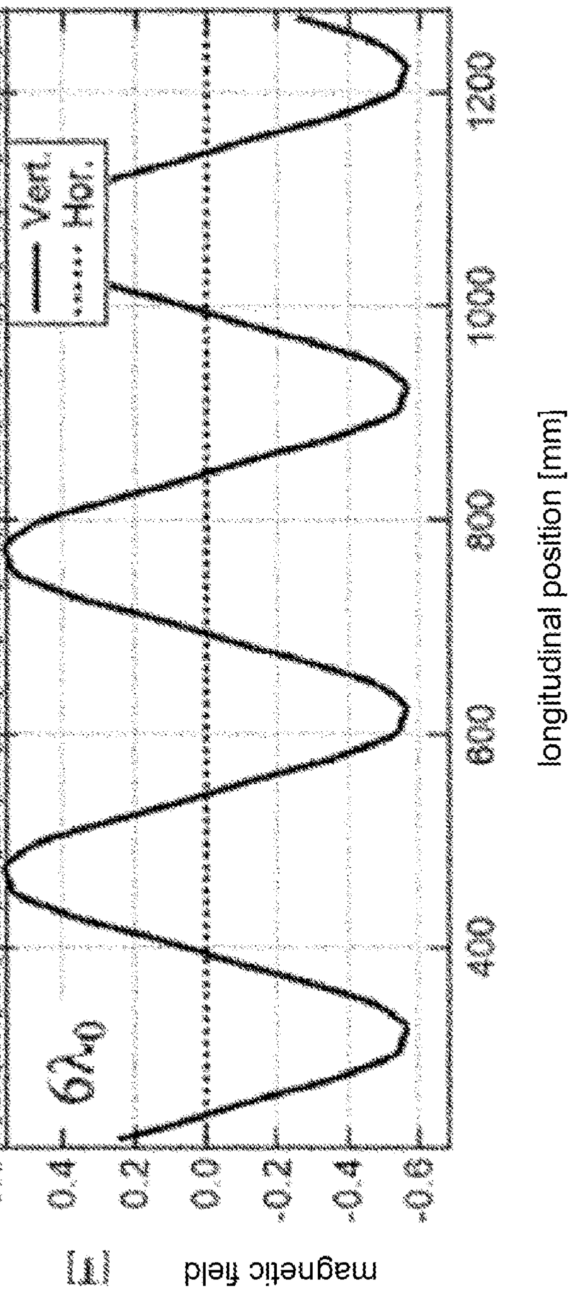
[Fig. 6f]

[Fig. 7]
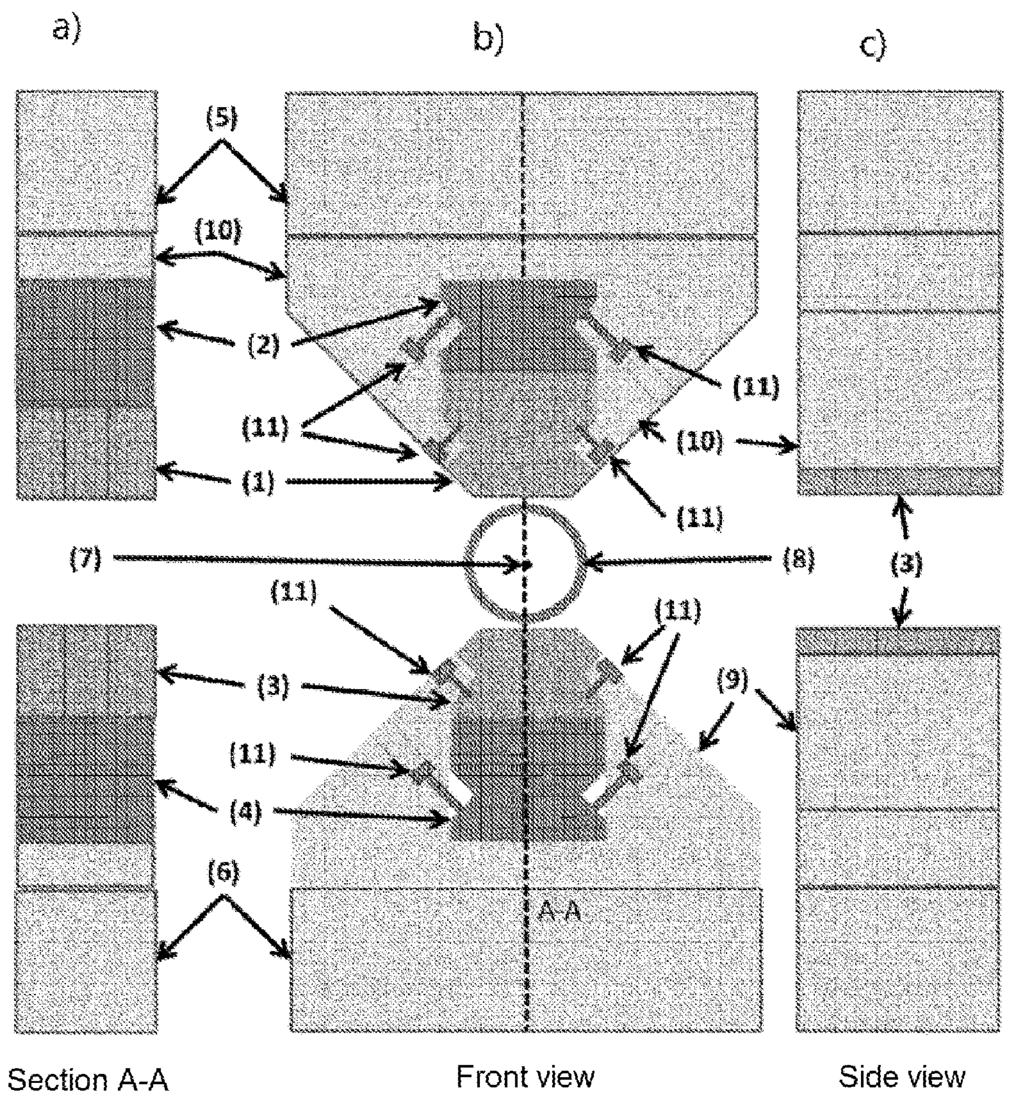

[Fig. 8a]
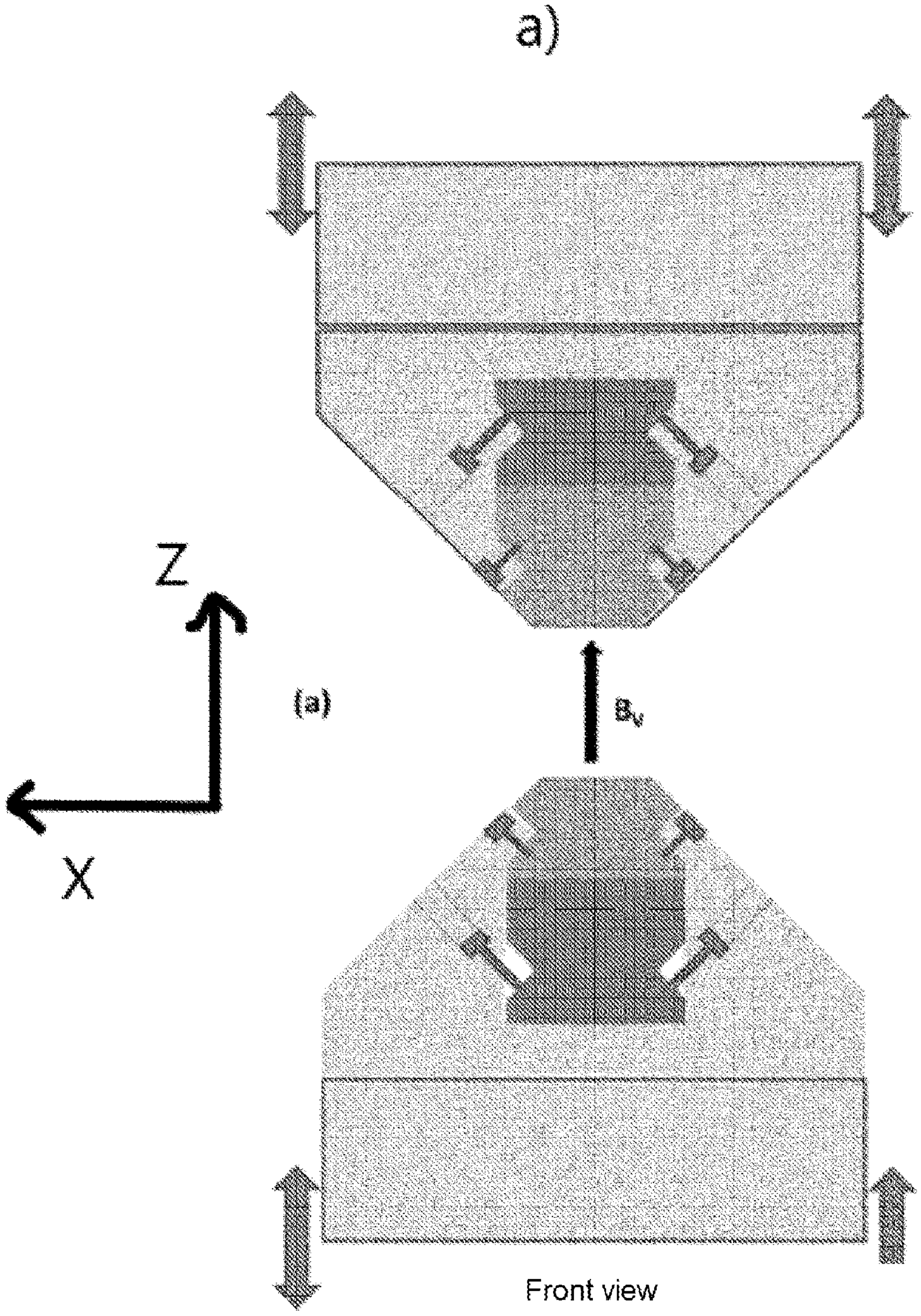

[Fig. 8b]
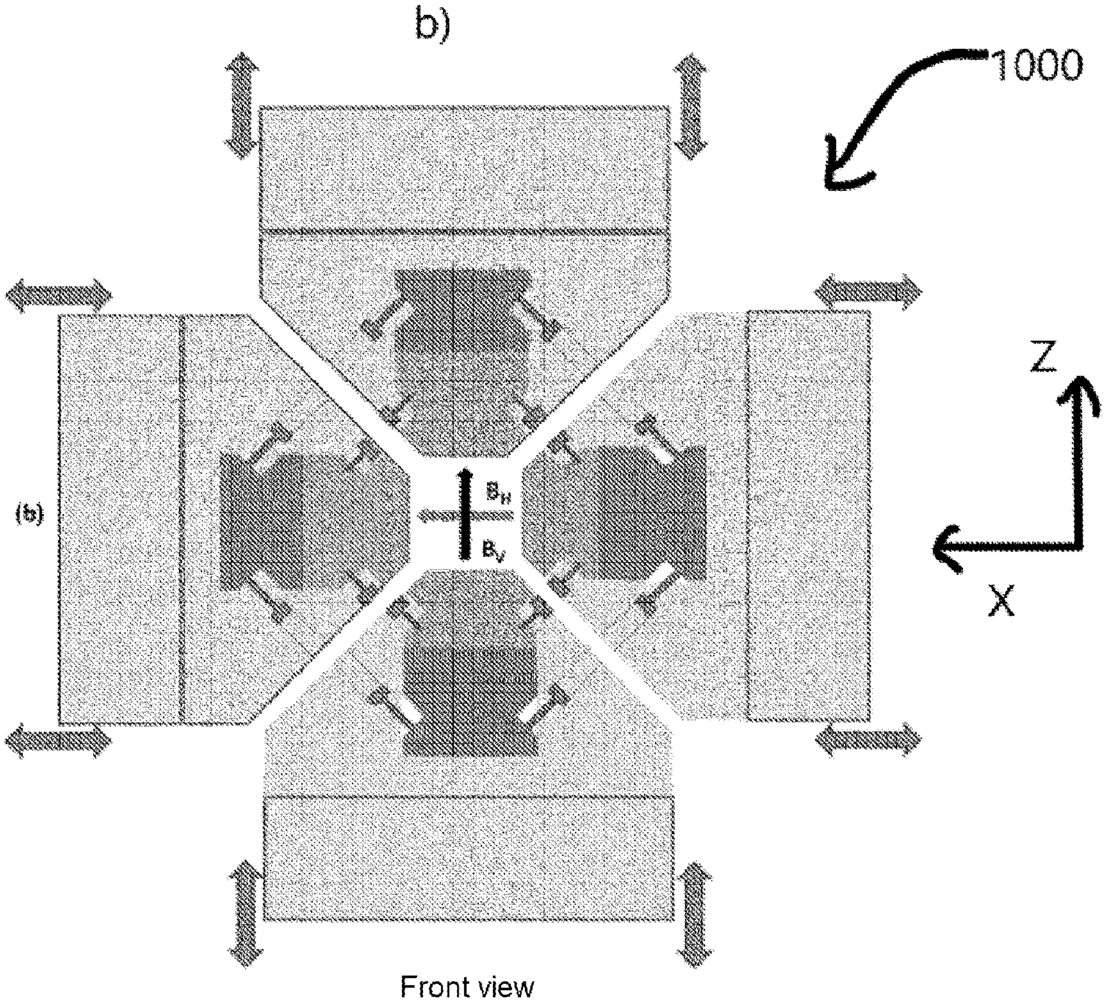

[Fig. 9a]
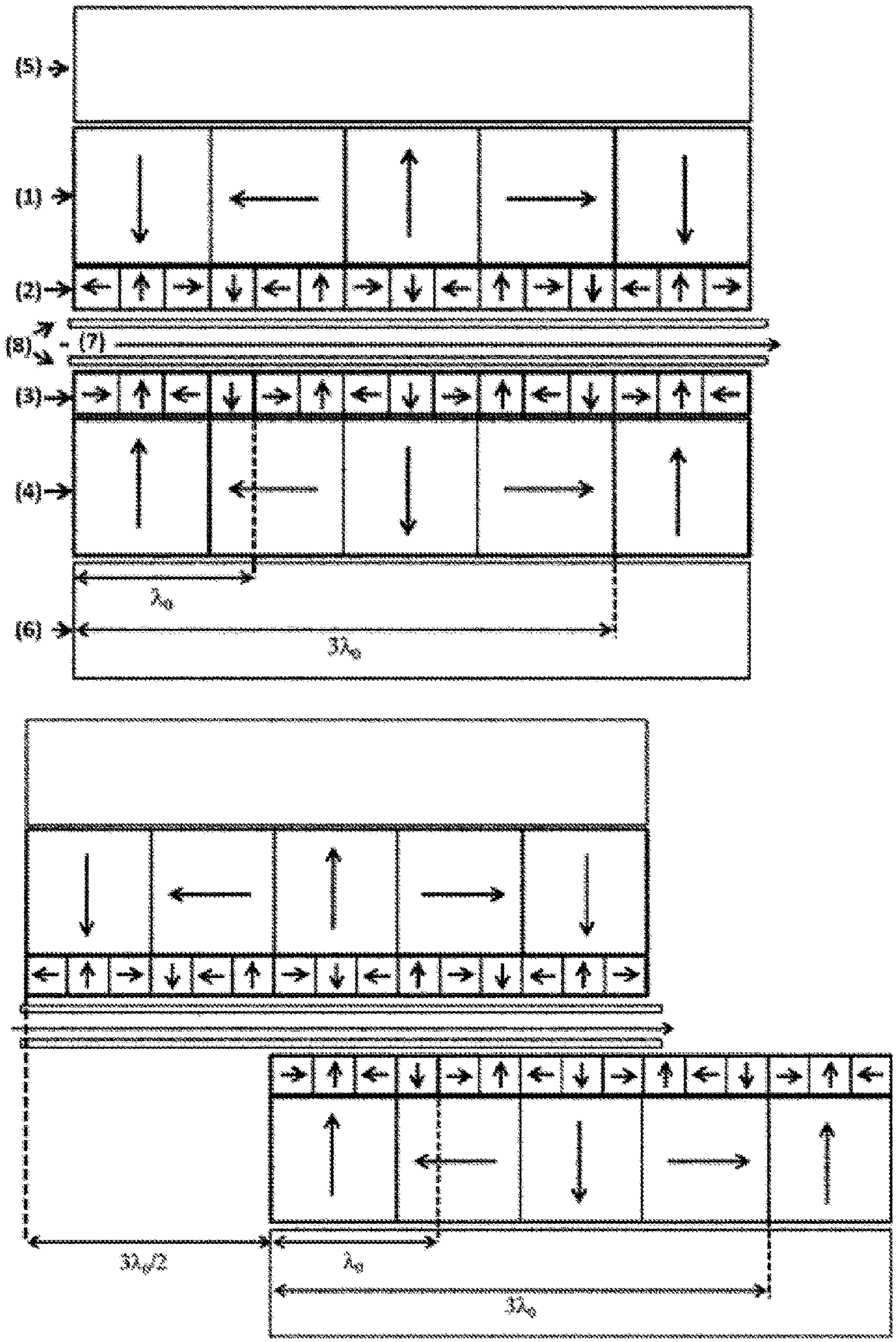

[Fig. 9b]
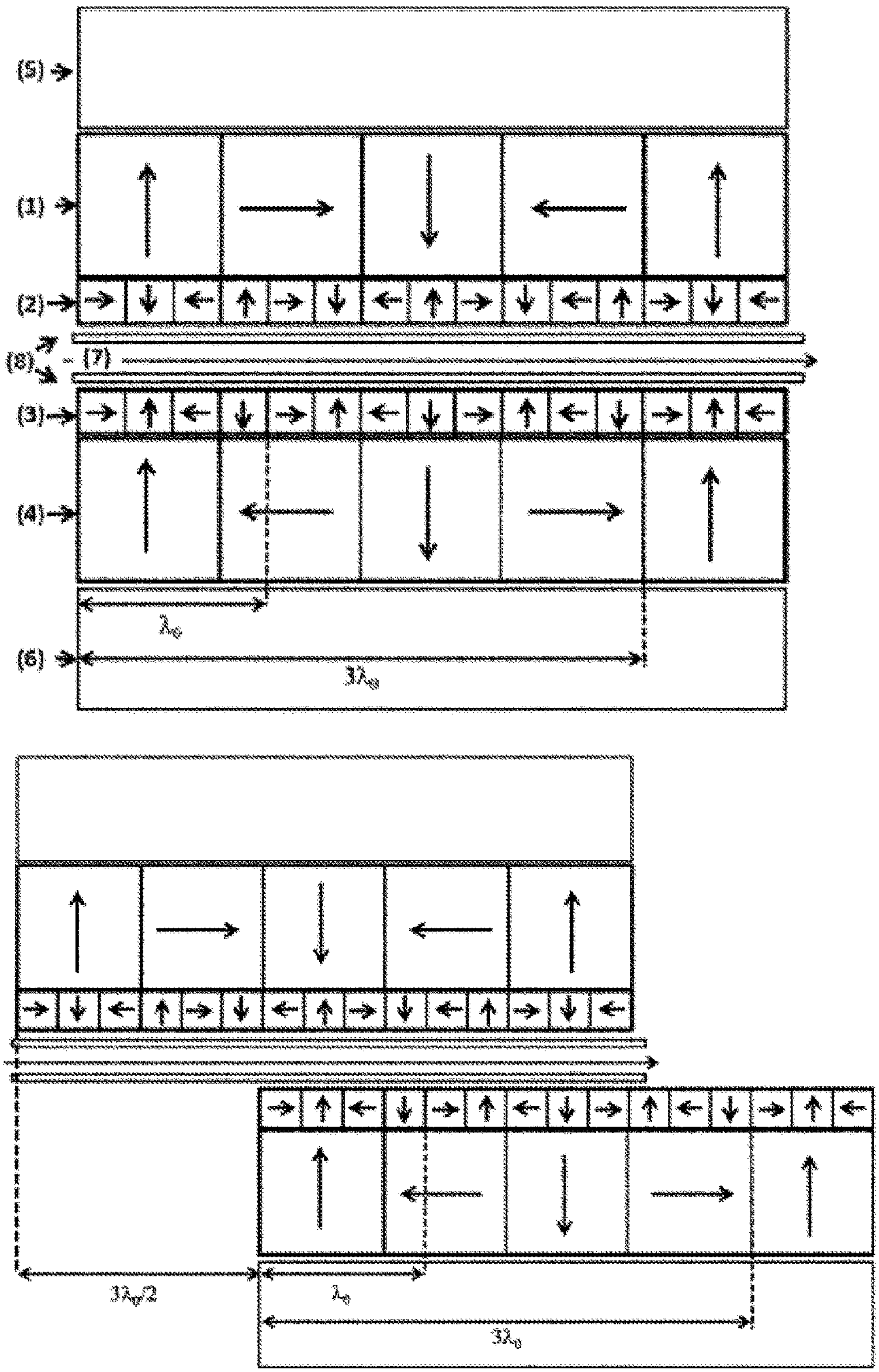

[Fig. 9c]
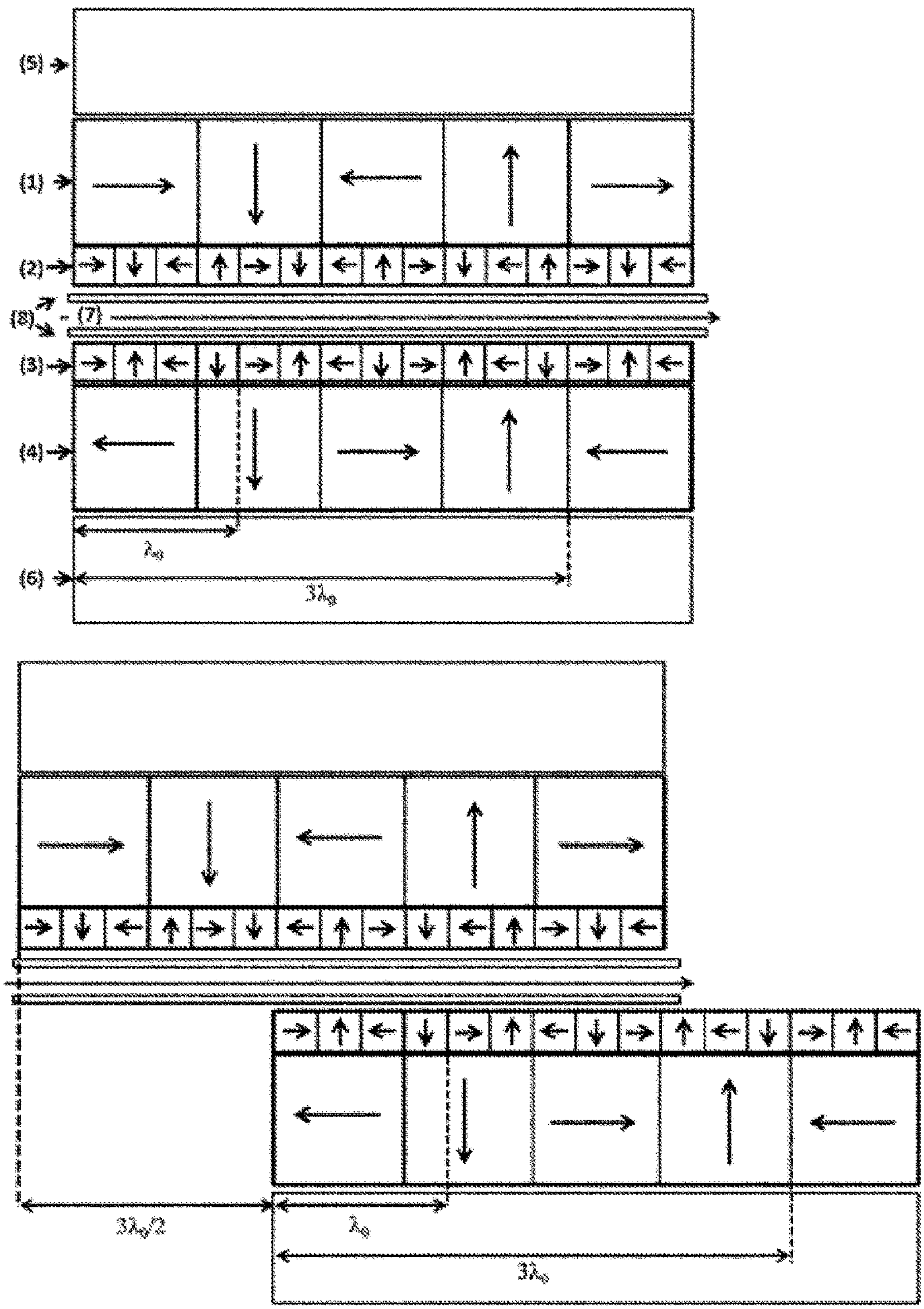

[Fig. 9d]
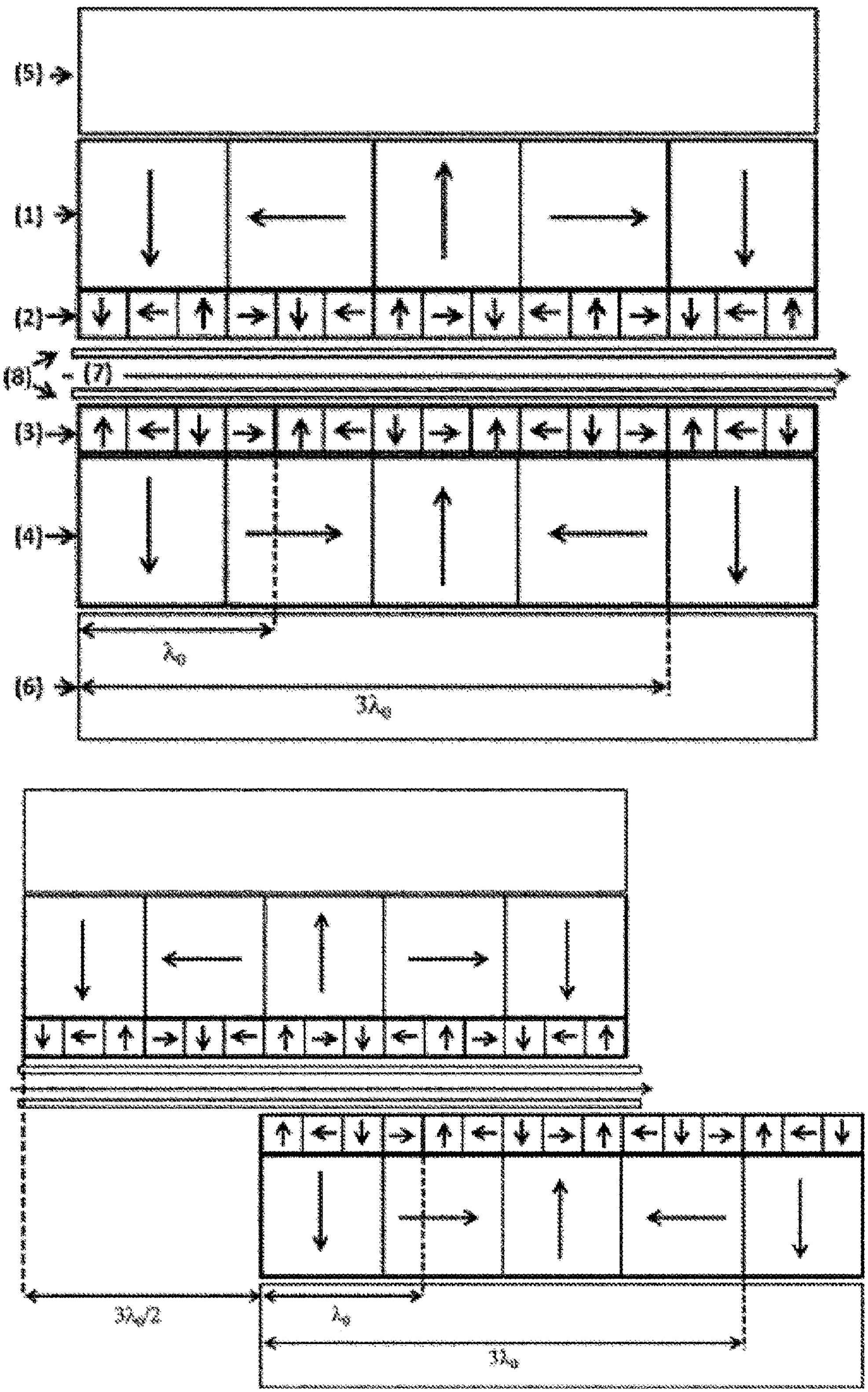

[Fig. 10a]
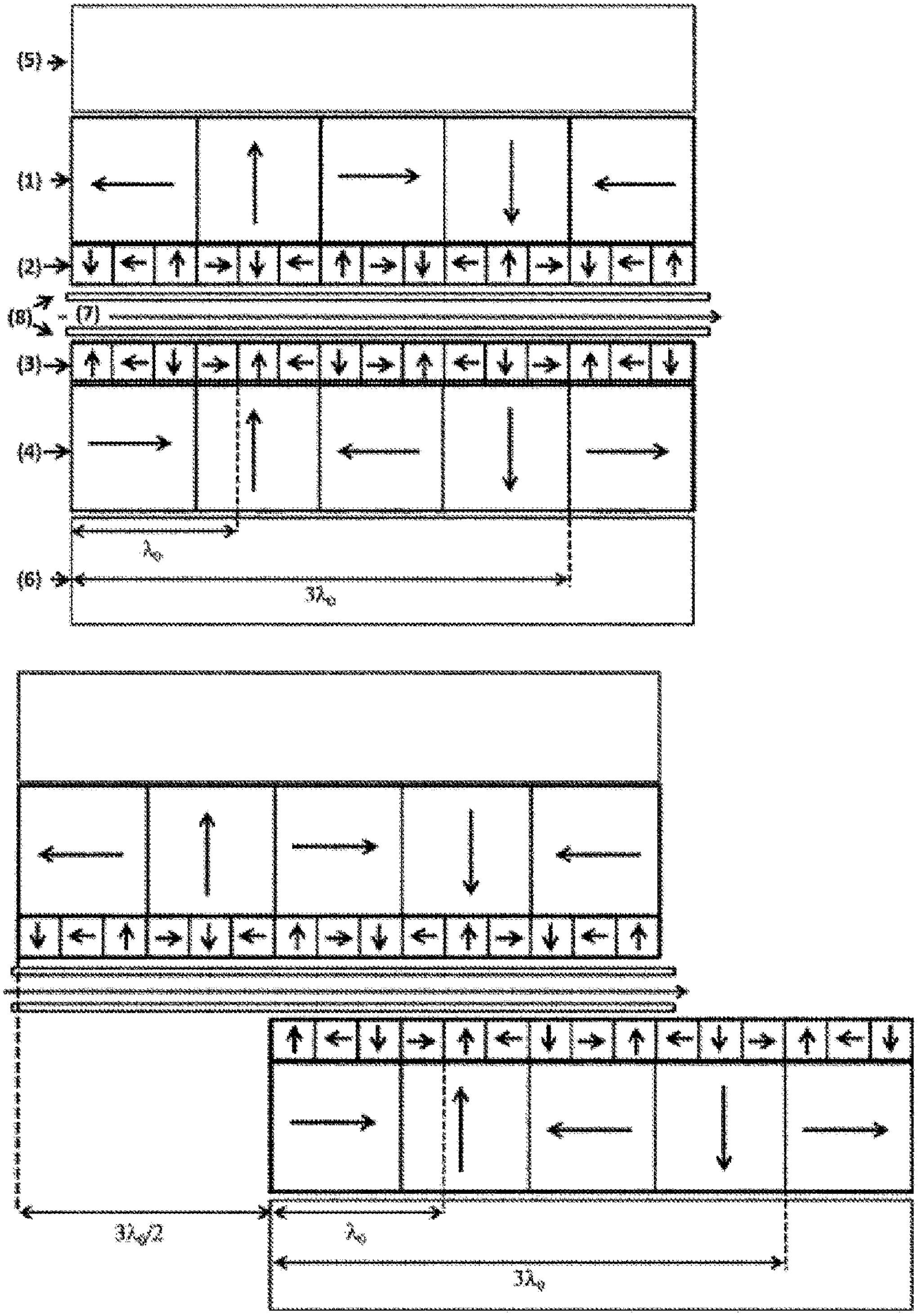

[Fig. 10b]
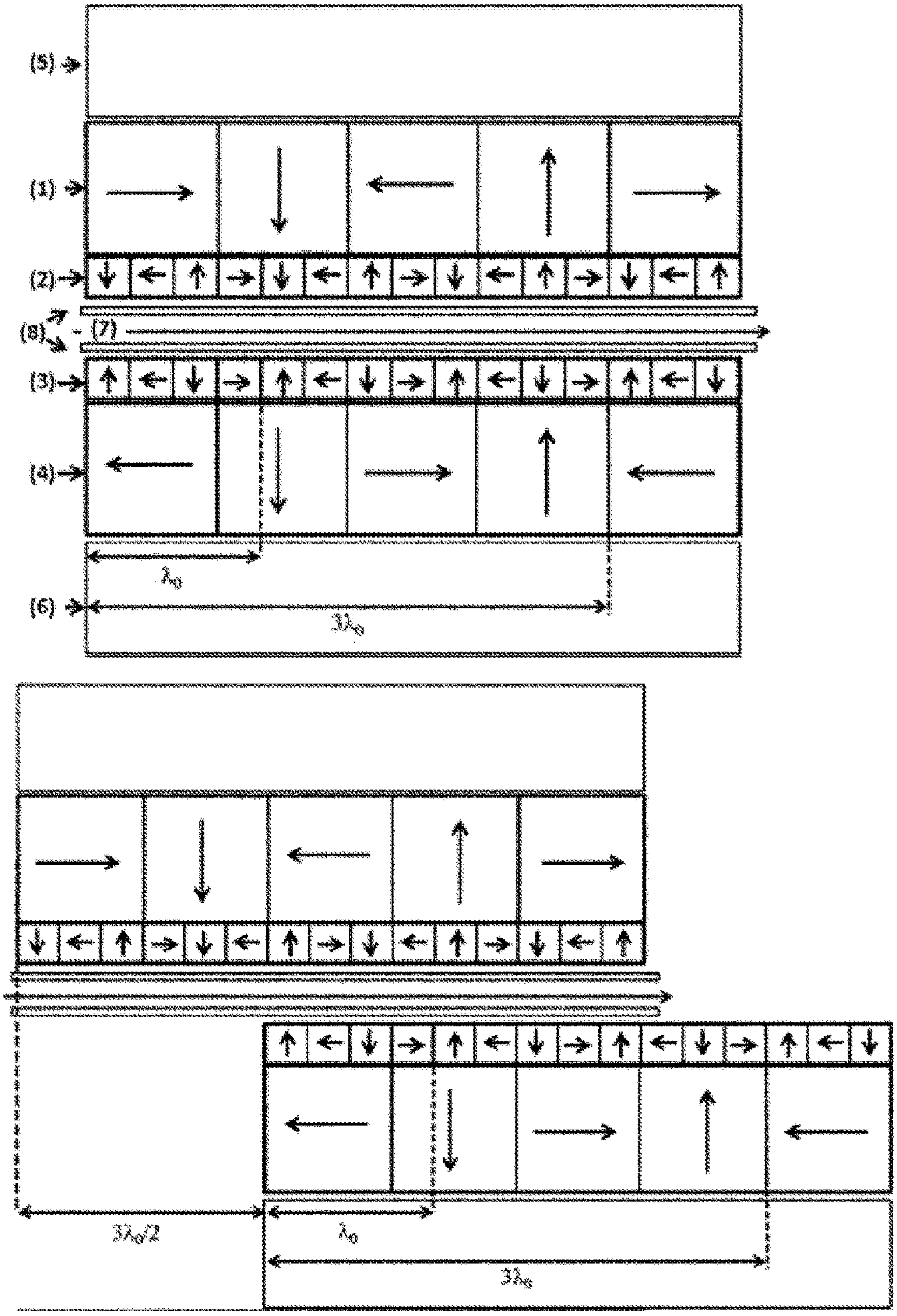

[Fig. 10c]
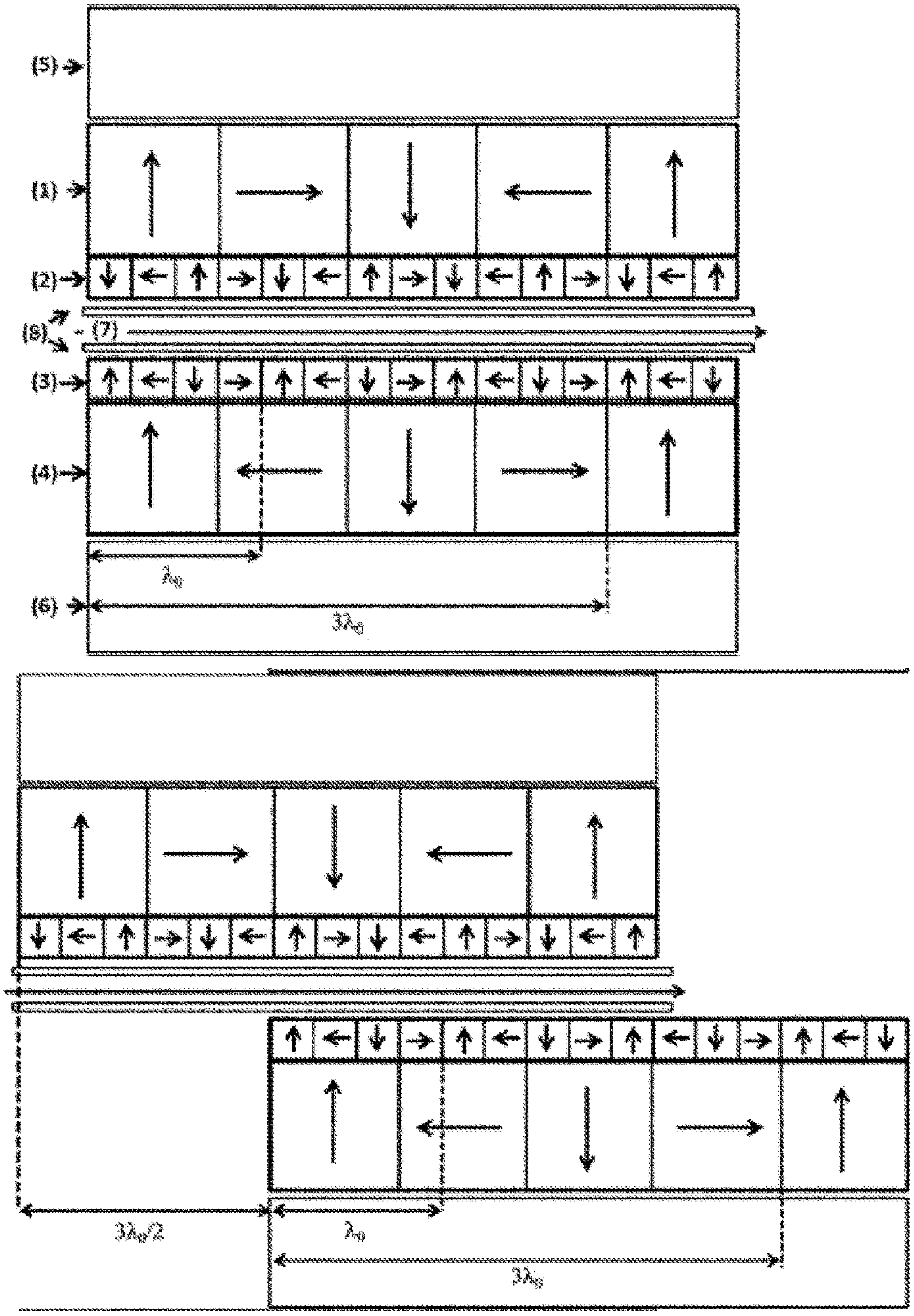

[Fig. 10d]
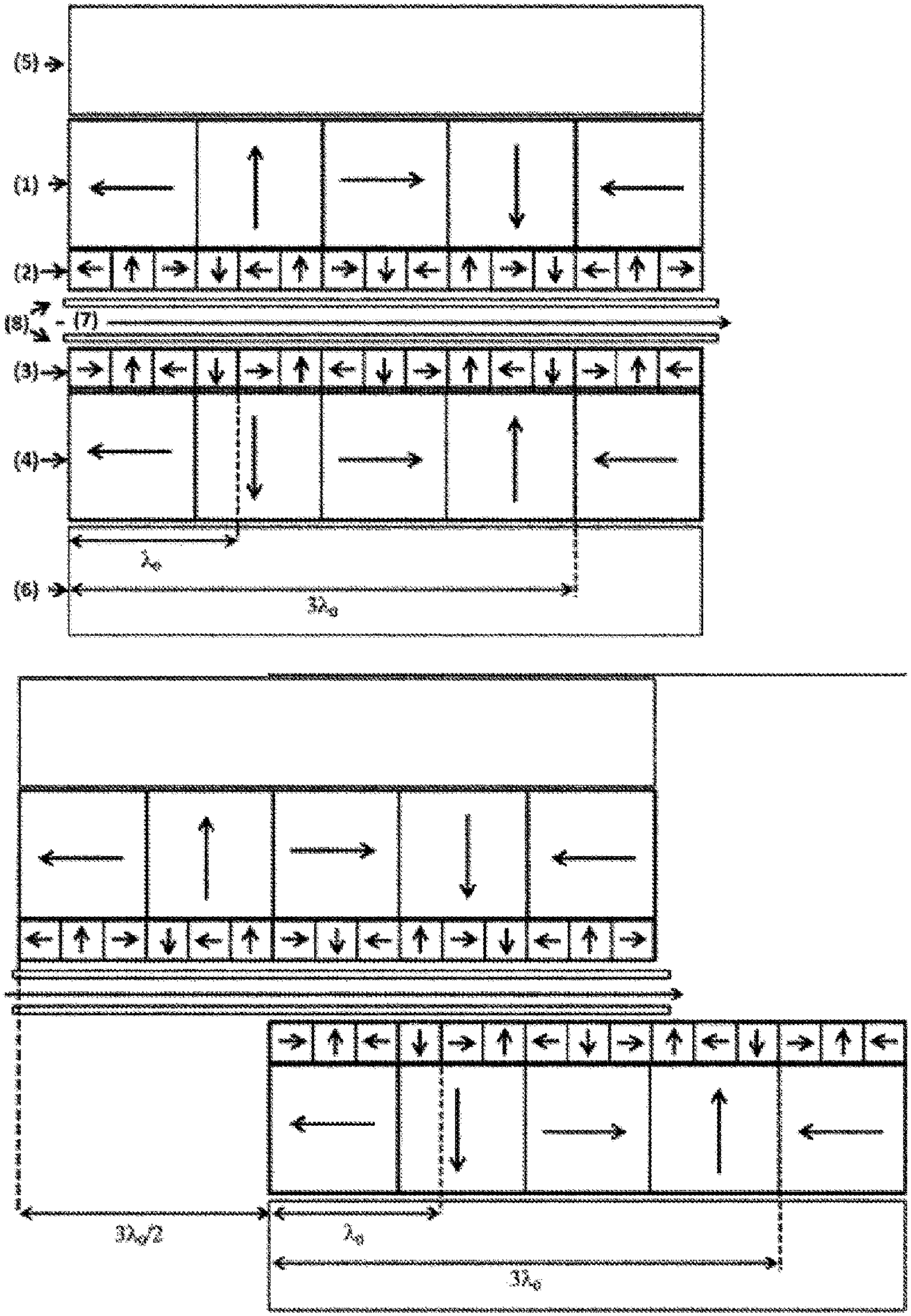

[Fig. 11a]
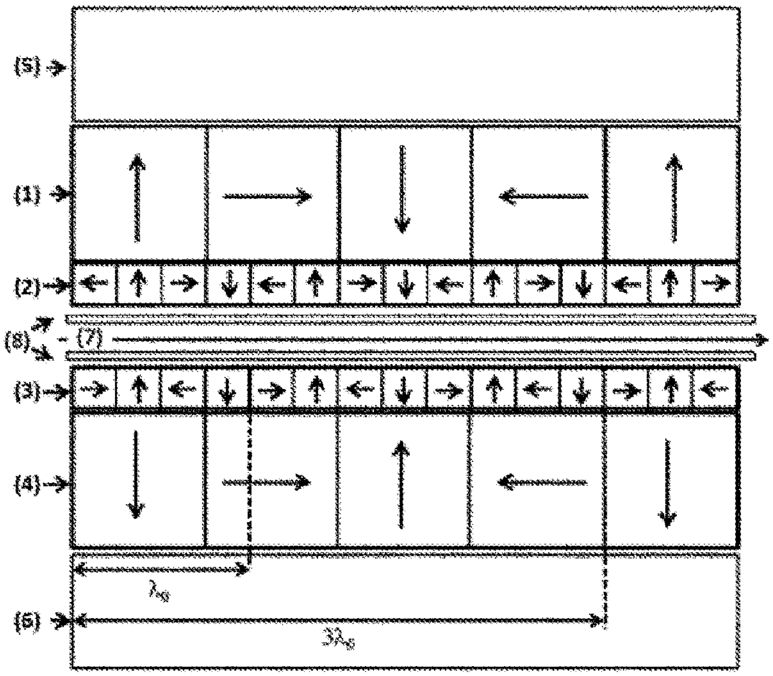
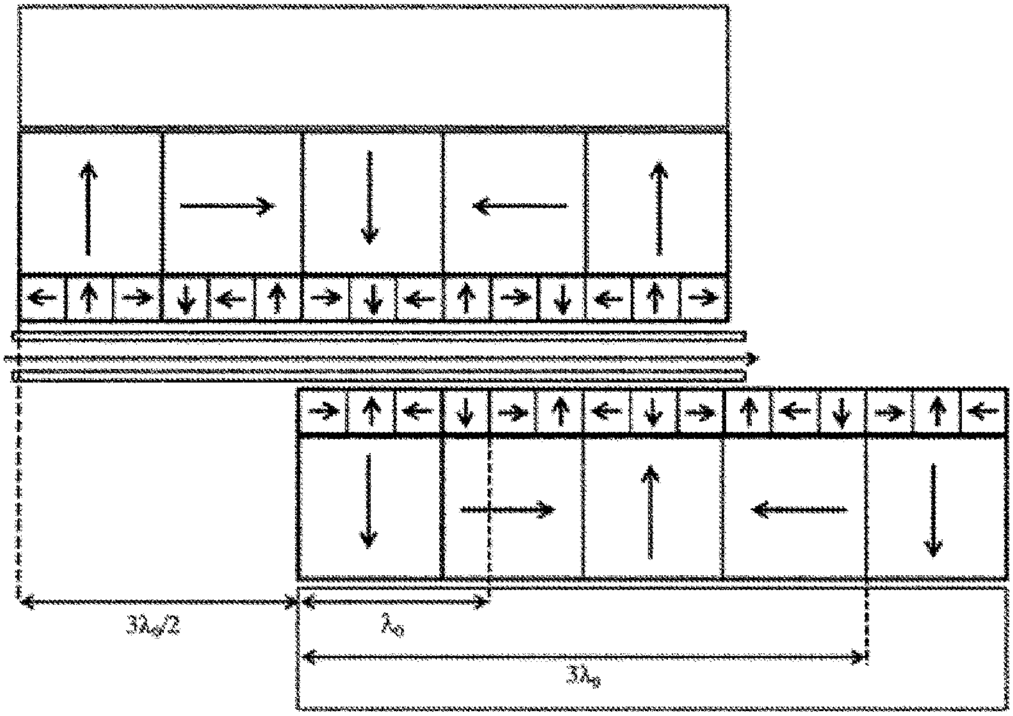

[Fig. 11b]
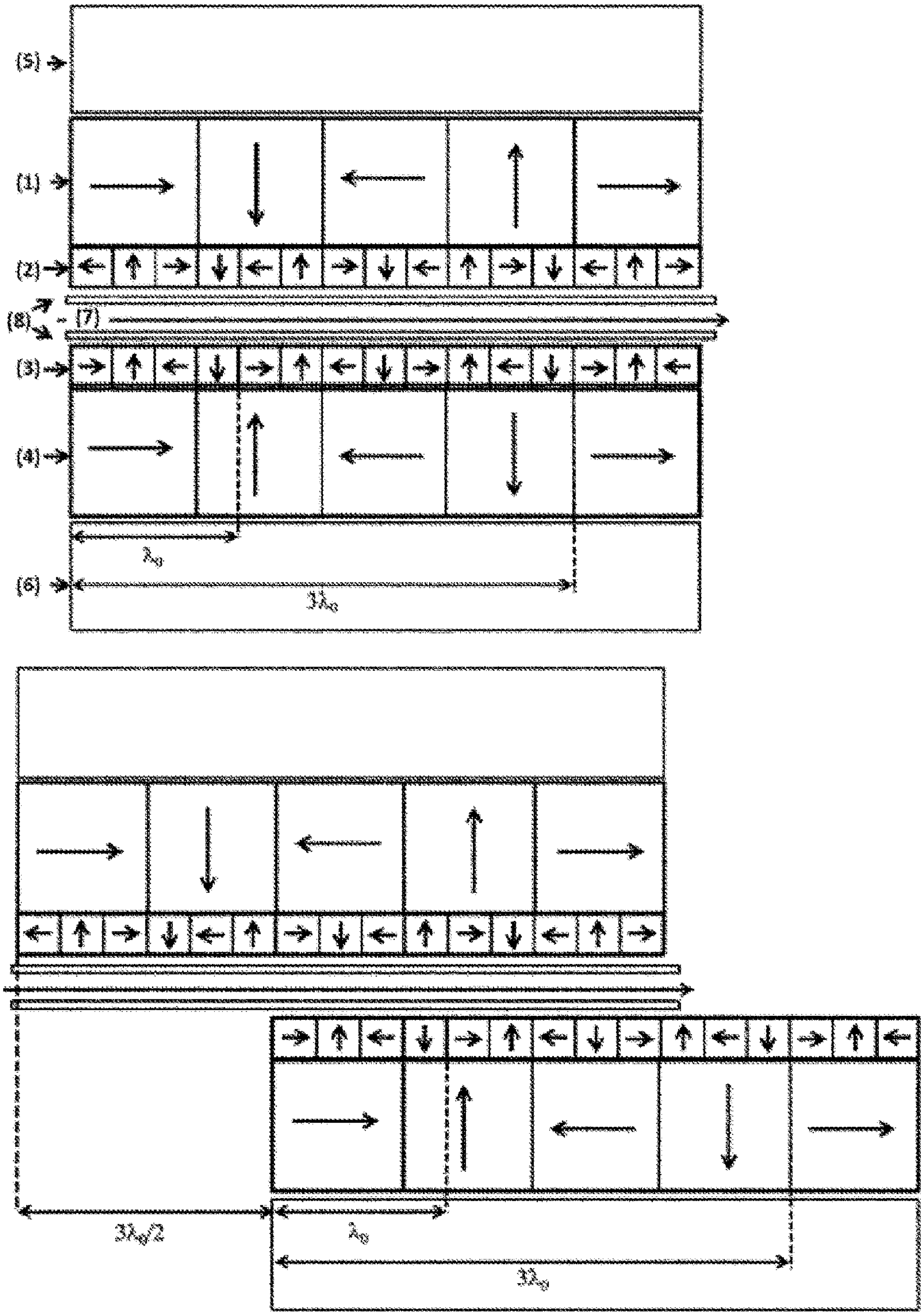

[Fig. 11c]
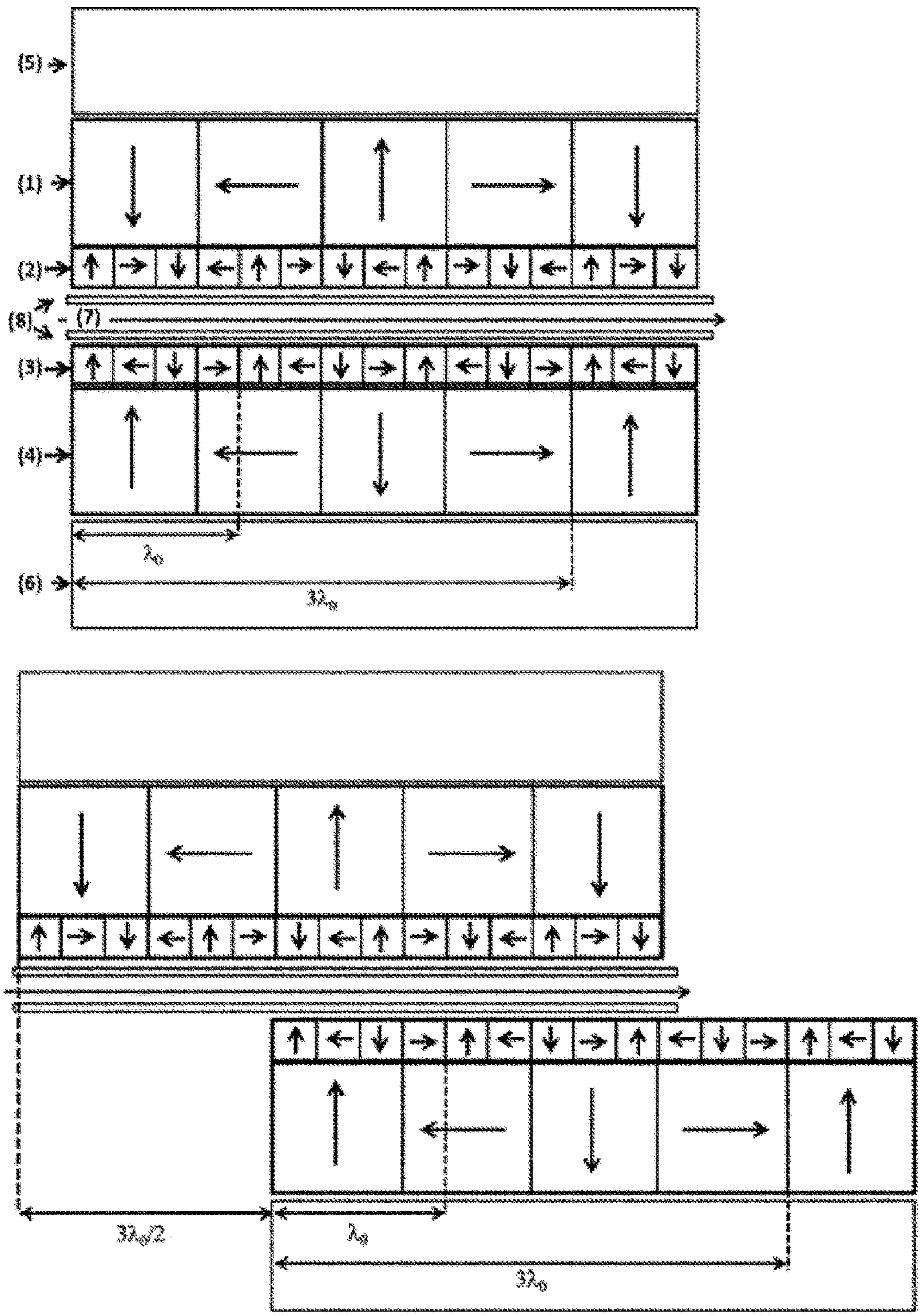

[Fig. 11d]
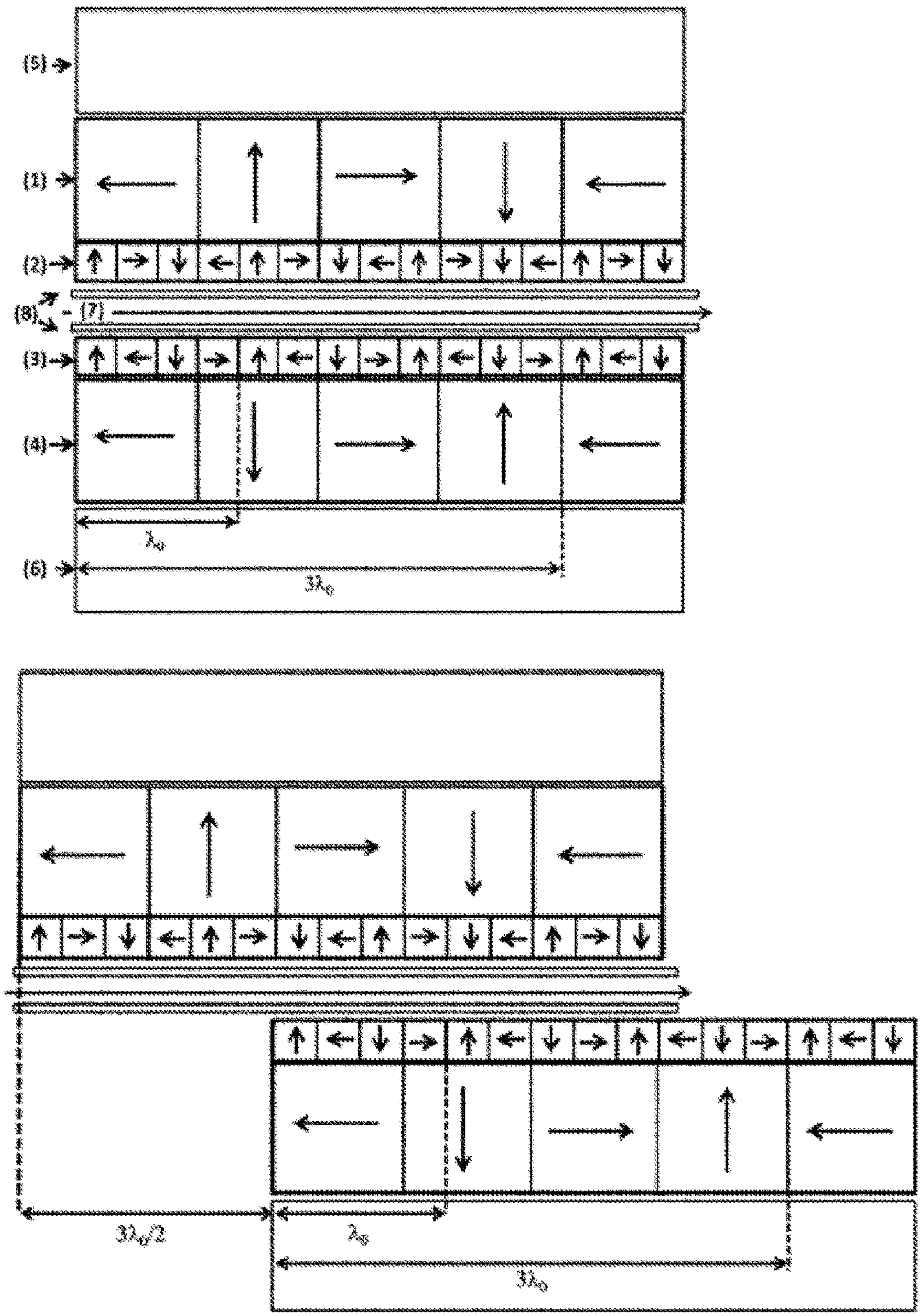

[Fig. 12a]
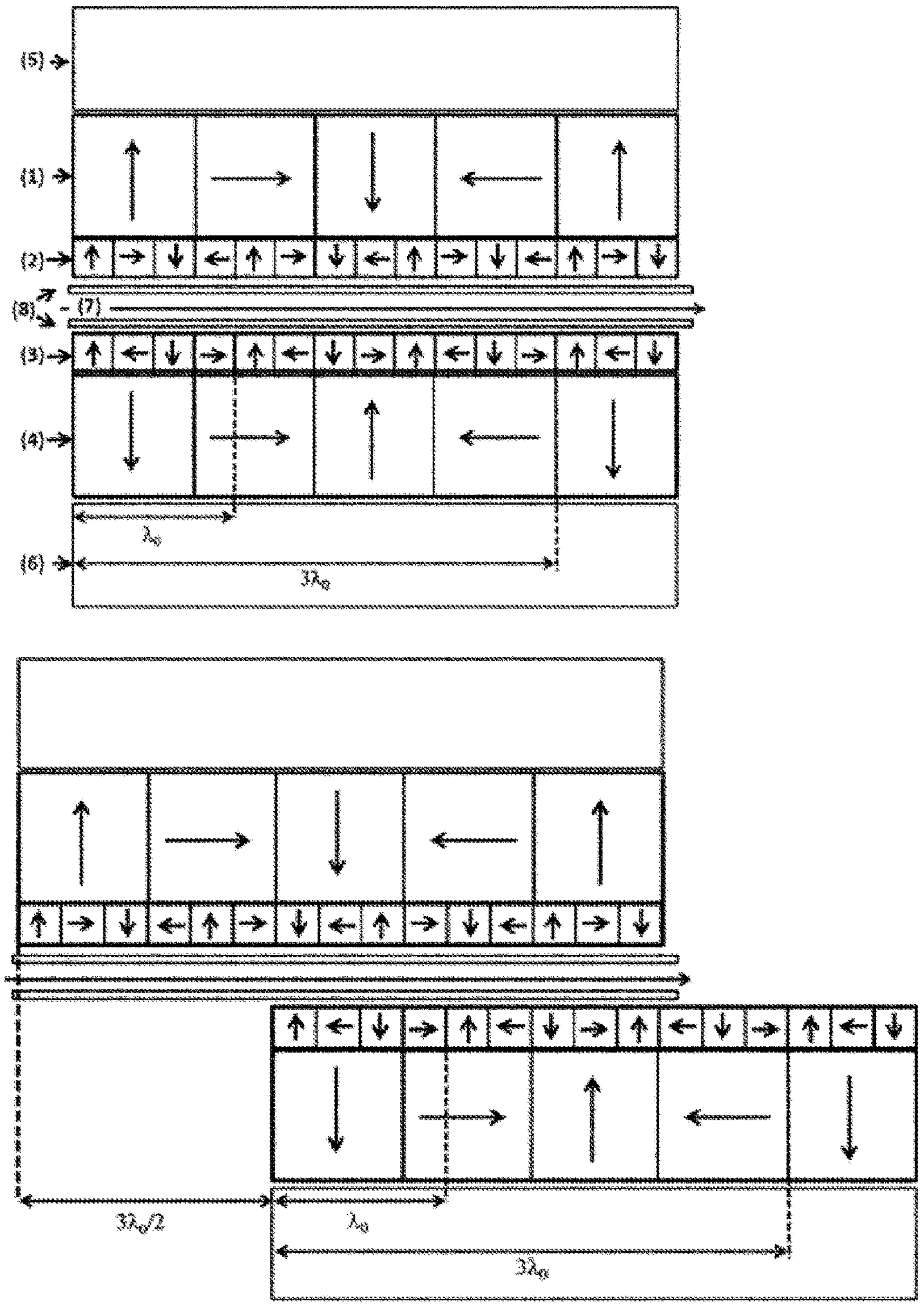

[Fig. 12b]
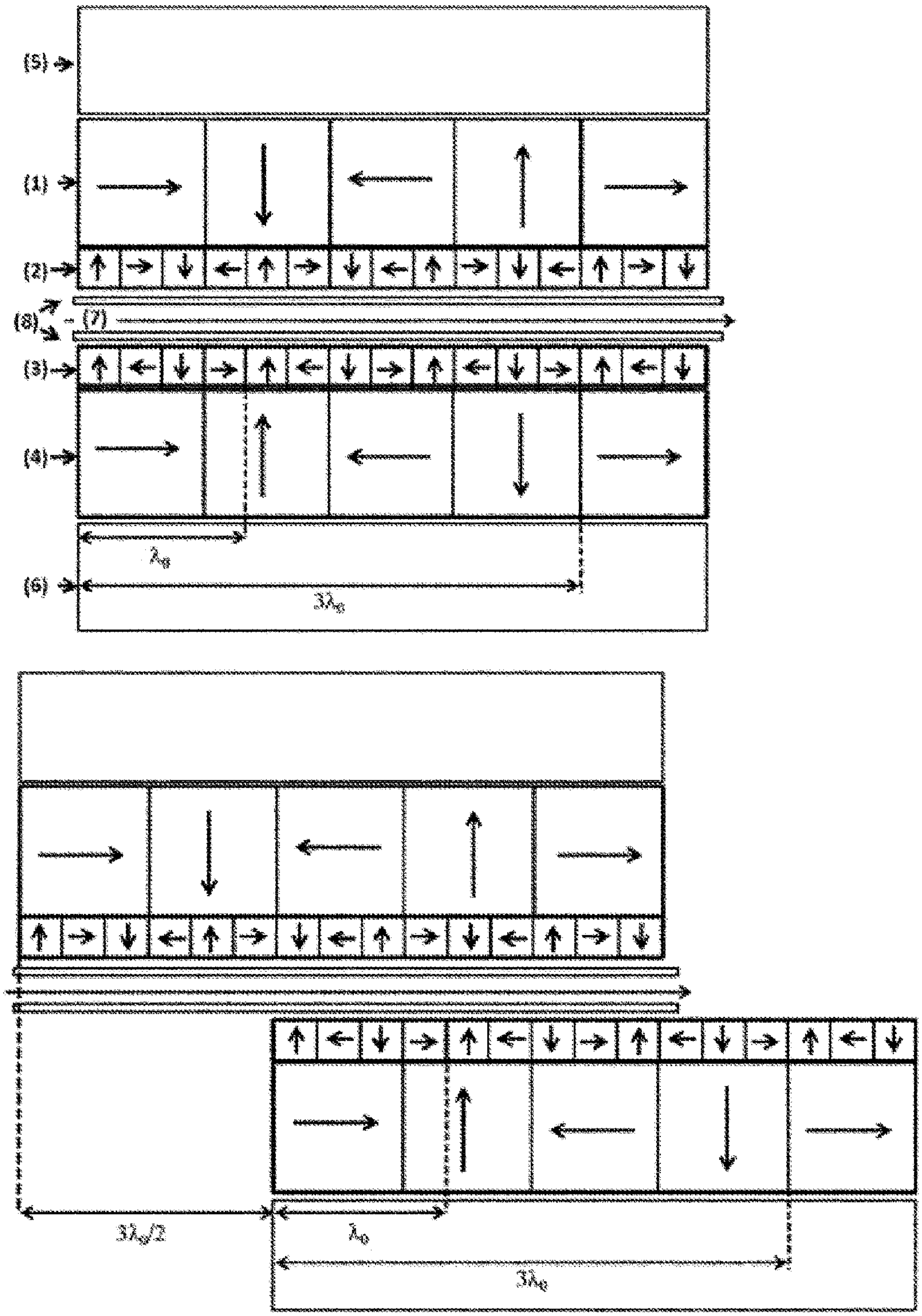

[Fig. 12c]
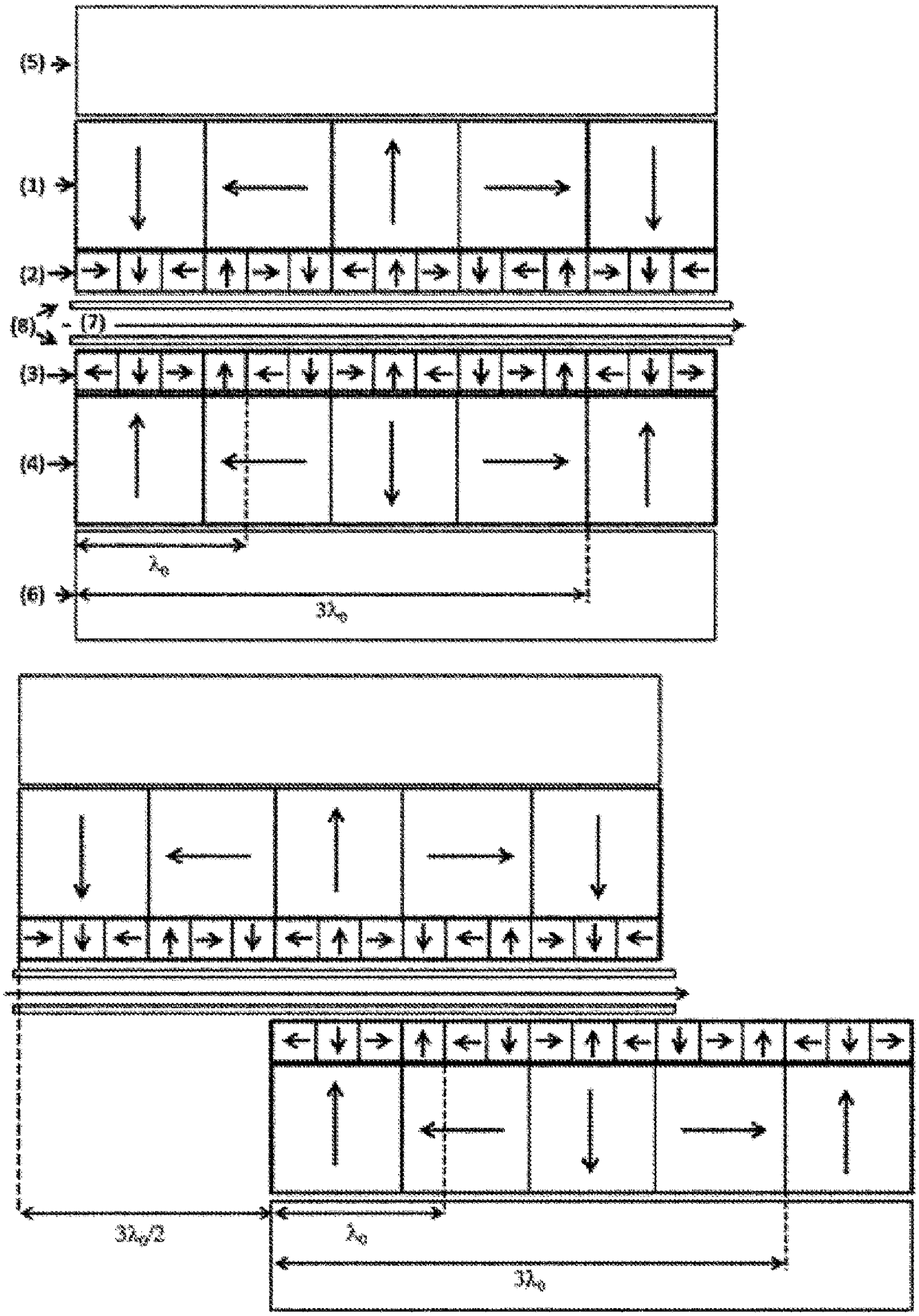

[Fig. 12d]
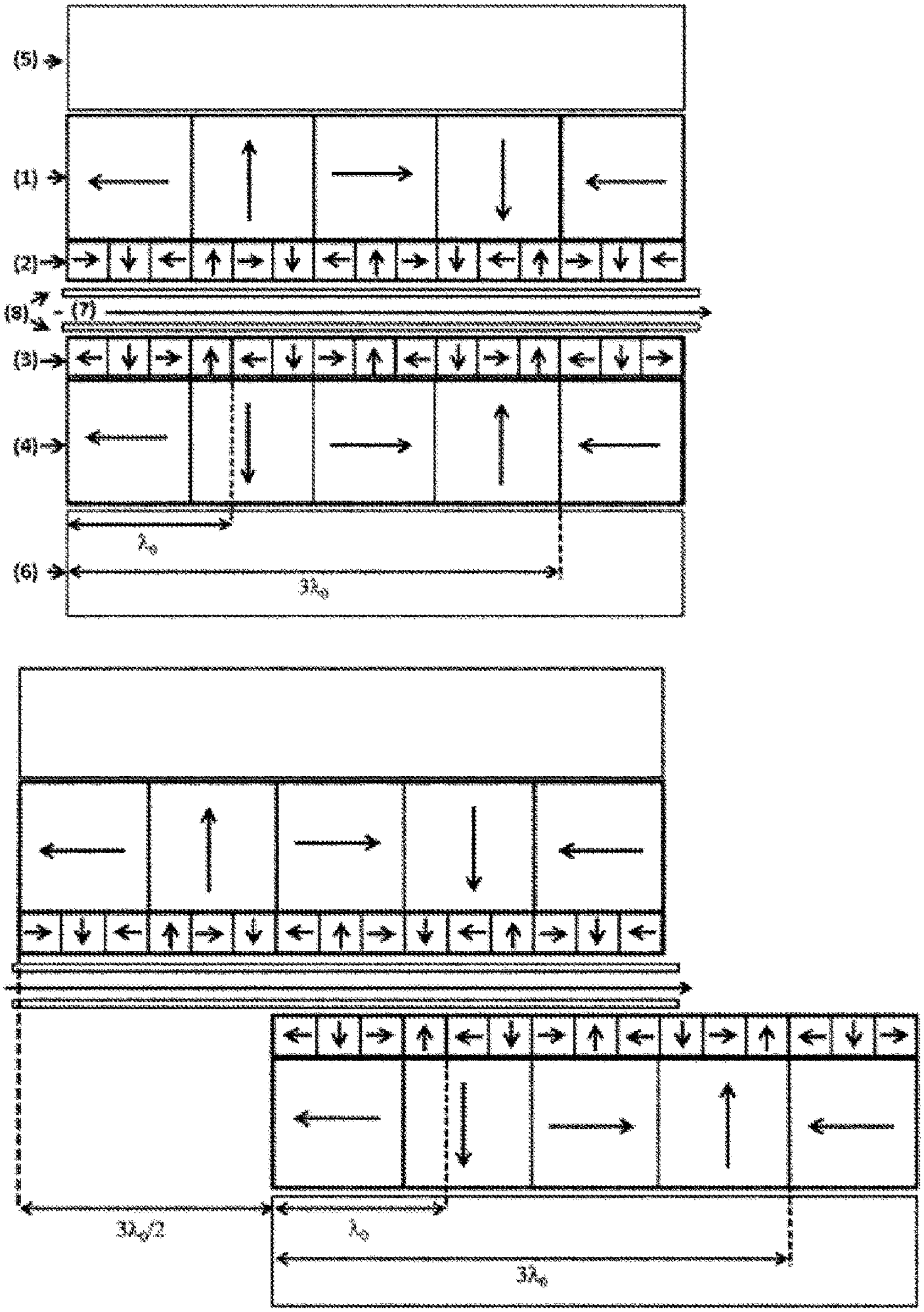

[Fig. 13a]
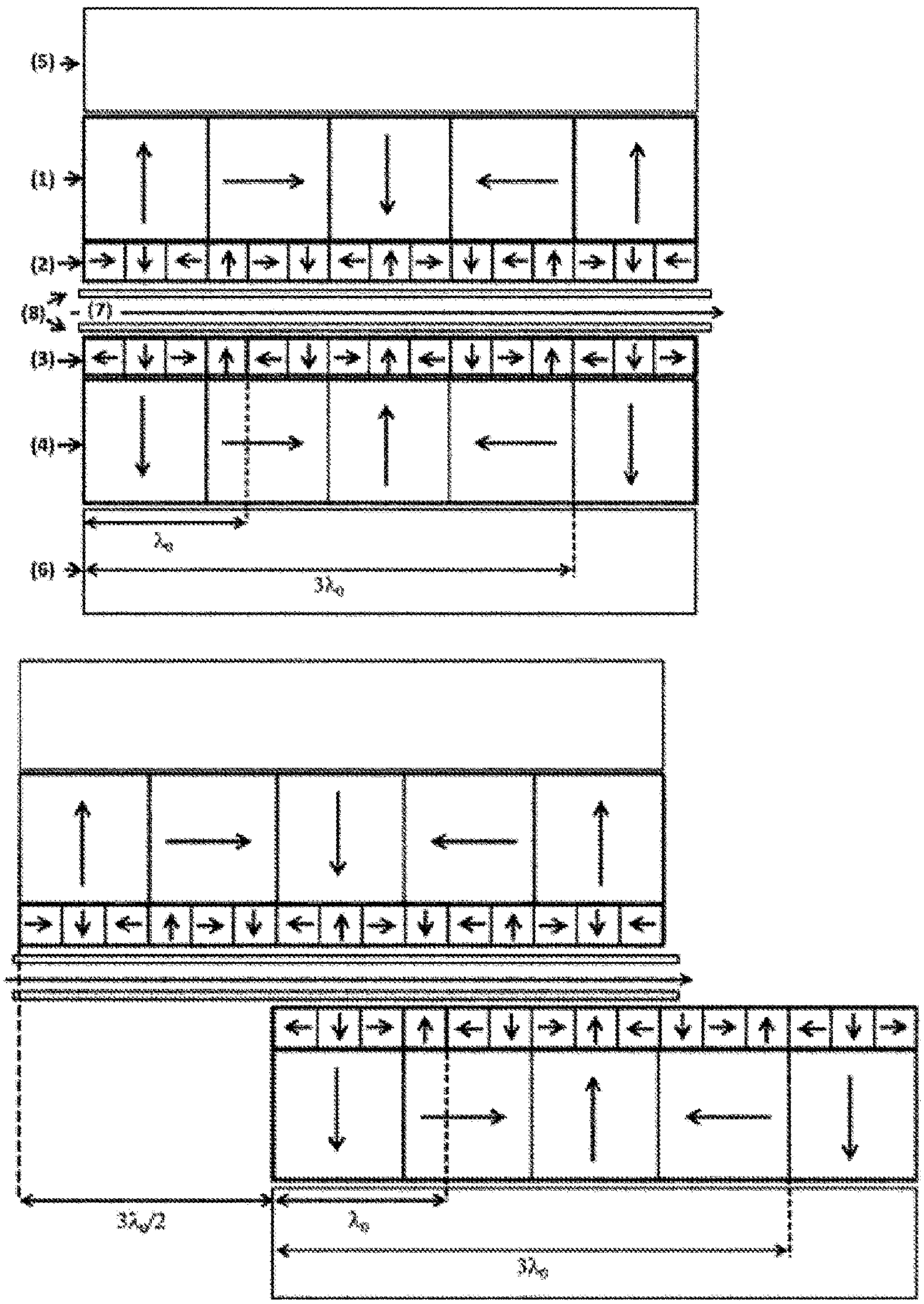

[Fig. 13b]
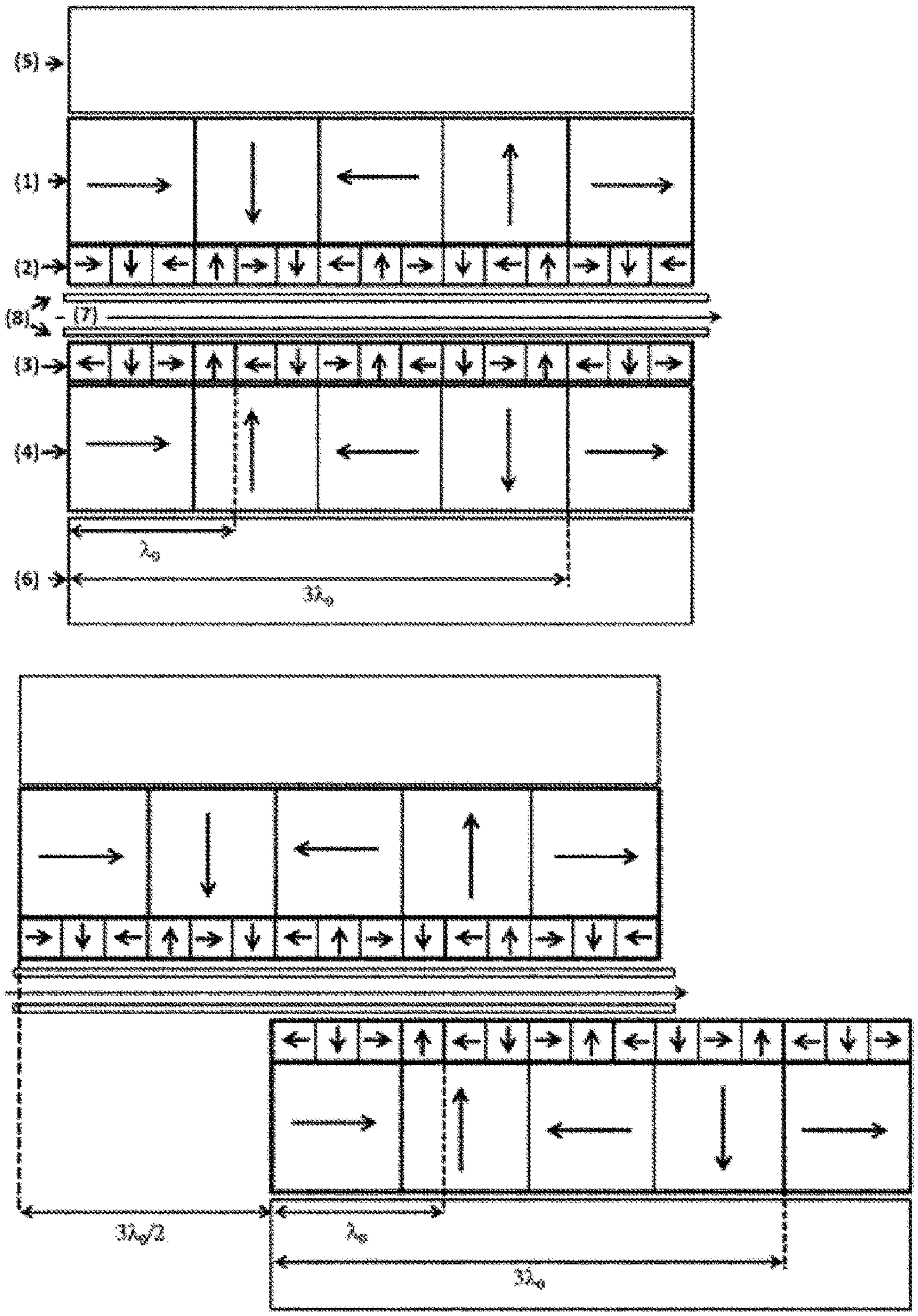

[Fig. 13c]
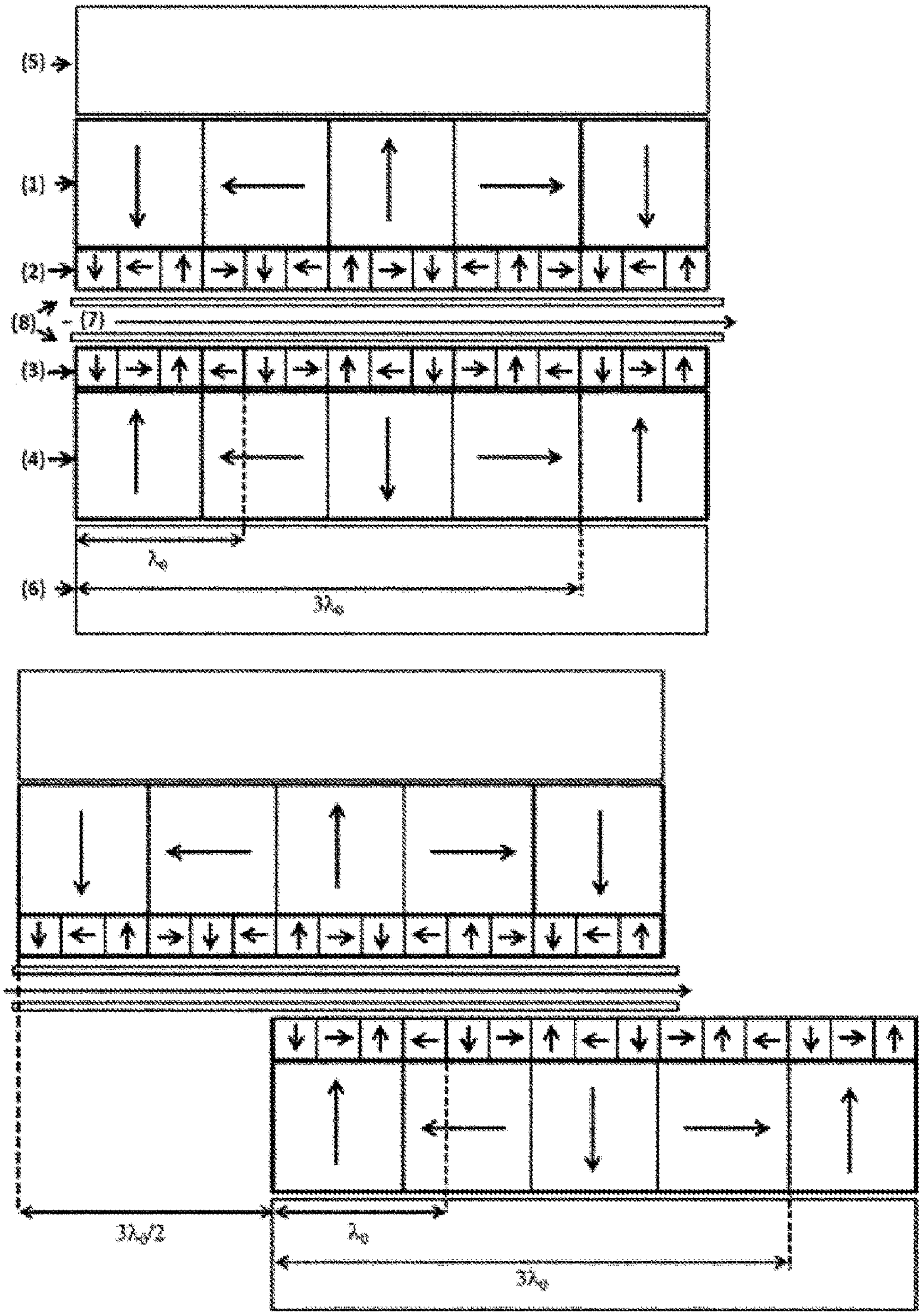

[Fig. 13d]
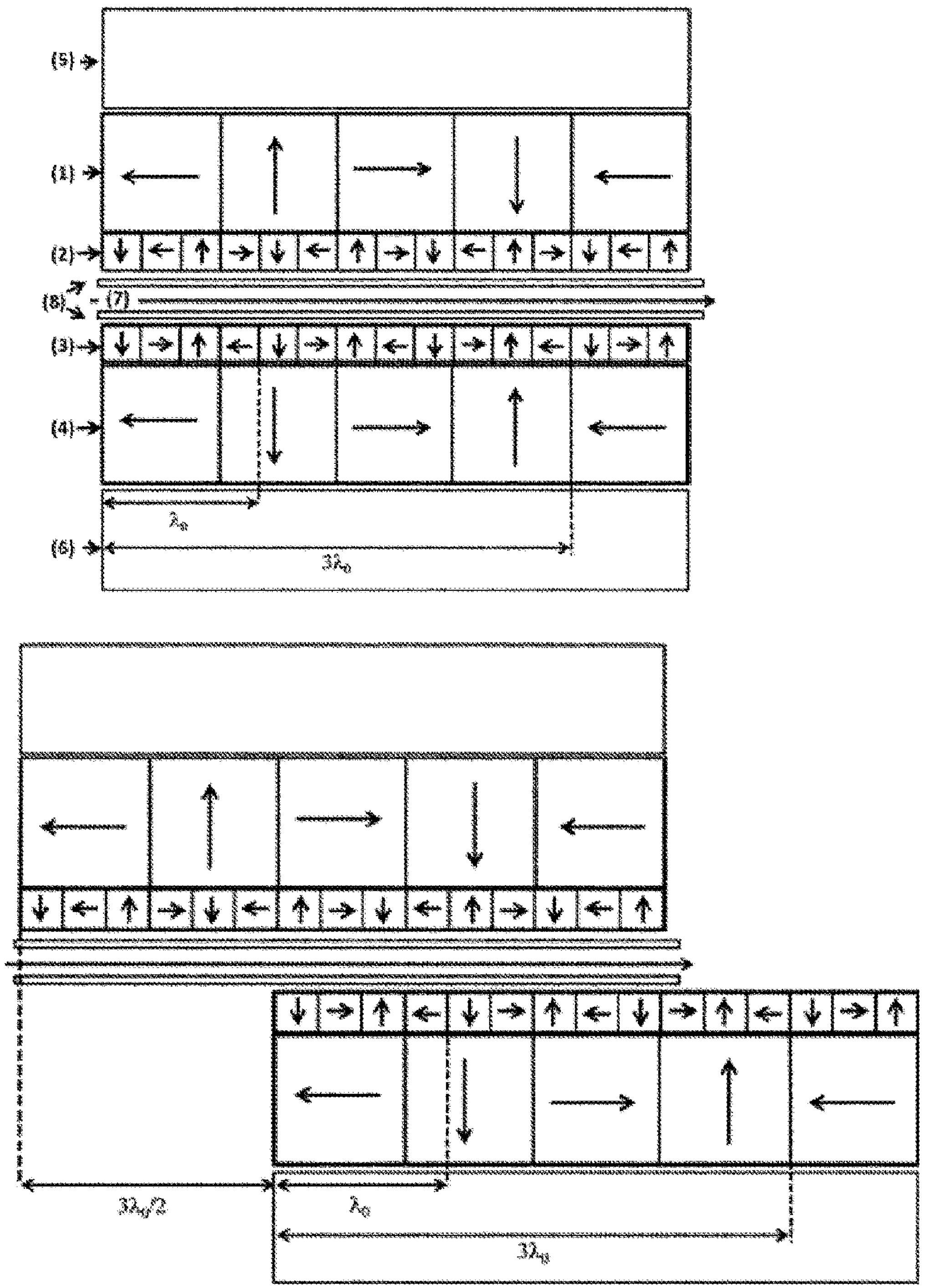

[Fig. 14a]
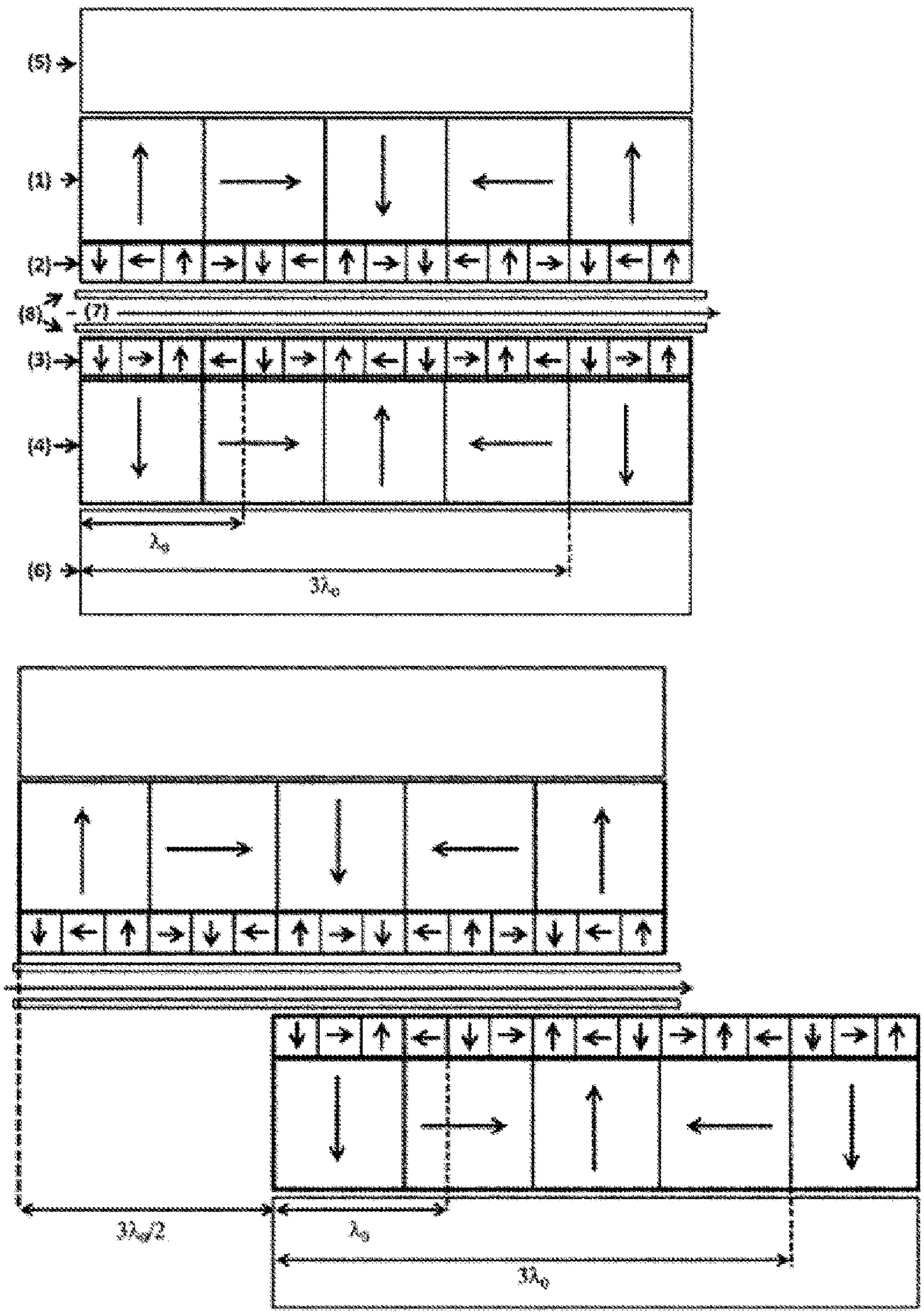

[Fig. 14b]
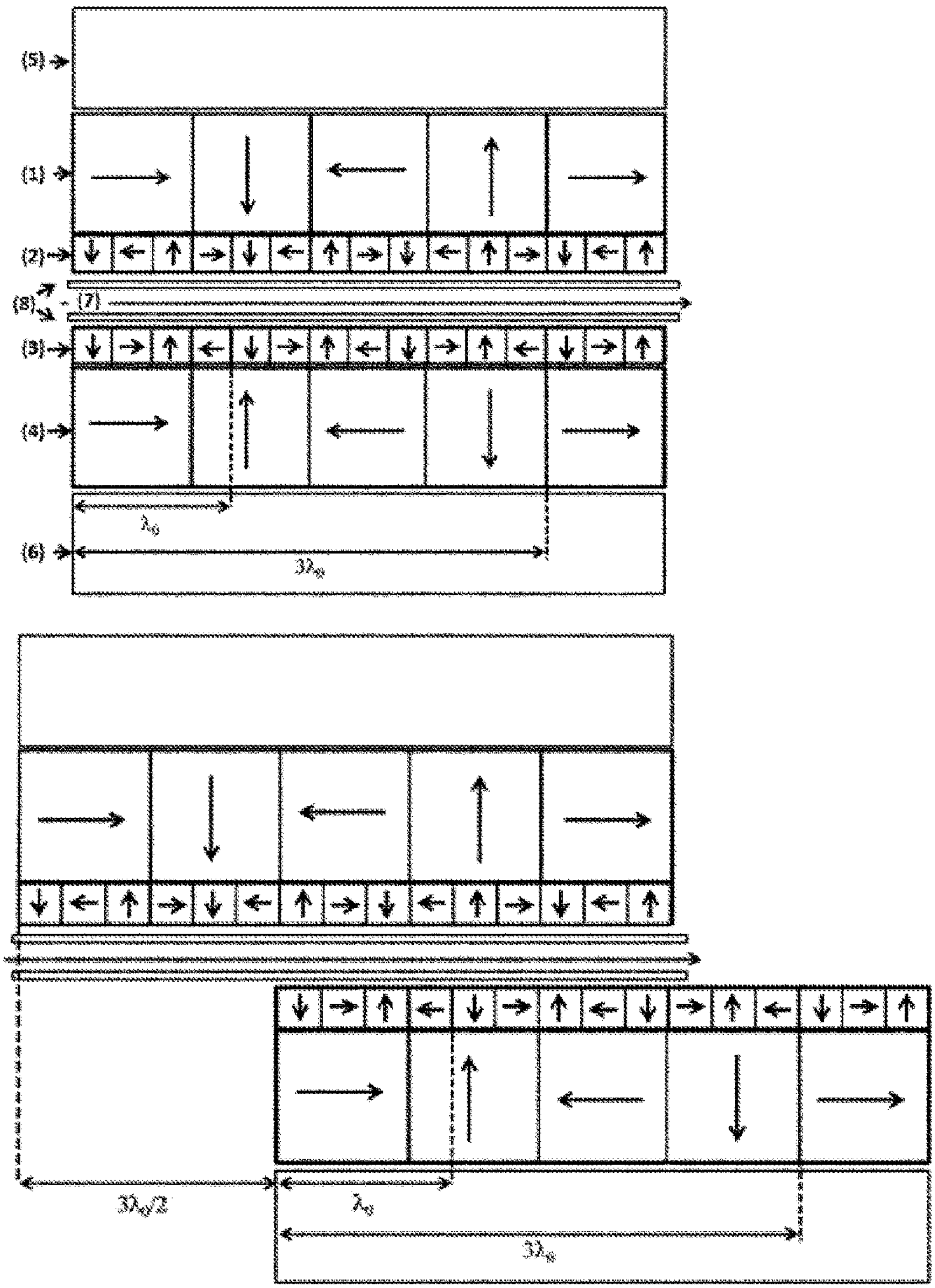

[Fig. 14c]
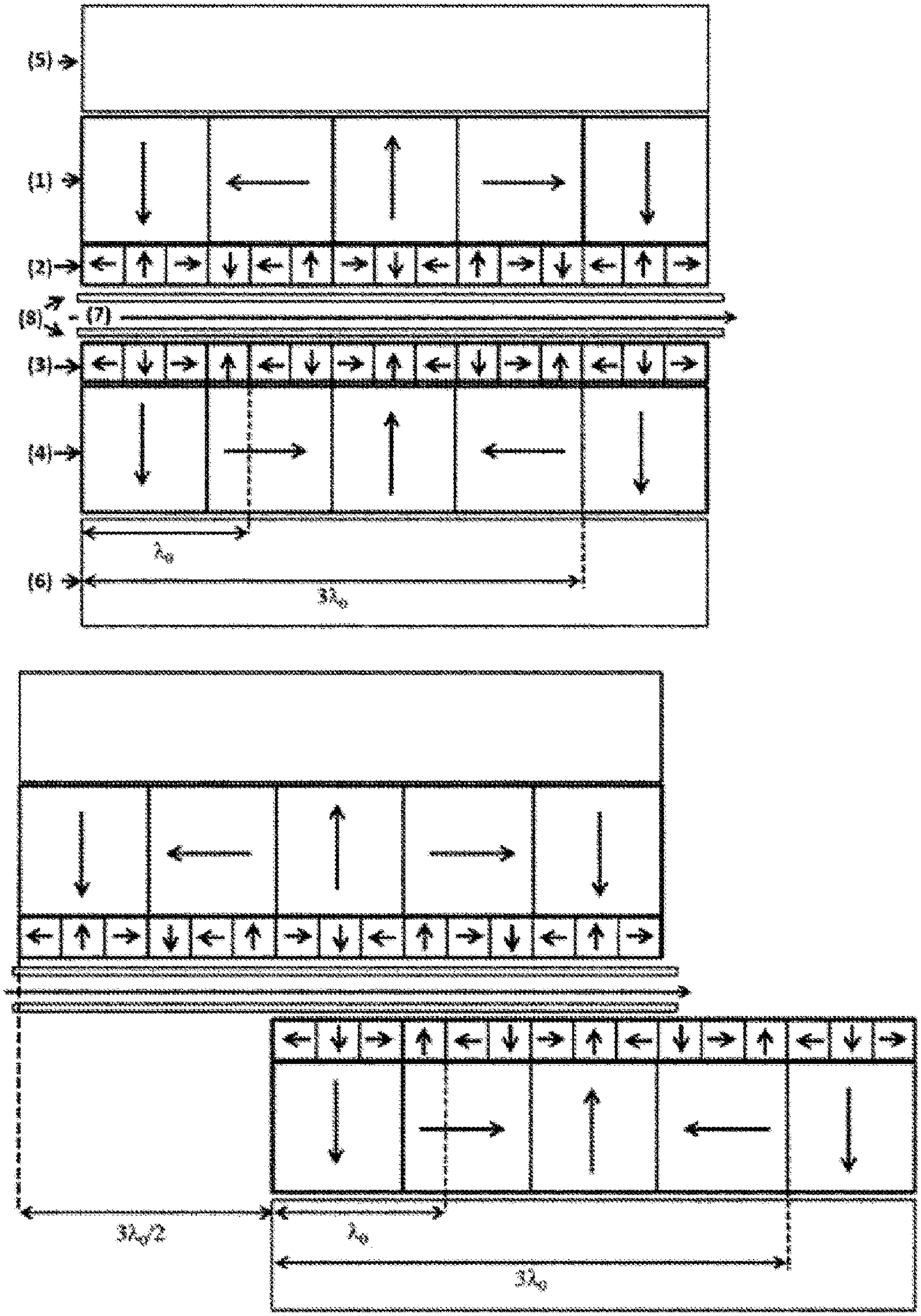

[Fig. 14d]
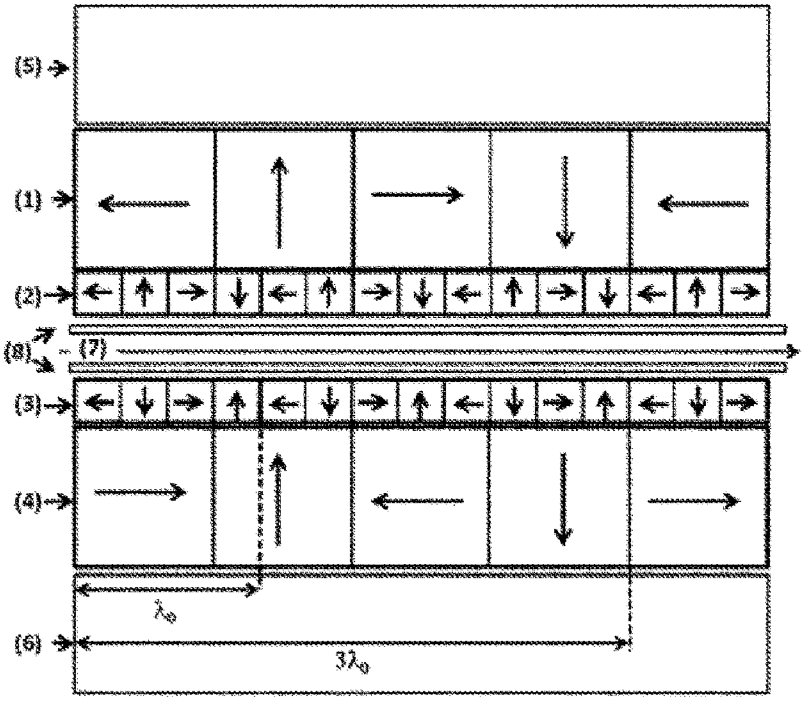
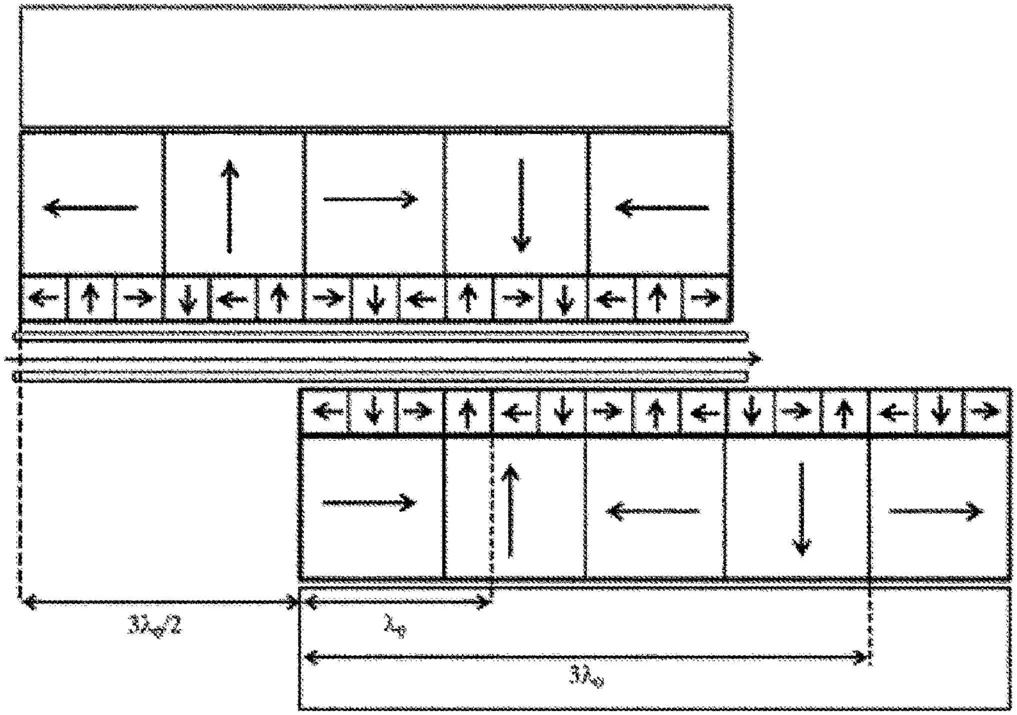

[Fig. 15a]
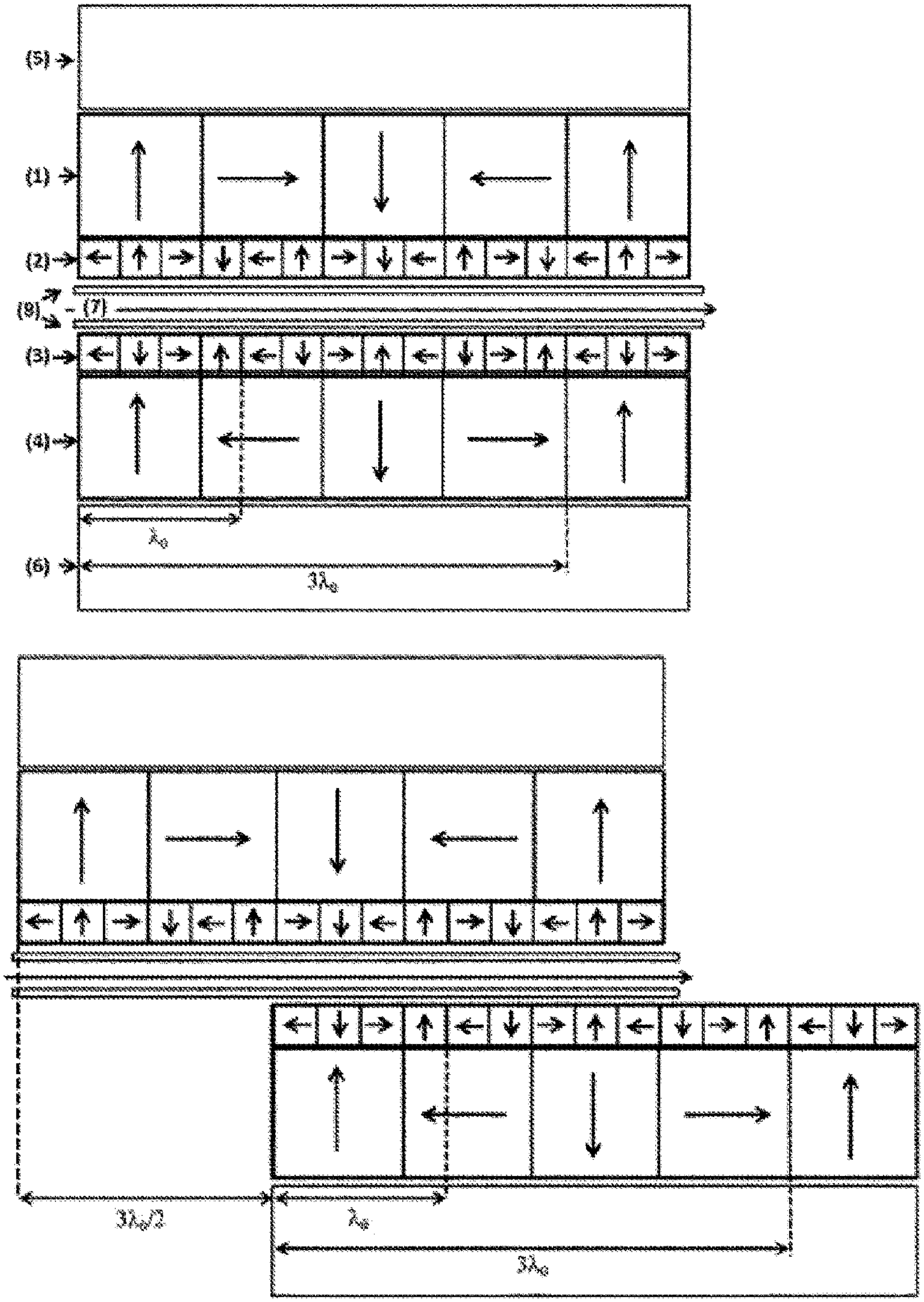

[Fig. 15b]
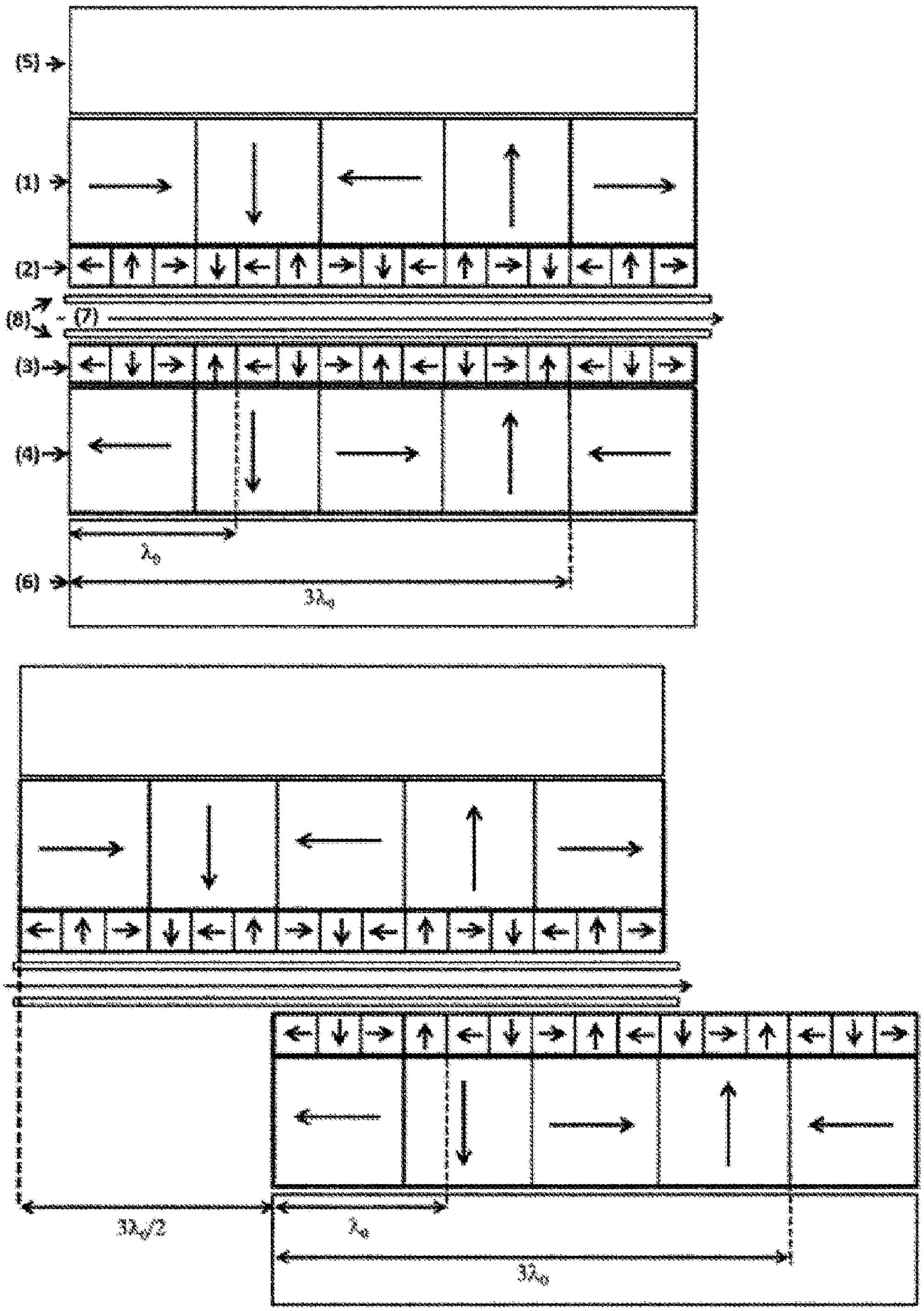

[Fig. 15c]
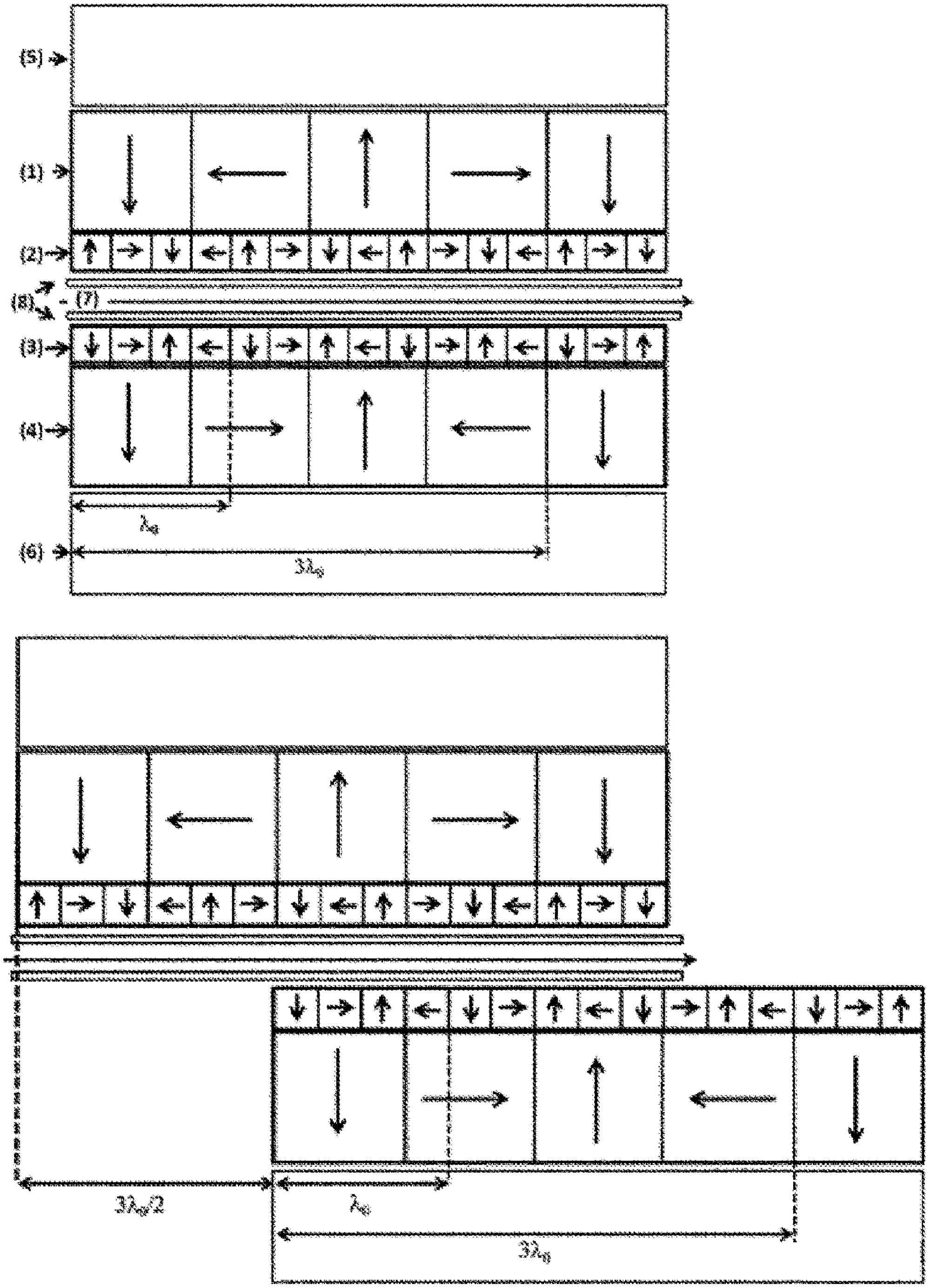

[Fig. 15d]
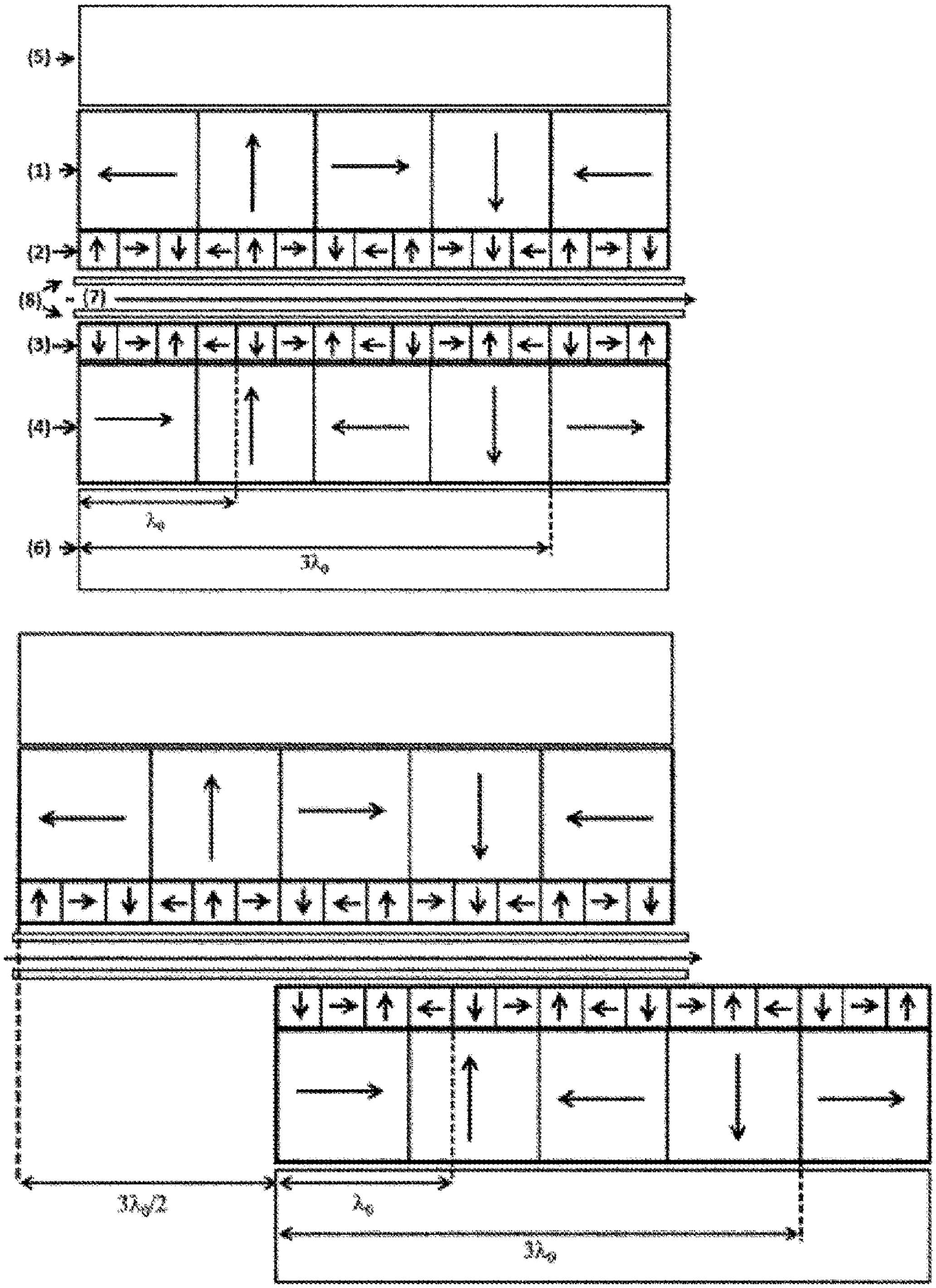

[Fig. 16a]
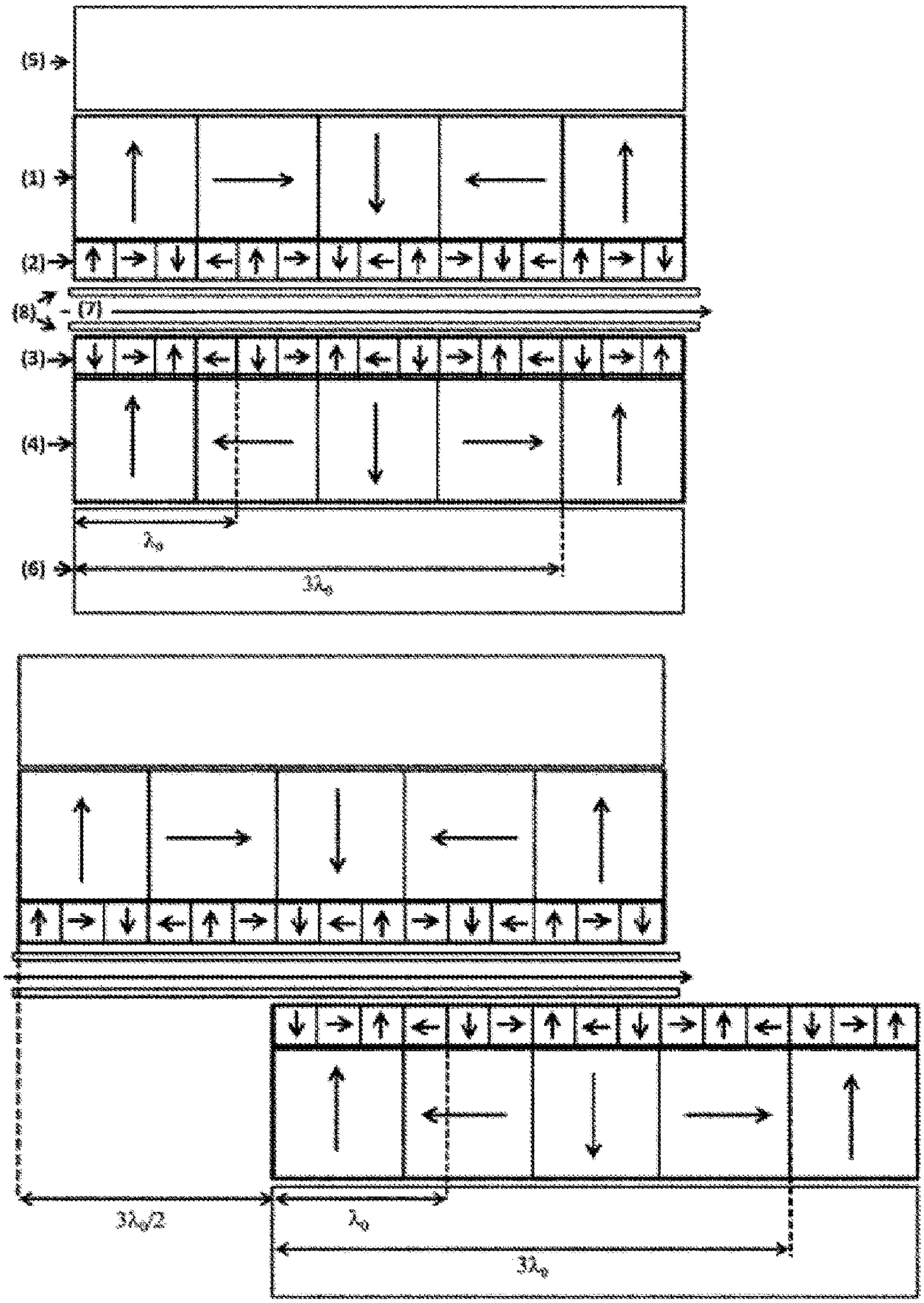

[Fig. 16b]
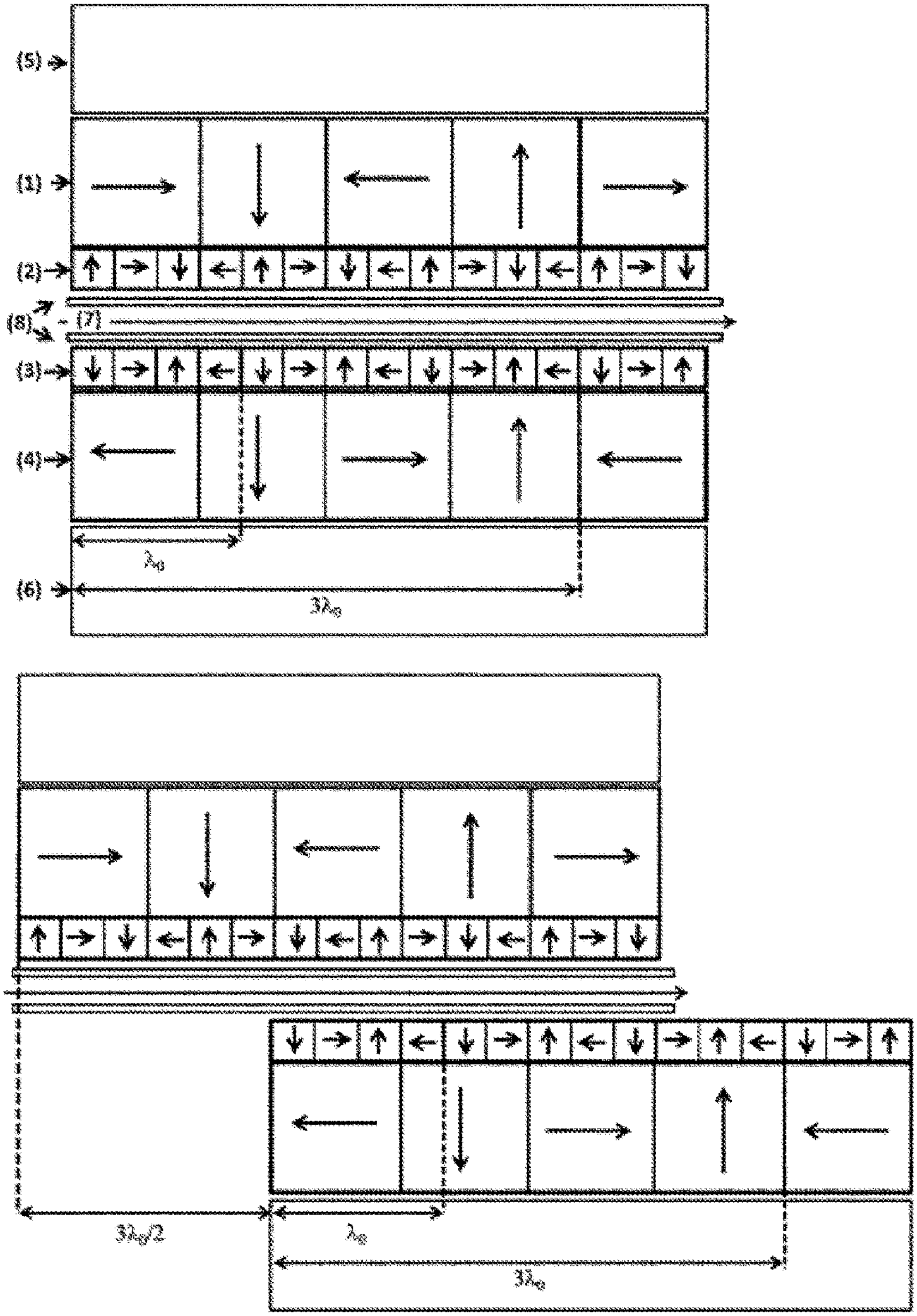

[Fig. 16c]
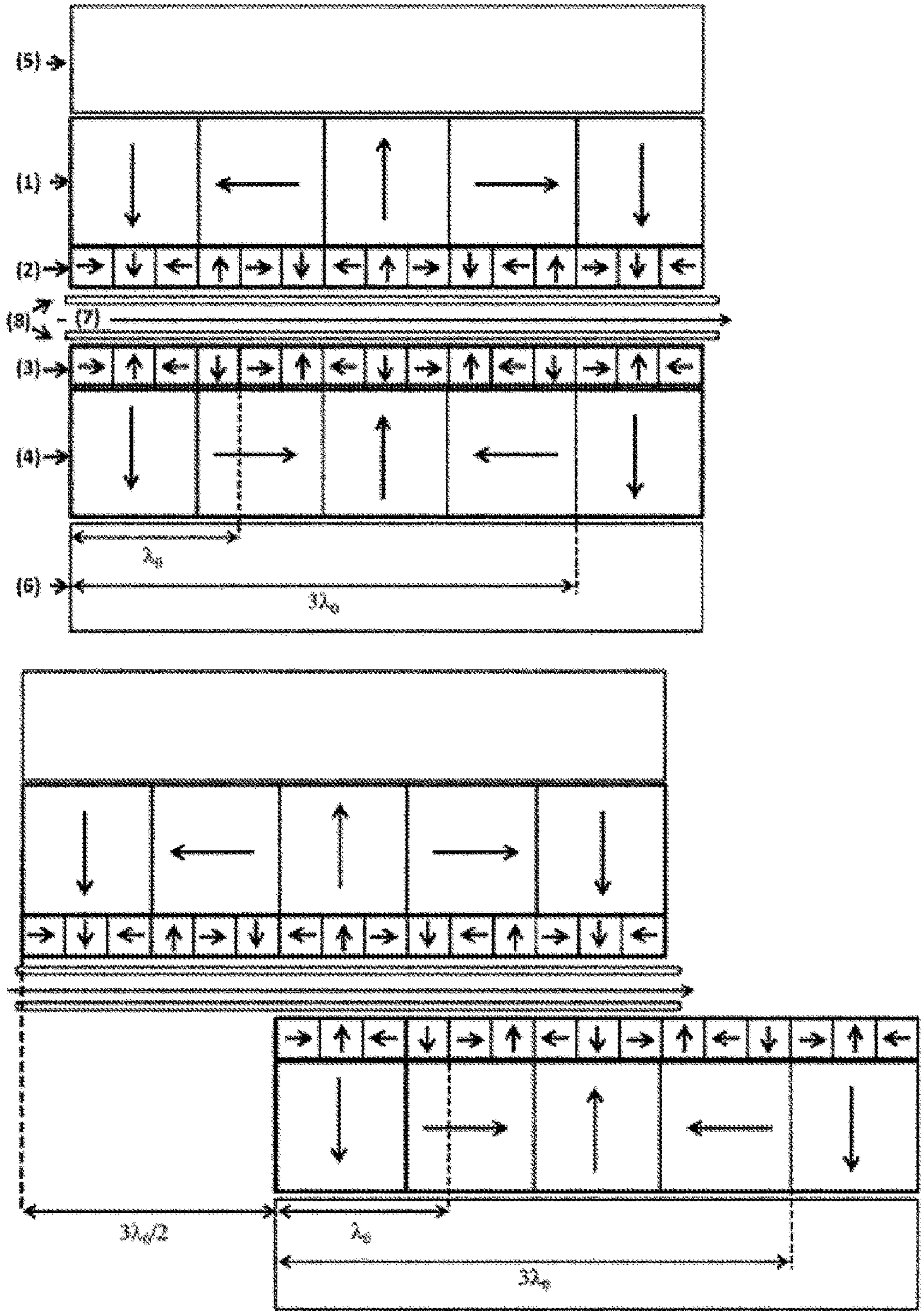

[Fig. 16d]
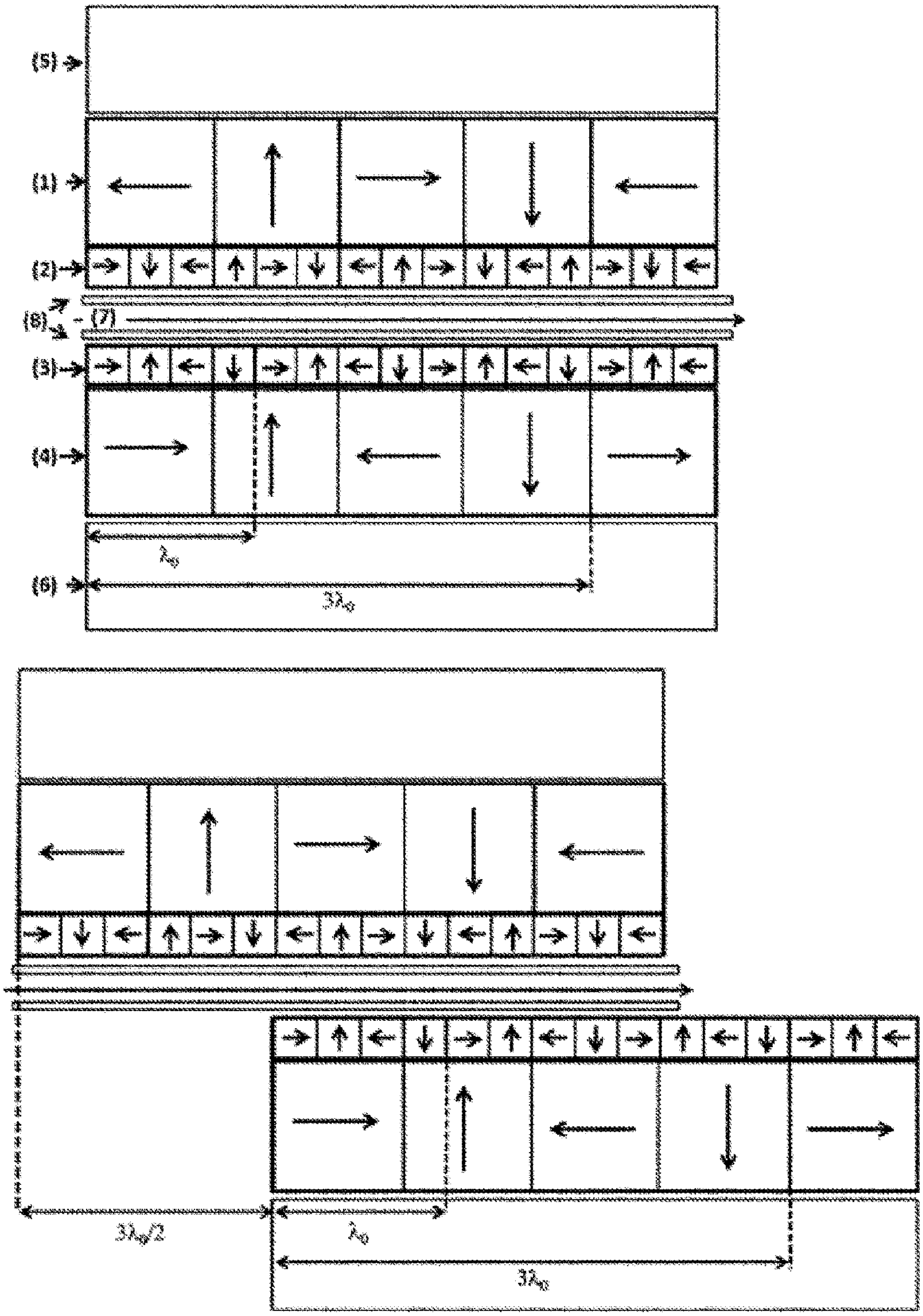

[Fig. 17]
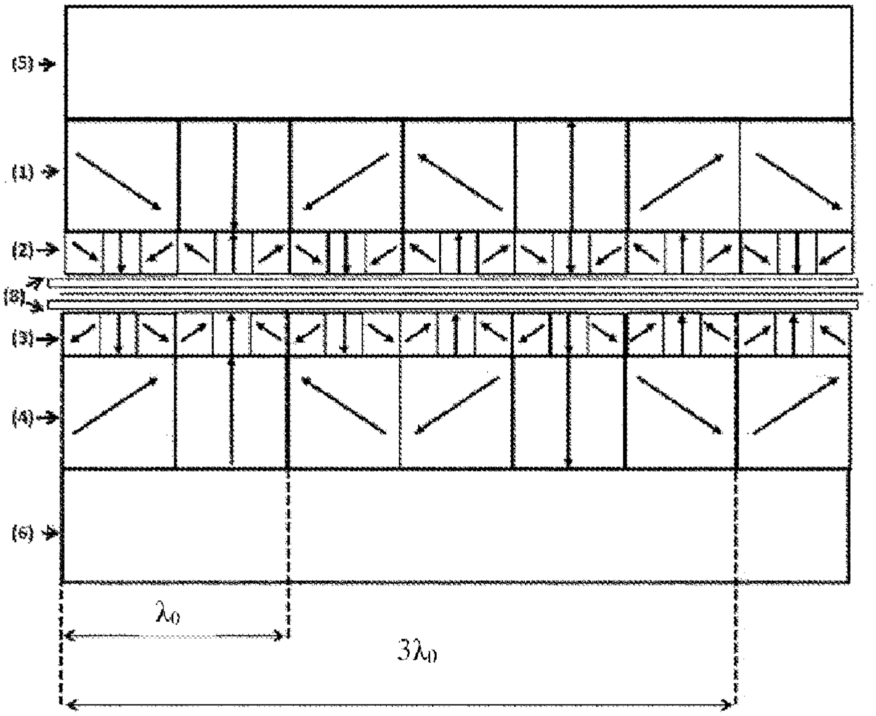
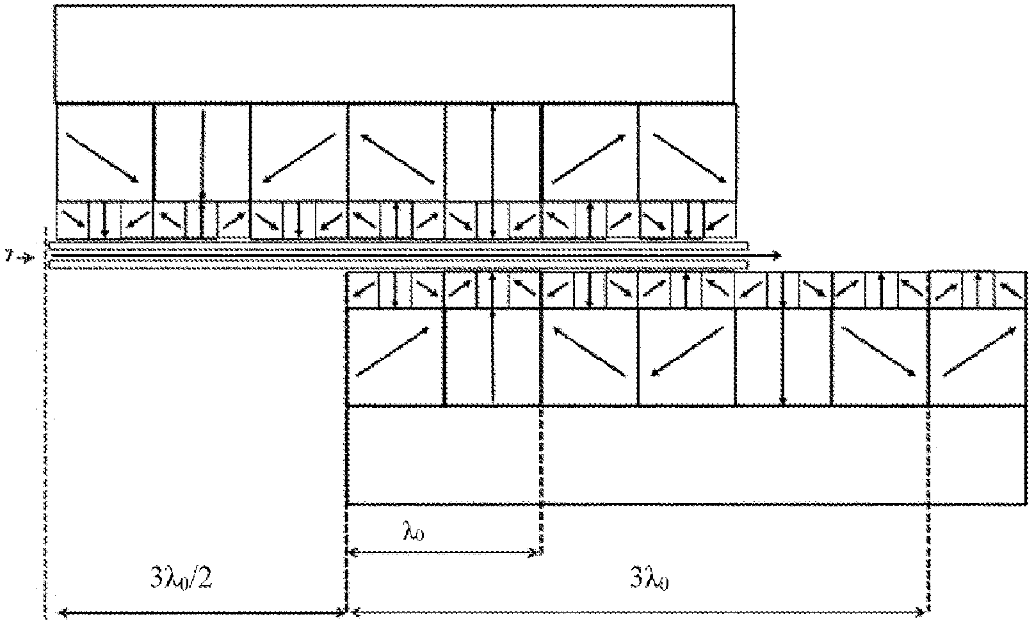

TWO-PERIOD INVERTER, ASSOCIATED METHOD, DEVICE AND INSTALLATION

BACKGROUND

The present invention relates to a two-period undulator. It also relates to an associated method, device and installation.

Such a device makes it possible to produce synchrotron light over a broad spectral range. The field of the invention is more particularly but non-limitatively that of synchrotron radiation.

An undulator is a device that generates a spatially periodic magnetic field. When charged particles (generally electrons) pass through this device, they are subjected to a force that imparts an oscillation motion thereto and they generate an electromagnetic wave. Owing to its spectral and optical qualities, the emitted radiation, called synchrotron radiation, is used as a tool to probe matter in many scientific fields (biology, chemistry, etc.). Undulators are characterized by their spatial period and their magnetic field, the main parameters that affect the spectral width of the emitted radiation. The stronger the magnetic field, the broader the spectral range covered but the greater the power produced. When intercepted by the items of equipment, this power generates heating that is responsible for pressure increases in the machine or in the beamlines, and deformations of mirrors.

A two-period undulator is a magnetic device composed of two selectable periodicities intended to produce synchrotron light over a broad spectral range.

In order to avoid overheating of the items of equipment, such as the mirrors, shutters or vacuum chambers, some synchrotron radiation centres have developed and constructed undulators having moderate power, with which the photon energy is adjusted preferably by changing the value of the magnetic period rather than the magnetic field.

For example, the CLS Synchrotron in Canada has constructed two undulators ("dual undulator") [1] having two different periods, respectively of 55 mm and 180 mm, to provide the beamline scientists with two complementary spectral ranges (15-200 eV and 200-1000 eV). Passing from one undulator to the other is performed by lateral displacement of the two magnetic devices mounted on a motor-driven stage.

This type of installation with dual undulators has the drawbacks of requiring high-capacity lifting equipment (15 tonnes) and sufficient lateral space (which is currently the case at CLS). In the new-generation compact installations lateral space is more restricted, due to the arrangement and the multiplicity of the curvature magnets which reduce the angle between two beamlines, making the "dual undulator" type of solution unsuitable.

Other synchrotrons are oriented towards undulators with "continuously variable" periods. These magnetic devices make it possible to generate moderate magnetic field levels by adapting the magnetic period to the desired photon energy. The APS Synchrotron in the United States and the BINP research centre in Russia collaborated to develop an undulator with a continuously variable period [2] [3] in which the permanent magnets are mounted on a pantograph. By virtue of the motor-driven progressive increase in the gap between the magnets, the period can be doubled or even tripled.

On the other hand, this type of device has the drawback of not making it possible to use the full length of the straight section on which it is installed, in particular when the magnetic period is selected at its minimum. The number of periods, and consequently the photon stream emitted, are therefore not optimum.

The DESY Synchrotron in Germany has developed an undulator composed of cylindrical permanent magnets [4] the period of which can vary, in principle, between twice the diameter of the magnets and infinity. This technical solution gives a great flexibility of use and access to a broad spectral range.

However, this solution has the drawbacks of requiring the management, control and maintenance of a large number of motors necessary for individually moving each of the magnets, which is complex, time-consuming and costly.

The aim of the present invention is to overcome all or part of these drawbacks, in particular to propose an undulator that generates a spatially periodic magnetic field according to at least two selectable periodicities:

- not requiring high-capacity lifting equipment, and/or
- not requiring too great a lateral space that is incompatible with an arrangement and a multiplicity of curvature magnets that reduce the angle between two beamlines, and/or
- making it possible to use the full length of the straight section on which it is installed, and/or
- not requiring the management, control and maintenance of a large number of motors necessary for individually moving each of the magnets and/or to propose a device and/or an installation and/or a method associated with such an undulator.

SUMMARY

This objective is achieved with a two-period undulator, comprising:

- a vacuum chamber extending along a longitudinal axis Y
- four series of permanent magnets installed at regular intervals along the axis Y, including a first, second, third and fourth series, these four series and the vacuum chamber being superposed, along an axis Z of the undulator perpendicular to the longitudinal axis Y, in the following successive order: first series, second series, vacuum chamber, third series, fourth series, these four series comprising:

- the first series of permanent magnets according to a spatial periodicity respectively of $(2n+1)\lambda_0$ or $2n\lambda_0$ along the longitudinal axis Y, where n is a positive integer, each period of the first series comprising $N_1$ permanent magnets successively along the axis Y, the magnetization of which rotates stepwise by $360/N_1$ degrees in a first direction about an axis X of the undulator perpendicular to the axes Y and Z
- the second series of permanent magnets according to a spatial periodicity of $\lambda_0$ along the longitudinal axis, each period of the second series comprising $N_2$ permanent magnets successively along the axis Y, the magnetization of which rotates stepwise by $360/N_2$ degrees in a second direction about the axis X
- the third series of permanent magnets according to a spatial periodicity of $\lambda_2$ along the longitudinal axis, each period of the third series comprising $N_3$ permanent magnets successively along the axis Y, the magnetization of which rotates stepwise by $360/N_3$ degrees in a third direction, preferably opposite to the second direction, about the axis X
- the fourth series of permanent magnets according to a spatial periodicity respectively of $(2n+1)\lambda_0$ or $2n\lambda_0$ along the longitudinal axis Y, each period of the fourth series comprising $N_4$ permanent magnets successively along the axis Y, the magnetization of which rotates stepwise by $360/N_4$ degrees in a fourth direction, preferably opposite to the first direction, about the axis X the undulator also comprising first displacement means arranged to alter, along the axis Y, with respect to a reference position along the axis Y, the relative position of the first and second series jointly with respect to the position of the third and fourth series jointly, by a distance respectively of $(2n+1)\lambda_0/2$ or $(2n-1)\lambda_0/2$, such that the undulator is located in an offset position along the axis Y.

Each of the first, second, third and fourth series comprises permanent magnets and can have at least one magnetization directed strictly along the axis Z.

The undulator according to the invention can comprise, between the reference position and the offset position:

a position for which the magnetizations along the axis Z of the magnets of the second and third series at one and the same position along the axis Y are in the same direction, and the magnetizations along the axis Z of the magnets of the first and fourth series at one and the same position along the axis Y are in opposite directions, and another position for which the magnetizations along the axis Z of the magnets of the second and third series at one and the same position along the axis Y are in opposite directions, and the magnetizations along the axis Z of the magnets of the first and fourth series at one and the same position along the axis Y are in the same direction.

Preferably, n=1, 2 or 3.

Preferably, n=1.

Preferably, in the reference position of the undulator:

along the axis Y, at least one or each position of a magnet of the first series corresponds to a position of a magnet of the fourth series, and/or along the axis Y, at least one or each position of a magnet with magnetization along the axis Z of the first series corresponds to a position of a magnet with magnetization along the axis Z of the fourth series, and/or along the axis Y, at least one or each position of a magnet with magnetization along the axis Y of the first series corresponds to a position of a magnet with magnetization along the axis Y of the fourth series, and/or along the axis Y, at least one or each position of a magnet of the second series corresponds to a position of a magnet of the third series, and/or along the axis Y, at least one or each position of a magnet with magnetization along the axis Z of the second series corresponds to a position of a magnet with magnetization along the axis Z of the third series, and/or along the axis Y, at least one or each position of a magnet with magnetization along the axis Y of the second series corresponds to a position of a magnet with magnetization along the axis Y of the third series.

Preferably, in the reference position of the undulator:

the magnetizations along the axis Y of the magnets of the second and third series at one and the same position along the axis Y are in opposite directions, and/or the magnetizations along the axis Z of the magnets of the second and third series at one and the same position along the axis Y are in the same direction, and/or the magnetizations along the axis Y of the magnets of the first and fourth series at one and the same position along the axis Y are in the same direction, and/or the magnetizations along the axis Z of the magnets of the first and fourth series at one and the same position along the axis Y are in opposite directions, or the magnetizations along the axis Y of the magnets of the second and third series at one and the same position along the axis Y are in the same direction, and/or the magnetizations along the axis Z of the magnets of the second and third series at one and the same position along the axis Y are in opposite directions, and/or the magnetizations along the axis Y of the magnets of the first and fourth series at one and the same position along the axis Y are in opposite directions, and/or the magnetizations along the axis Z of the magnets of the first and fourth series at one and the same position along the axis Y are in the same direction.

Preferably, in the offset position of the undulator:

along the axis Y, at least one or each position of a magnet with magnetization along the axis Z of the second series corresponds to a position of a magnet with magnetization along the axis Z of the third series, and/or along the axis Y, at least one or each position of a magnet with magnetization along the axis Y of the second series corresponds to a position of a magnet with magnetization along the axis Y of the third series.

Preferably, in the offset position of the undulator:

the magnetizations along the axis Y of the magnets of the second and third series at one and the same position along the axis Y are in the same direction, and/or the magnetizations along the axis Z of the magnets of the second and third series at one and the same position along the axis Y are in opposite directions, or the magnetizations along the axis Y of the magnets of the second and third series at one and the same position along the axis Y are in opposite directions, and/or the magnetizations along the axis Z of the magnets of the second and third series at one and the same position along the axis Y are in the same direction.

In a first case, the four series can comprise:

the first series of permanent magnets according to a spatial periodicity of $(2n+1)\lambda_0$ along the longitudinal axis Y, where n is a positive integer, each period of the first series comprising $N_1$ permanent magnets successively along the axis Y, the magnetization of which rotates stepwise by $360/N_1$ degrees in the first direction about an axis X perpendicular to the axes Y and Z the second series of permanent magnets according to a spatial periodicity of $\lambda_0$ along the longitudinal axis, each period of the second series comprising $N_2$ permanent magnets successively along the axis Y, the magnetization of which rotates stepwise by $360/N_2$ degrees in the second direction about the axis X the third series of permanent magnets according to a spatial periodicity of $\lambda_2$ along the longitudinal axis, each period of the third series comprising $N_3$ permanent magnets successively along the axis Y, the magnetization of which rotates stepwise by $360/N_3$ degrees in the third direction about the axis X the fourth series of permanent magnets according to a spatial periodicity respectively of $(2n+1)\lambda_0$ along the longitudinal axis Y, each period of the fourth series comprising $N_4$ permanent magnets successively along the axis Y, the magnetization of which rotates stepwise by $360/N_4$ degrees in the fourth direction about the axis X the first displacement means being arranged to alter along the axis Y, with respect to the reference position along the axis Y, the relative position of the first and second series jointly with respect to the position of the third and fourth series jointly, by a distance of $(2n+1)\lambda_0/2$, such that the undulator is located in its offset position along the axis Y.

In this first case, in the reference position of the undulator, preferably:

along the axis Y, at least one or each position of a magnet with magnetization along the axis Z of the first series is centred on a position of a magnet with magnetization along the axis Z of the second series respectively in opposite directions or in the same direction, and along the axis Y, at least one or each position of a magnet with magnetization along the axis Z of the fourth series is centred on a position of a magnet with magnetization along the axis Z of the third series respectively in the same direction or in opposite directions; and/or along the axis Y, at least one or each position of a magnet with magnetization along the axis Y of the first series is centred on a position of a magnet with magnetization along the axis Y of the second series respectively in the same direction or in opposite directions, and along the axis Y, at least one or each position of a magnet with magnetization along the axis Y of the fourth series is centred on a position of a magnet with magnetization along the axis Y of the third series respectively in opposite directions or in the same direction.

In this first case, in the offset position of the undulator, preferably:

along the axis Y, at least one or each position of a magnet with magnetization along the axis Z of the first series corresponds to a position of a magnet with magnetization along the axis Z of the fourth series, and/or along the axis Y, at least one or each position of a magnet with magnetization along the axis Y of the first series corresponds to a position of a magnet with magnetization along the axis Y of the fourth series.

In this first case, in the offset position of the undulator, preferably:

the magnetizations along the axis Y of the magnets of the first and fourth series at one and the same position along the axis Y are in opposite directions, and/or the magnetizations along the axis Z of the magnets of the first and fourth series at one and the same position along the axis Y are in the same direction, or the magnetizations along the axis Y of the magnets of the first and fourth series at one and the same position along the axis Y are in the same direction, and/or the magnetizations along the axis Z of the magnets of the first and fourth series at one and the same position along the axis Y are in opposite directions.

In a second case, these four series comprise:

the first series of permanent magnets according to a spatial periodicity of $2n\lambda_0$ along the longitudinal axis Y, where n is a positive integer, each period of the first series comprising $N_1$ permanent magnets successively along the axis Y, the magnetization of which rotates stepwise by $360/N_1$ degrees in the first direction about an axis X perpendicular to the axes Y and Z the second series of permanent magnets according to a spatial periodicity of $\lambda_0$ along the longitudinal axis, each period of the second series comprising $N_2$ permanent magnets successively along the axis Y, the magnetization of which rotates stepwise by $360/N_2$ degrees in the second direction about the axis X the third series of permanent magnets according to a spatial periodicity of $\lambda_0$ along the longitudinal axis, each period of the third series comprising $N_3$ permanent magnets successively along the axis Y, the magnetization of which rotates stepwise by $360/N_3$ degrees in the third direction about the axis X the fourth series of permanent magnets according to a spatial periodicity respectively of $2n\lambda_0$ along the longitudinal axis Y, each period of the fourth series comprising $N_4$ permanent magnets successively along the axis Y, the magnetization of which rotates stepwise by $360/N_4$ degrees in the fourth direction about the axis X the first displacement means being arranged to alter along the axis Y, with respect to the reference position along the axis Y, the relative position of the first and second series jointly with respect to the position of the third and fourth series jointly, by a distance of $(2n-1)\lambda_0/2$, such that the undulator is located in its offset position along the axis Y.

In this second case, preferably, in the reference position of the undulator:

along the axis Y, at least one or each position of a magnet with magnetization along the axis Z of the first series is centred on a position of a magnet with magnetization along the axis Z of the second series one time out of two in opposite directions then in the same direction, and along the axis Y, at least one or each position of a magnet with magnetization along the axis Z of the fourth series is centred on a position of a magnet with magnetization along the axis Z of the third series one time out of two in opposite directions then in the same direction; and/or along the axis Y, at least one or each position of a magnet with magnetization along the axis Y of the first series is centred on a position of a magnet with magnetization along the axis Z of the second series, and along the axis Y, at least one or each position of a magnet with magnetization along the axis Y of the fourth series is centred on a position of a magnet with magnetization along the axis Z of the third series.

The undulator according to the invention can also comprise second displacement means arranged to alter, along the axis Z, the relative position of the first and second series jointly with respect to the position of the third and fourth series jointly.

The vacuum chamber can be delimited at least partially by walls situated between the second and third series, and/or at least partially by walls of the second and third series.

Preferably:

$N_1=N_4$, and/or $N_2=N_3$, and/or $N_1=N_2=N_3=N_4$, and/or $N_1=4$, and/or $N_2=4$, and/or $N_3=4$, and/or $N_4=4$.

According to yet another aspect of the invention, a device is proposed comprising several undulators according to the invention mounted at different angular positions to one another about the axis Y and centred on one and the same vacuum chamber.

The device according to the invention can comprise two undulators according to the invention mounted at 90° to one another about the axis Y and centred on one and the same vacuum chamber, such that:

the axes Y of the two undulators are merged the axis X of the first undulator corresponds to the axis Z of the second undulator the axis Z of the first undulator corresponds to the axis X of the second undulator.

According to yet another aspect of the invention, an installation is proposed such as a particle accelerator comprising an undulator according to the invention and/or a device according to the invention.

According to another aspect of the invention, a method is proposed implemented by means of a two-period undulator, said undulator comprising:

a vacuum chamber extending along a longitudinal axis Y four series of permanent magnets installed at regular intervals along the axis Y, including a first, second, third and fourth series, these four series and the vacuum chamber being superposed, along an axis Z of the undulator perpendicular to the longitudinal axis Y, in the following successive order: first series, second series, vacuum chamber, third series, fourth series, these four series comprising:

the first series of permanent magnets according to a spatial periodicity respectively of $(2n+1)\lambda_0$ or $2n\lambda_0$ along the longitudinal axis Y, where n is a positive integer, each period of the first series comprising $N_1$ permanent magnets successively along the axis Y, the magnetization of which rotates stepwise by $360/N_1$ degrees in a first direction about an axis X of the undulator perpendicular to the axes Y and Z the second series of permanent magnets according to a spatial periodicity of $\lambda_0$ along the longitudinal axis, each period of the second series comprising $N_2$ permanent magnets successively along the axis Y, the magnetization of which rotates stepwise by $360/N_2$ degrees in a second direction about the axis X the third series of permanent magnets according to a spatial periodicity of $\lambda_0$ along the longitudinal axis, each period of the third series comprising $N_3$ permanent magnets successively along the axis Y, the magnetization of which rotates stepwise by $360/N_3$ degrees in a third direction, preferably opposite to the second direction, about the axis X the fourth series of permanent magnets according to a spatial periodicity respectively of $(2n+1)\lambda_0$ or $2n\lambda_0$ along the longitudinal axis Y, each period of the fourth series comprising $N_4$ permanent magnets successively along the axis Y, the magnetization of which rotates stepwise by $360/N_4$ degrees in a fourth direction, preferably opposite to the first direction, about the axis X said method being characterized in that it comprises a displacement of all or part of the series, by first displacement means, so as to alter along the axis Y, with respect to a reference position along the axis Y, the relative position of the first and second series jointly with respect to the position of the third and fourth series jointly, by a distance respectively of $(2n+1)\lambda_0/2$ or $(2-1)\lambda_0/2$, such that the undulator is located in an offset position along the axis Y.

Each of the first, second, third and fourth series can comprise permanent magnets having a magnetization directed strictly along the axis Z.

There may be, between the reference position and the offset position:

a position for which the magnetizations along the axis Z of the magnets of the second and third series at one and the same position along the axis Y are in the same direction, and the magnetizations along the axis Z of the magnets of the first and fourth series at one and the same position along the axis Y are in opposite directions, and another position for which the magnetizations along the axis Z of the magnets of the second and third series at one and the same position along the axis Y are in opposite directions, and the magnetizations along the axis Z of the magnets of the first and fourth series at one and the same position along the axis Y are in the same direction.

Preferably, n=1, 2 or 3.

Preferably n=1.

Preferably, in the reference position of the undulator:

along the axis Y, at least one or each position of a magnet of the first series corresponds to a position of a magnet of the fourth series, and/or along the axis Y, at least one or each position of a magnet with magnetization along the axis Z of the first series corresponds to a position of a magnet with magnetization along the axis Z of the fourth series, and/or along the axis Y, at least one or each position of a magnet with magnetization along the axis Y of the first series corresponds to a position of a magnet with magnetization along the axis Y of the fourth series, and/or along the axis Y, at least one or each position of a magnet of the second series corresponds to a position of a magnet of the third series, and/or along the axis Y, at least one or each position of a magnet with magnetization along the axis Z of the second series corresponds to a position of a magnet with magnetization along the axis Z of the third series, and/or along the axis Y, at least one or each position of a magnet with magnetization along the axis Y of the second series corresponds to a position of a magnet with magnetization along the axis Y of the third series.

Preferably, in the reference position of the undulator:

the magnetizations along the axis Y of the magnets of the second and third series at one and the same position along the axis Y are in opposite directions, and/or the magnetizations along the axis Z of the magnets of the second and third series at one and the same position along the axis Y are in the same direction, and/or the magnetizations along the axis Y of the magnets of the first and fourth series at one and the same position along the axis Y are in the same direction, and/or the magnetizations along the axis Z of the magnets of the first and fourth series at one and the same position along the axis Y are in opposite directions, or the magnetizations along the axis Y of the magnets of the second and third series at one and the same position along the axis Y are in the same direction, and/or the magnetizations along the axis Z of the magnets of the second and third series at one and the same position along the axis Y are in opposite directions, and/or the magnetizations along the axis Y of the magnets of the first and fourth series at one and the same position along the axis Y are in opposite directions, and/or the magnetizations along the axis Z of the magnets of the first and fourth series at one and the same position along the axis Y are in the same direction.

Preferably, in the offset position of the undulator:

along the axis Y, at least one or each position of a magnet with magnetization along the axis Z of the second series corresponds to a position of a magnet with magnetization along the axis Z of the third series, and/or along the axis Y, at least one or each position of a magnet with magnetization along the axis Y of the second series corresponds to a position of a magnet with magnetization along the axis Y of the third series.

Preferably, in the offset position of the undulator:

the magnetizations along the axis Y of the magnets of the second and third series at one and the same position along the axis Y are in the same direction, and/or the magnetizations along the axis Z of the magnets of the second and third series at one and the same position along the axis Y are in opposite directions, or the magnetizations along the axis Y of the magnets of the second and third series at one and the same position along the axis Y are in opposite directions, and/or the magnetizations along the axis Z of the magnets of the second and third series at one and the same position along the axis Y are in the same direction.

In a first case, the four series can comprise:

the first series of permanent magnets according to a spatial periodicity of $(2n+1)\lambda_0$ along the longitudinal axis Y, where n is a positive integer, each period of the first series comprising $N_1$ permanent magnets successively along the axis Y, the magnetization of which rotates stepwise by $360/N_1$ degrees in the first direction about an axis X perpendicular to the axes Y and Z the second series of permanent magnets according to a spatial periodicity of $\lambda_0$ along the longitudinal axis, each period of the second series comprising $N_2$ permanent magnets successively along the axis Y, the magnetization of which rotates stepwise by $360/N_2$ degrees in the second direction about the axis X the third series of permanent magnets according to a spatial periodicity of $\lambda_0$ along the longitudinal axis, each period of the third series comprising $N_3$ permanent magnets successively along the axis Y, the magnetization of which rotates stepwise by $360/N_3$ degrees in the third direction about the axis X the fourth series of permanent magnets according to a spatial periodicity respectively of $(2n+1)\lambda_0$ along the longitudinal axis Y, each period of the fourth series comprising $N_4$ permanent magnets successively along the axis Y, the magnetization of which rotates stepwise by $360/N_4$ degrees in the fourth direction about the axis X the first displacement means altering along the axis Y, with respect to the reference position along the axis Y, the relative position of the first and second series jointly with respect to the position of the third and fourth series jointly, by a distance of $(2n+1)\lambda_0/2$, such that the undulator is located in its offset position along the axis Y.

Preferably, in this first case, in the reference position of the undulator:

along the axis Y, at least one or each position of a magnet with magnetization along the axis Z of the first series is centred on a position of a magnet with magnetization along the axis Z of the second series respectively in opposite directions or in the same direction, and along the axis Y, at least one or each position of a magnet with magnetization along the axis Z of the fourth series is centred on a position of a magnet with magnetization along the axis Z of the third series respectively in the same direction or in opposite directions; and/or along the axis Y, at least one or each position of a magnet with magnetization along the axis Y of the first series is centred on a position of a magnet with magnetization along the axis Y of the second series respectively in the same direction or in opposite directions, and along the axis Y, at least one or each position of a magnet with magnetization along the axis Y of the fourth series is centred on a position of a magnet with magnetization along the axis Y of the third series respectively in opposite directions or in the same direction.

Preferably, in this first case, in the offset position of the undulator:

along the axis Y, at least one or each position of a magnet with magnetization along the axis Z of the first series corresponds to a position of a magnet with magnetization along the axis Z of the fourth series, and/or along the axis Y, at least one or each position of a magnet with magnetization along the axis Y of the first series corresponds to a position of a magnet with magnetization along the axis Y of the fourth series, and/or Preferably, in this first case, in the offset position of the undulator:

the magnetizations along the axis Y of the magnets of the first and fourth series at one and the same position along the axis Y are in opposite directions, and/or the magnetizations along the axis Z of the magnets of the first and fourth series at one and the same position along the axis Y are in the same direction, or the magnetizations along the axis Y of the magnets of the first and fourth series at one and the same position along the axis Y are in the same direction, and/or the magnetizations along the axis Z of the magnets of the first and fourth series at one and the same position along the axis Y are in opposite directions.

In a second case, the four series can comprise:

the first series of permanent magnets according to a spatial periodicity of $2\lambda_0$ along the longitudinal axis Y, where n is a positive integer, each period of the first series comprising $N_1$ permanent magnets successively along the axis Y, the magnetization of which rotates stepwise by $360/N_1$ degrees in the first direction about an axis X perpendicular to the axes Y and Z the second series of permanent magnets according to a spatial periodicity of $\lambda_0$ along the longitudinal axis, each period of the second series comprising $N_2$ permanent magnets successively along the axis Y, the magnetization of which rotates stepwise by $360/N_2$ degrees in the second direction about the axis X the third series of permanent magnets according to a spatial periodicity of $\lambda_0$ along the longitudinal axis, each period of the third series comprising $N_3$ permanent magnets successively along the axis Y, the magnetization of which rotates stepwise by $360/N_3$ degrees in the third direction about the axis X the fourth series of permanent magnets according to a spatial periodicity respectively of $2n\lambda_0$ along the longitudinal axis Y, each period of the fourth series comprising $N_4$ permanent magnets successively along the axis Y, the magnetization of which rotates stepwise by $360/N_4$ degrees in the fourth direction about the axis X the first displacement means altering along the axis Y, with respect to the reference position along the axis Y, the relative position of the first and second series jointly with respect to the position of the third and fourth series jointly, by a distance of $(2n-1)\lambda_0/2$, such that the undulator is located in its offset position along the axis Y.

Preferably, in this second case, in the reference position of the undulator:

along the axis Y, at least one or each position of a magnet with magnetization along the axis Z of the first series is centred on a position of a magnet with magnetization along the axis Z of the second series one time out of two in opposite directions then in the same direction, and along the axis Y, at least one or each position of a magnet with magnetization along the axis Z of the fourth series is centred on a position of a magnet with magnetization along the axis Z of the third series one time out of two in opposite directions then in the same direction; and/or along the axis Y, at least one or each position of a magnet with magnetization along the axis Y of the first series is centred on a position of a magnet with magnetization along the axis Z of the second series, and along the axis Y, at least one or each position of a magnet with magnetization along the axis Y of the fourth series is centred on a position of a magnet with magnetization along the axis Z of the third series.

The method according to the invention can also comprise a displacement, by second displacement means, altering, along the axis Z, the relative position of the first and second series jointly with respect to the position of the third and fourth series jointly.

The vacuum chamber can be delimited at least partially by walls situated between the second and third series, and/or at least partially by walls of the second and third series.

Preferably:

$N_1=N_4$, and/or $N_2=N_3$, and/or $N_1=N_2=N_3=N_4$, and/or $N_1=4$, and/or $N_2=4$, and/or $N_3=4$, and/or $N_4=4$.

The method according to the invention can be implemented by several undulators according to the invention mounted at different angular positions to one another about the axis Y and centred on one and the same vacuum chamber.

The method according to the invention can be implemented by two undulators according to the invention mounted at 90° to one another about the axis Y and centred on one and the same vacuum chamber, such that:

the axes Y of the two undulators are merged the axis X of the first undulator corresponds to the axis Z of the second undulator the axis Z of the first undulator corresponds to the axis X of the second undulator.

The method according to the invention can be implemented within an installation such as a particle accelerator.

BRIEF DESCRIPTION OF THE DRAWINGS

Other advantages and features of the invention will become apparent on reading the detailed description of implementations and embodiments which are in no way limitative, and from the following attached drawings:

FIG. 4 shows the distribution of the magnetic field of the second embodiment of an undulator (example of a periodicity $\lambda_0$ of 50 mm) by passing from the periodicity $\lambda_0$ to $5\lambda_0$, moving the offset from 0 to $5\lambda_0/2$ (passing from FIG. 4*a* to 4*b* corresponding to passing from FIG. 3*a* to 3*b*); the distribution of the magnetic field of the third embodiment of an undulator (example of a periodicity $\lambda_0$ of 50 mm) by passing from the periodicity $\lambda_0$ to $7\lambda_0$, moving the offset from 0 to $7\lambda_0/2$ (passing from FIG. 4*c* to 4*d* corresponding to passing from FIG. 3*c* to 3*d*); the distribution of the magnetic field of the fourth embodiment of an undulator (example of a periodicity $\lambda_0$ of 50 mm) by passing from the periodicity $\lambda_0$ to $9\lambda_0$, moving the offset from 0 to $9\lambda_0/2$ (passing from FIG. 4*e* to 4*f* corresponding to passing from FIG. 3*e* to 3*f*), FIG. 6 shows the distribution of the magnetic field of the fifth embodiment of an undulator (example of a periodicity λ0 of 50 mm) by passing from the periodicity $\lambda_0$ to $2\lambda_0$, moving the offset from 0 to $\lambda_0/2$ (passing from FIG. 6*a* to 6*b* corresponding to passing from FIG. 5*a* to 5*b*); the distribution of the magnetic field of the sixth embodiment of an undulator (example of a periodicity $\lambda_0$ of 50 mm) by passing from the periodicity $\lambda_0$ to $4\lambda_0$, moving the offset from 0 to $3\lambda_0/2$ (passing from FIGS. 6*c* to 6*d* corresponding to passing from FIG. 5*c* to 5*d*); the distribution of the magnetic field of the seventh embodiment of an undulator (example of a periodicity $\lambda_0$ of 50 mm) by passing from the periodicity $\lambda_0$ to $6\lambda_0$, moving the offset from 0 to $5\lambda_0/2$ (passing from FIG. 6*e* to 6*f* corresponding to passing from FIG. 5*e* to 5*f*), FIG. 7 is a partial front cross section view (central part b) of a profile section (left part a corresponding to a part of FIG. 1) and side view (right part c) of the first embodiment of an undulator according to the invention, FIG. 8 is a front cross section view of the first, second, third, fourth fifth, sixth or seventh embodiment of a two-period undulator according to the invention (left part a) and of an embodiment of a device according to the invention (right part b) having variable polarization comprising 2 undulators according to the invention “crossed”, each undulator being any one of the embodiments described above, the two undulators preferably being one and the same embodiment of an undulator according to the invention; the double-ended arrows indicate the movement of the jaws 5, 6 making it possible to adjust the amplitude of the magnetic field. The longitudinal movement of the girders is not shown in the figure, but each girder in (a) or (b) can be moved in the plane perpendicular to the figure, FIG. 9 In a, b, c & d of FIG. 9, each of the two parts shows two positions of a variant of the first embodiment of an undulator according to the invention, producing a magnetic field with a periodicity of $\lambda_0$ (on the left part of the figure) and $3\lambda_0$ (on the right part of the figure), FIG. 10 In a, b, c & d of FIG. 10, each of the two parts shows two positions of a variant of the first embodiment of an undulator according to the invention, producing a magnetic field with a periodicity of $\lambda_0$ (on the left part of the figure) and $3\lambda_0$ (on the right part of the figure), FIG. 11 In a, b, c & d of FIG. 11, each of the two parts shows two positions of a variant of the first embodiment of an undulator according to the invention, producing a magnetic field with a periodicity of $\lambda_0$ (on the left part of the figure) and $3\lambda_0$ (on the right part of the figure), FIG. 12 In a, b, c & d of FIG. 12, each of the two parts shows two positions of a variant of the first embodiment of an undulator according to the invention, producing a magnetic field with a periodicity of $\lambda_0$ (on the left part of the figure) and $3\lambda_0$ (on the right part of the figure), FIG. 13 In a, b, c & d of FIG. 13, each of the two parts shows two positions of a variant of the first embodiment of an undulator according to the invention, producing a magnetic field with a periodicity of $\lambda_0$ (on the left part of the figure) and $3\lambda_0$ (on the right part of the figure), FIG. 14 In a, b, c & d of FIG. 14, each of the two parts shows two positions of a variant of the first embodiment of an undulator according to the invention, producing a magnetic field with a periodicity of $\lambda_0$ (on the left part of the figure) and $3\lambda_0$ (on the right part of the figure), FIG. 15 In a, b, c & d of FIG. 15, each of the two parts shows two positions of a variant of the first embodiment of an undulator according to the invention, producing a magnetic field with a periodicity of $\lambda_0$ (on the left part of the figure) and $3\lambda_0$ (on the right part of the figure), FIG. 16 In a, b, c & d of FIG. 16, each of the two parts shows two positions of a variant of the first embodiment of an undulator according to the invention, producing a magnetic field with a periodicity of $\lambda_0$ (on the left part of the figure) and $3\lambda_0$ (on the right part of the figure), and FIG. 17 shows two positions of a variant of the first embodiment of an undulator according to the invention, producing a magnetic field with a periodicity of $\lambda_0$ (on the left part of the figure) and $3\lambda_0$ (on the right part of the figure).

DETAILED DESCRIPTION

Figures 1A, 1B:
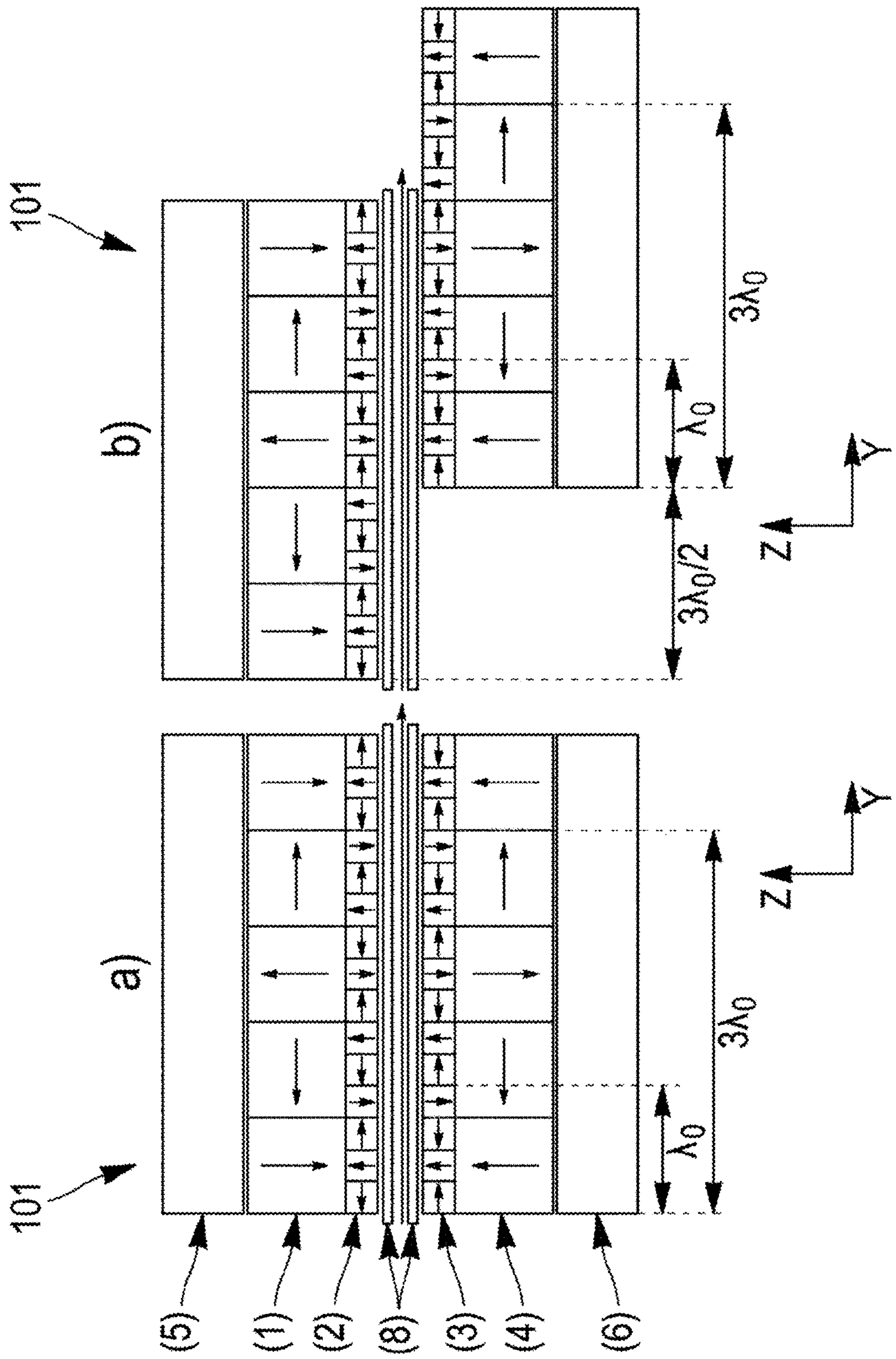
FIG. 1 is a profile cross section view of a first embodiment of an undulator 101 according to the invention, which is the preferred embodiment of the invention, the two parts a) and b) of this figure corresponding to two different positions of the undulator, producing a magnetic field with a periodicity of $\lambda_0$ (in part a of the figure) and $3\lambda_0$ (in part b of the figure); the arrows indicating the direction of magnetization of the permanent magnets.

As these embodiments are in no way limitative, it is possible in particular to consider variants of the invention comprising only a selection of the characteristics described or illustrated hereinafter, in isolation from the other characteristics described or illustrated (even if this selection is isolated within a sentence comprising these other characteristics), if this selection of characteristics is sufficient to confer a technical advantage or to differentiate the invention with respect to the state of the prior art. This selection comprises at least one, preferably functional, characteristic without structural details, and/or with only a part of the structural details if this part alone is sufficient to confer a technical advantage or to differentiate the invention with respect to the state of the prior art.

It is noted at the outset that each embodiment of an undulator according to the invention described hereinafter comprises:

- a vacuum chamber extending along a longitudinal axis Y 7
- four series 1, 2, 3, 4 of permanent magnets installed at regular intervals along the axis Y, including a first, second, third and fourth series, these four series and the vacuum chamber being superposed (regardless of whether the reading direction is vertical, horizontal, oblique, from top to bottom, from bottom to top, from left to right, from right to left, etc.), along a (preferably vertical) axis Z of the undulator perpendicular to the longitudinal axis Y (7), in the following successive order: first series, second series, vacuum chamber, third series, fourth series these four series comprising:

- the first series 1 of permanent magnets according to a spatial periodicity respectively of $(2n+1)\lambda_0$ in the case of FIGS. 1, 3 and 9 to 17 (or $2n\lambda_0$ in the case of FIG. 5) along the longitudinal axis Y (7), where n is a positive integer, each period of the first series comprising $N_1$ permanent magnets successively along the increasing Y-axis, the magnetization of which rotates stepwise by $360/N_1$ degrees in a first direction of rotation (for example clockwise) about a (preferably horizontal) axis X of the undulator perpendicular to the axes Y and Z
- the second series 2 of permanent magnets according to a spatial periodicity of $\lambda_0$ along the longitudinal axis 7, each period of the second series comprising $N_2$ permanent magnets successively along the increasing Y-axis, the magnetization of which rotates stepwise by $360/N_2$ degrees in a second direction about the axis X (preferably identical to the first direction)
- the third series 3 of permanent magnets according to a spatial periodicity of $\lambda_0$ along the longitudinal axis 7, each period of the third series comprising $N_3$ permanent magnets successively along the increasing Y-axis, the magnetization of which rotates stepwise by $360/N_3$ degrees in a third direction of rotation (for example anticlockwise), preferably opposite to the second direction, about the axis X
- the fourth series 4 of permanent magnets according to a spatial periodicity respectively of $(2n+1)\lambda_0$ in the case of FIGS. 1, 3 and 9 to 17 (or $2n_0$ in the case of FIG. 5) along the longitudinal axis Y (7), each period of the fourth series comprising $N_4$ permanent magnets successively along the increasing Y-axis, the magnetization of which rotates stepwise by $360/N_4$ degrees in a fourth direction of rotation, preferably opposite to the first direction, about the axis X the undulator also comprising first motor-driven displacement means arranged to alter along the axis Y, with respect to a reference position along the axis Y, the relative position of the first and second series jointly with respect to the position of the third and fourth series jointly, by a distance respectively of $(2n+1)\lambda/2$ in the case of FIGS. 1, 3 and 9 to 17 (or $(2n-1)\lambda/2$ in the case of FIG. 5) such that the undulator is located in an offset position along the axis Y.

n is a positive integer.

For each of these 4 series, the magnets of the series are preferably in contact with one another without any intermediate material, but in a variant these permanent magnets of one series can be spaced apart by air and/or a vacuum and/or a ferromagnetic material and/or another material.

By "permanent magnet" is meant a "magnetic part that retains its magnetization after having been subjected to a magnetic field".

Typically, each magnet of each series 1, 2, 3, 4 comprises a magnet made from samarium cobalt ($SmCo_5$ or $Sm_2Co_{17}$), neodymium iron boron (NdFeB) or praseodymium iron boron (PrFeB) having a parallelepiped, pyramidal or even a more complex shape (see FIG. 8) and volume dimensions typically comprised between 10 mm×10 mm×10 mm and 100 mm×100 mm×100 mm.

The first motor-driven displacement means are arranged to displace the series 1 and 2 and/or the series 3 and 4 along the axis Y.

The reference position corresponds to the minimum periodicity $\lambda_0$ of the undulator according to the invention.

The offset position corresponds to the maximum periodicity, respectively $(2n+1)\lambda_0$ in the case of FIGS. 1, 3 and 9 to 17 (or $2\lambda_0$ in the case of FIG. 5) of the undulator according to the invention.

Thus the invention makes it possible to solve the problem of multi-periodicity, by a particular magnetic arrangement, by combining two magnetic periodicities that are markedly distinct and by making it possible to chose either one periodicity or the other, by mechanical displacements. This "two-period undulator" device with a broad spectral range in fact replaces two undulators in order to make a single one only. It is compact, generates a limited power and brings to bear moderate magnetic forces.

Firstly, a first embodiment of an undulator 101 according to the invention will be described with reference to FIGS. 1, 2 and 7.

In the undulator 101 the four series comprise:

the first series (1) of permanent magnets according to a spatial periodicity of $(2n+1)\lambda_0$ along the longitudinal axis Y (7), where n is a positive integer, each period of the first series comprising $N_1$ permanent magnets successively along the axis Y, the magnetization of which rotates stepwise by $360/N_1$ degrees in the first direction about an axis X perpendicular to the axes Y and Z the second series (2) of permanent magnets according to a spatial periodicity of $\lambda_0$ along the longitudinal axis (7), each period of the second series comprising $N_2$ permanent magnets successively along the axis Y, the magnetization of which rotates stepwise by $360/N_2$ degrees in the second direction about the axis X the third series (3) of permanent magnets according to a spatial periodicity of to along the longitudinal axis (7), each period of the third series comprising $N_3$ permanent magnets successively along the axis Y, the magnetization of which rotates stepwise by $360/N_3$ degrees in the third direction about the axis X the fourth series (4) of permanent magnets according to a spatial periodicity respectively of $(2n+_1)\lambda_0$ along the longitudinal axis Y (7), each period of the fourth series comprising $N_4$ permanent magnets successively along the axis Y, the magnetization of which rotates stepwise by $360/N_4$ degrees in the fourth direction about the axis X the first displacement means being arranged to alter along the axis Y, with respect to the reference position along the axis Y, the relative position of the first and second series jointly with respect to the position of the third and fourth series jointly, by a distance of $(2n+1)\lambda_0/2$, such that the undulator is located in its offset position along the axis Y.

Note that $N_1=N_4$

Note that $N_2=N_3$

Note that $N_1=N_2=N_3=N_4$

Note that $N_1=N_4$

Note that $N_2=N_4$ $N_1$, $N_2$, $N_3$ and $N_4$ are positive integers.

$N_1$, $N_2$, $N_3$ and $N_4$ are even numbers.

$N_1$, $N_2$, $N_3$ and $N_4$ are multiples of four.

Further note that:

$N_1=N_2$ $N_3=N_4$ $N_3=4$ $N_4=4$

FIG. 1 shows the case n=1.

The undulator 101 also comprises second motor-driven displacement means arranged to alter, along the axis Z, the relative position of the first and second series jointly with respect to the position of the third and fourth series jointly.

These second displacement means are arranged to displace along the axis Z, the first and second series of magnets on one side, and the third and fourth series of magnets on another side, symmetrically with respect to the chamber, such that the chamber still remains centred between the first and second series of magnets on one side, and the third and fourth series of magnets on another side.

The first displacement means and/or the second displacement means (not shown) typically comprise:

For the vertical displacement (first means), two screws with left-hand thread, installed at the ends of the device, the rotation of which makes it possible to open or close the gap between the jaws (5) and (6). These screws are driven by stepping or DC motors providing a torque typically comprised between 1 Nm and 10 Nm.

For the longitudinal movement (second means), the girders are threaded and passed through by an endless screw, oriented in the longitudinal direction. Rotation of the screw by a stepping or DC motor causes the longitudinal displacement of one girder with respect to the other.

The vacuum chamber is delimited at least partially by walls 8 situated between the second 2 and third 3 series, and/or at least partially by walls of the second 2 and third 3 series.

These walls 8 are typically made from aluminium, copper or stainless steel. The two-period undulator 101 is based on the permanent magnet technology the arrangement of which is shown in FIG. 1. The magnetic device is constituted by the 4 series of magnets per period 1, 2, 3 and 4, the magnetization of which rotates by 90° from one magnet to the next along the axis 7 of propagation of the electrons.

The arrangement per sequence of 4 blocks of the series of magnets 2-3 and 1-4 constitutes the period 2 and the period $3\lambda_0$ of the device. The magnets of the series 1-2 and 3-4 are installed respectively on an upper jaw 5 and a lower jaw 6. The jaws 5, 6 are arranged to move away from or closer to one another along the axis Z by means of the second displacement means and can be mechanically offset along the axis 7 by the first displacement means.

The electrons flow in a vacuum chamber (delimited by the walls 8) where a high vacuum obtains.

Each jaw 5, 6 is typically made from aluminium or stainless steel.

The vertical movement of the jaws by the second displacement means makes it possible to reduce (or increase) the amplitude of the magnetic field by moving the jaws away from (or closer to) the jaws of the axis 7. In order to further reduce the distance between jaws, the vacuum chamber 8 can be dispensed with and the two jaws can be installed in a vacuum housing. The increase in gap between jaws will be equal to twice the thickness of the vacuum chamber.

The longitudinal movement (from left to right in FIG. 1, along the axis 7) between jaws 5, 6 serves to pass from the magnetic periodicity $\lambda_0$ to the periodicity $3\lambda_0$ and vice versa by applying a mechanical offset equal either to 0 or to $3\lambda_0/2$.

Figures 2A, 2B:
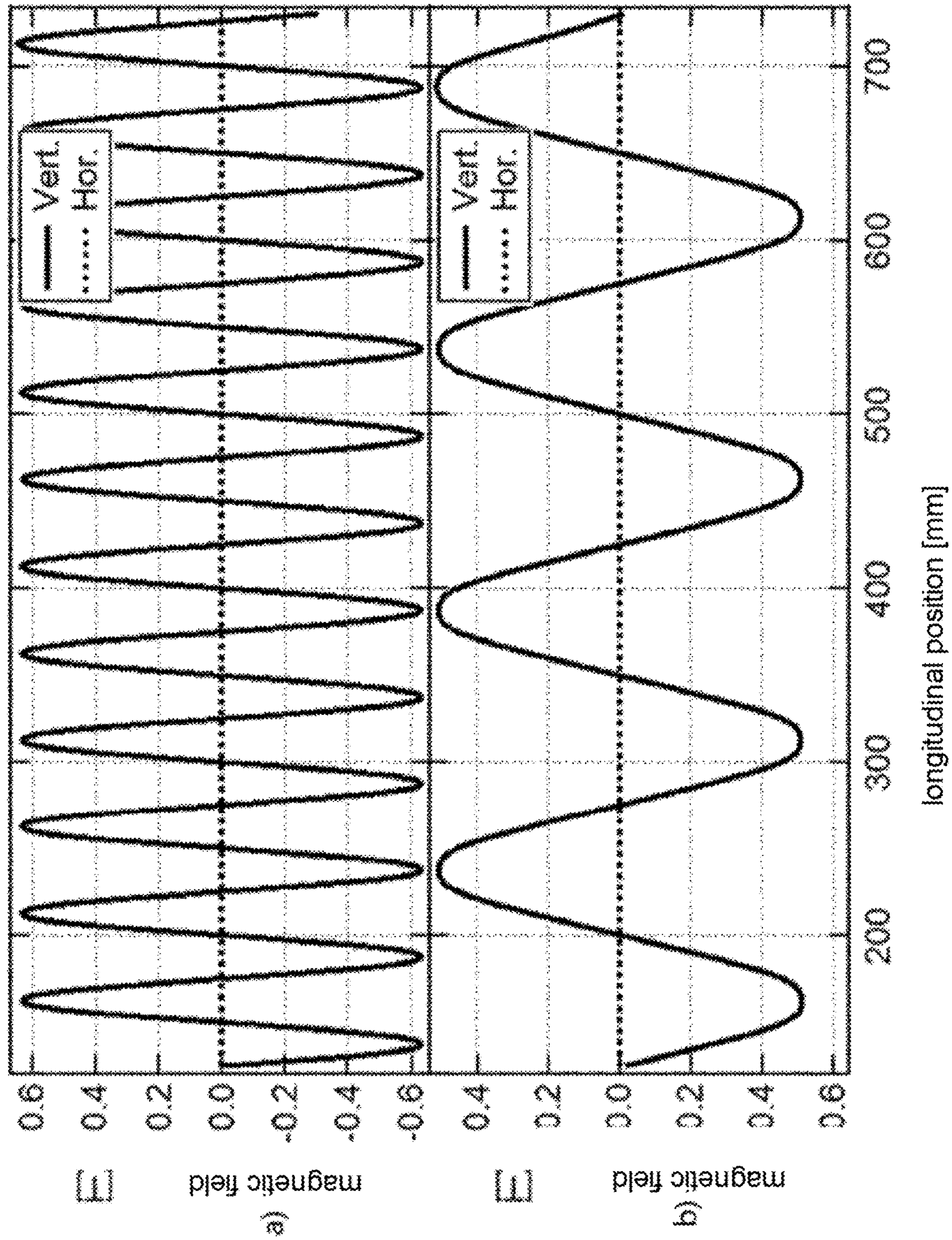
FIG. 2 shows the longitudinal profile of the magnetic field of the first embodiment of a two-period undulator when the mechanical offset is 0 [part a), corresponding to part a) in FIG. 1] or $3\lambda_0/2$ [part b), corresponding to part b) in FIG. 1]. This example is for a periodicity $\lambda_0$ of 50 mm.

FIG. 2 shows the magnetic field distributions for which the period is either $\lambda_0$ or $3\lambda_0$.

The magnets are mounted on supports 9 and 10 which respectively accommodate 1 magnet of series 1 per 3 magnets of series 2 or 1 magnet of series 4 per 3 magnets of series 3 and are fastened by screws 11 to the support. Any other fastening solution such as for example bonding or brazing can be envisaged.

Each support 9, 10 is typically made from aluminium or stainless steel.

The many individual supports containing one magnet of series 1 and 3 magnets of series 2 or 1 magnet of series 4 and 3 magnets of series 3 can also be replaced by two identical long girders (one upper girder and one lower girder) receiving all of the magnets.

Movement takes place vertically along the axis Z by the second displacement means, moving further apart or closer together the jaws 5 and 6 that each support the supports 9 and 10 equipped with their magnets.

Longitudinal movement along the axis Y is carried out by the first displacement means comprising a motor equipped with a reduction gear.

The positioning of one girder with respect to the other is ensured by a high-precision absolute linear optical encoder.

In summary, the two-period undulator replaces two undulators with a single one. With a magnetic period that can adopt two values, it constitutes a synchrotron radiation source with a broad spectral range and moderate power. Currently it is assessed that a power reduction by a factor of 5 to 10 can be obtained compared with a single-period undulator of the same spectral range.

Each of the first, second, third and fourth series comprises permanent magnets having at least one magnetization directed strictly along the axis Z.

Each of the first, second, third and fourth series also comprises permanent magnets having at least one magnetization directed strictly along the axis Y.

The undulator 101 comprises, between the reference position and the offset position:

- a position (reference position in FIG. 1*a*) for which the magnetizations along the axis Z of the magnets, at one and the same position along the axis Y, of the second and third series are in the same direction, and the magnetizations along the axis Z of the magnets, at one and the same position along the axis Y, of the first and fourth series are in opposite directions, and
- another position (offset position in FIG. 1*b*) for which the magnetizations along the axis Z of the magnets, at one and the same position along the axis Y, of the second and third series are in opposite directions, and the magnetizations along the axis Z of the magnets, at one and the same position along the axis Y, of the first and fourth series are in the same direction.

By "position of a magnet along the axis Y or 7" is meant the position of the geometric centre (typically the barycentre), viewed in the cross section along a plane (YOZ)) comprising the axes Z and Y (and corresponding to the plane of FIG. 1), of this magnet, measured along the axis Y or 7 (the position Y=0 being capable of being for example the position of the geometric centre (typically the barycentre) of the first magnet of the series 1 along Y viewed in the cross section along the plane (YOZ)) comprising the axes Z and Y).

Typically, for a magnet having a planar face (preferably rectangular or square) parallel to Y (and X) and oriented towards the chamber 8 and having a length L along Y (preferably corresponding to the length of one of the sides of this rectangular or square face) measured along the axis Y or 7, by "position of this magnet along the axis Y or 7" is meant the position of a point along the axis Y or 7 situated at the centre of this length L of this magnet.

In the reference position of the undulator 101:

- along the axis Y, at least one or each position of a magnet of the first series corresponds to a position of a magnet of the fourth series,
- along the axis Y, at least one or each position of a magnet with magnetization along the axis Z of the first series corresponds to a position of a magnet with magnetization along the axis Z of the fourth series,
- along the axis Y, at least one or each position of a magnet with magnetization along the axis Y of the first series corresponds to a position of a magnet with magnetization along the axis Y of the fourth series,
- along the axis Y, at least one or each position of a magnet of the second series corresponds to a position of a magnet of the third series,
- along the axis Y, at least one or each position of a magnet with magnetization along the axis Z of the second series corresponds to a position of a magnet with magnetization along the axis Z of the third series,
- along the axis Y, at least one or each position of a magnet with magnetization along the axis Y of the second series corresponds to a position of a magnet with magnetization along the axis Y of the third series.

In the reference position of the undulator 101:

- the magnetizations along the axis Y of the magnets of the second and third series at one and the same position along the axis Y are in opposite directions,
- the magnetizations along the axis Z of the magnets of the second and third series at one and the same position along the axis Y are in the same direction,
- the magnetizations along the axis Y of the magnets of the first and fourth series at one and the same position along the axis Y are in the same direction,
- the magnetizations along the axis Z of the magnets of the first and fourth series at one and the same position along the axis Y are in opposite directions.

In the reference position of the undulator 101:

- along the axis Y, at least one or each position of a magnet with magnetization along the axis Z of the first series is centred on a position of a magnet with magnetization along the axis Z of the second series in opposite directions, and
- along the axis Y, at least one or each position of a magnet with magnetization along the axis Z of the fourth series is centred on a position of a magnet with magnetization along the axis Z of the third series in the same direction;
- along the axis Y, at least one or each position of a magnet with magnetization along the axis Y of the first series is centred on a position of a magnet with magnetization along the axis Y of the second series respectively in the same direction, and
- along the axis Y, at least one or each position of a magnet with magnetization along the axis Y of the fourth series is centred on a position of a magnet with magnetization along the axis Y of the third series in opposite directions.

In the offset position of the undulator 101:

- along the axis Y, at least one or each position of a magnet with magnetization along the axis Z of the second series corresponds to a position of a magnet with magnetization along the axis Z of the third series,
- along the axis Y, at least one or each position of a magnet with magnetization along the axis Y of the second series corresponds to a position of a magnet with magnetization along the axis Y of the third series.

In the offset position of the undulator 101:

the magnetizations along the axis Y of the magnets of the second and third series at one and the same position along the axis Y are in the same direction, the magnetizations along the axis Z of the magnets of the second and third series at one and the same position along the axis Y are in opposite directions.

In the offset position of the undulator 101:

along the axis Y, at least one or each position of a magnet with magnetization along the axis Z of the first series corresponds to a position of a magnet with magnetization along the axis Z of the fourth series along the axis Y, at least one or each position of a magnet with magnetization along the axis Y of the first series corresponds to a position of a magnet with magnetization along the axis Y of the fourth series.

In the offset position of the undulator 101:

the magnetizations along the axis Y of the magnets of the first and fourth series at one and the same position along the axis Y are in opposite directions, the magnetizations along the axis Z of the magnets of the first and fourth series at one and the same position along the axis Y are in the same direction.

There will now be described, with reference to FIGS. 3 and 4, a second 102, third 103 and fourth 104 embodiment of an undulator according to the invention, referring only to the differences thereof with respect to the first embodiment 101.

Figure 3A:
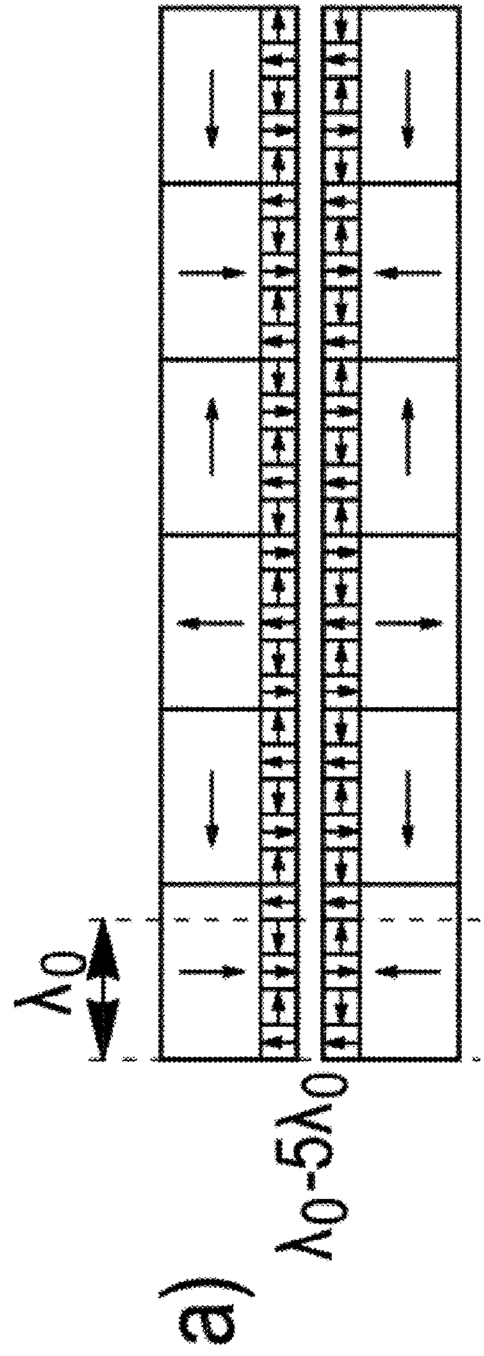
FIG. 3 is a profile cross section view of a second 102 (on parts a and b of the figure), third 103 (on parts c and d of the figure) and fourth 104 (on parts e and f of the figure) embodiment of an undulator according to the invention, functioning on the left from top to bottom at the periodicity $\lambda_0$ (parts a, c and e of the figure). On the right, from top to bottom, switchover respectively to the periodicity $5\lambda_0$ (part b of the figure), $7\lambda_0$ (part d of the figure) and $9\lambda_0$ (part f of the figure) by offsetting the upper jaw respectively by $5\lambda_0/2$ (part b of the figure), $7\lambda_0/2$ (part d of the figure) and $9\lambda_0/2$ (part f of the figure); the arrows indicate the direction of magnetization of the permanent magnets.
Figure 3B:
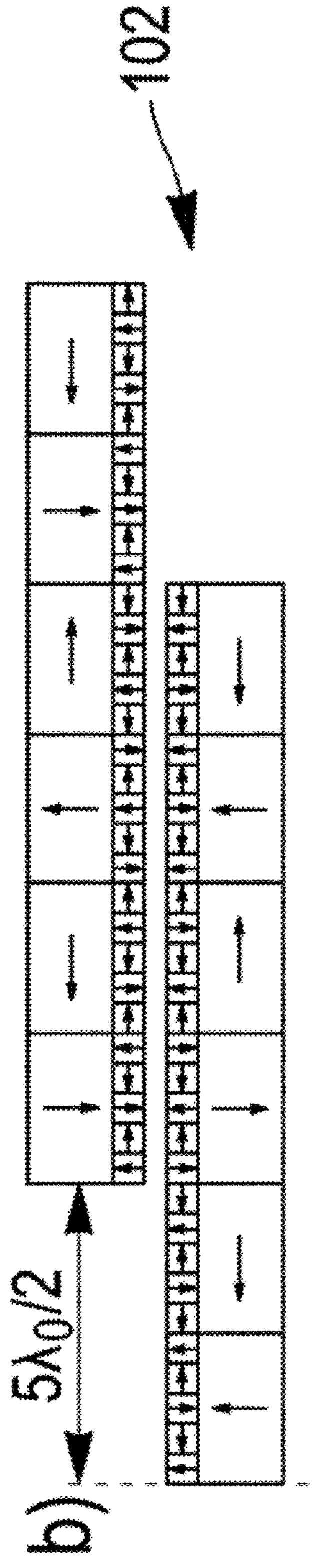
Figure 3C:
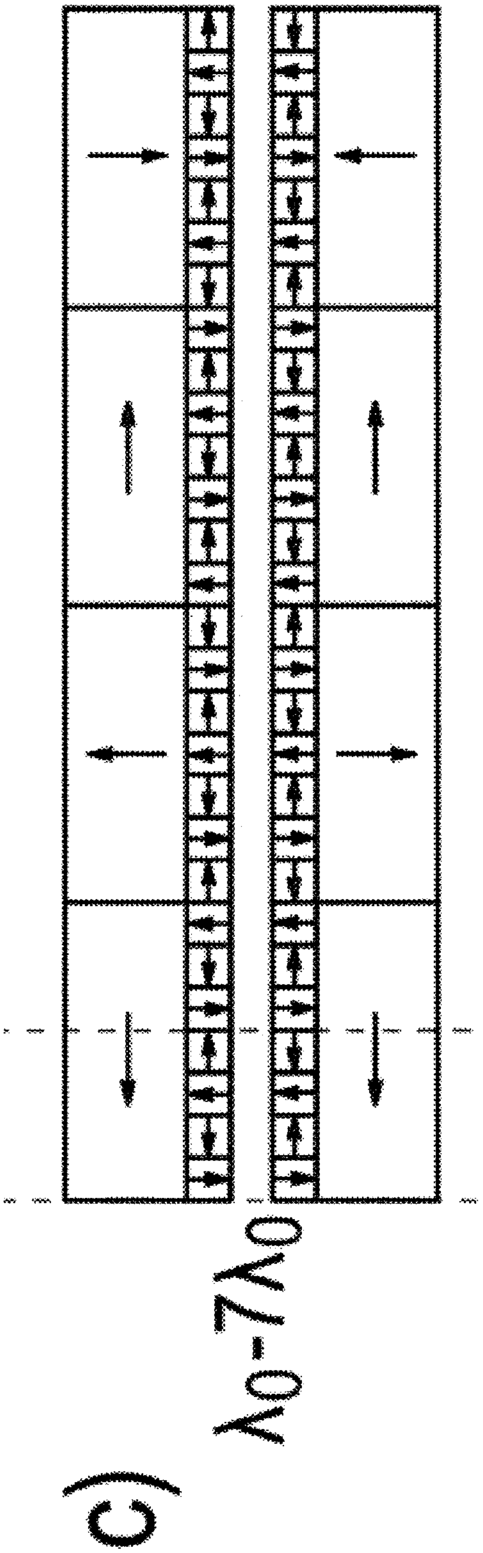
Figure 3D:
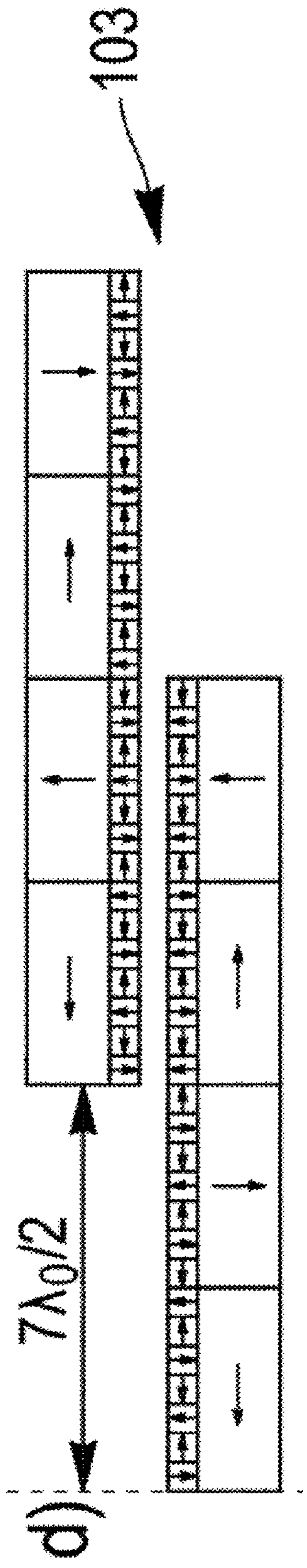
Figure 3E:
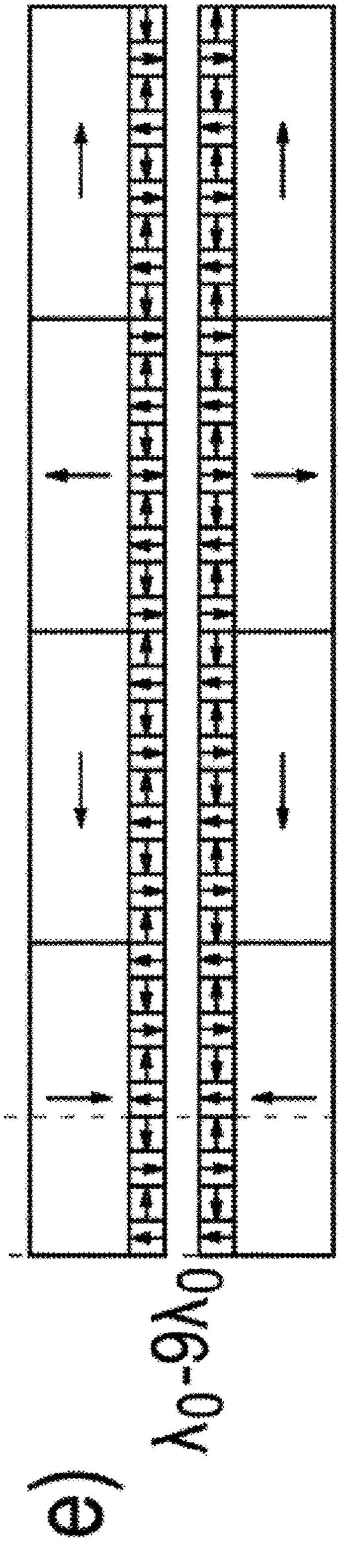
Figure 3F:
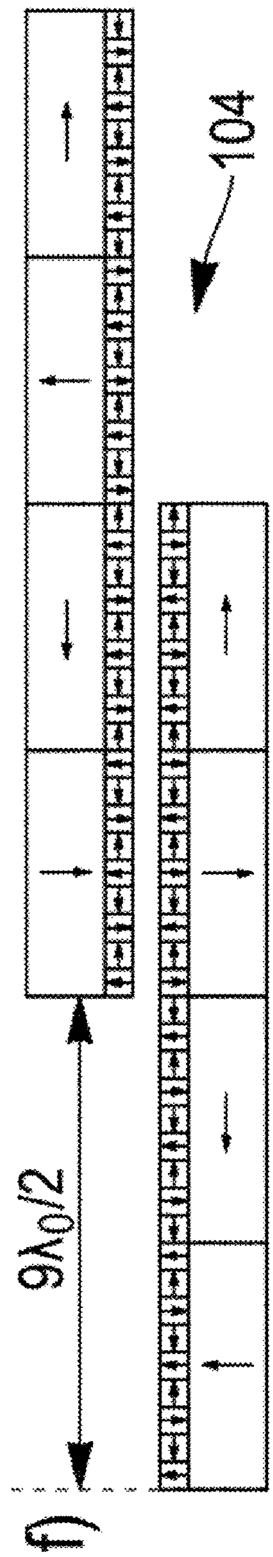

The two-period concept $\lambda_0$-$3\lambda_0$, which makes it possible to pass from the periodicity $\lambda_0$ to the periodicity $3\lambda_0$, can be generalized to $\lambda_0$-$(2n+1)\lambda_0$ where n is an integer (n=0, 1, 2 . . . ). Switchover is possible from the magnetic period $\lambda_0$ to the magnetic period $(2n+1)\lambda_0$ by changing the longitudinal offset from 0 to $(2n+1)\lambda_0/2$. The example is given for the cases:

n=2 (FIGS. 3*a* and 4*a* for the reference position and FIGS. 3*b* and 4*b* for the offset position)

n=3 (FIGS. 3*c* and 4*c* for the reference position and FIGS. 3*d* and 4*d* for the offset position)

n=4 (FIGS. 3*e* and 4*e* for the reference position and FIGS. 3*f* and 4*f* for the offset position)

The mounting and the arrangement of the magnets on the girders 5 and 6 (see designation in FIG. 1) is shown in FIG. 3 for the two periodicities $\lambda_0=-5/\lambda_0$ (n=2), $\lambda_0$ (n=3) and $\lambda_0-9\lambda_0$ (n=4).

For these different offset configurations, the longitudinal distribution of magnetic field is as follows (FIG. 4), considering for the illustration the case where $\lambda_0$=50 mm.

This type of assembly is based on the Halbach structure with 4 magnets per period. The magnetic period is multiplied by an odd number only.

There will now be described, with reference to FIGS. 5 and 6, a fifth 105, sixth 106, and seventh 107 embodiment of an undulator according to the invention, referring only to the differences thereof with respect to the first embodiment 101.

Using the same principle as the embodiment in FIG. 1, it is possible to design a two-period undulator that makes switchover possible from the magnetic period $\lambda_0$ to the magnetic period $2n\lambda_0$ (integer n having a value of 1, 2, 3 . . . ) by offsetting one jaw by $(2n-1)\lambda_0/2$ with respect to the other. However, even if the offset of $(2n-1)\lambda_0/2$ is necessary to cancel out the magnetic field at the periodicity to, the field at the periodicity $2n\lambda_0$ is not at its maximum since the magnetizations of the magnets of the series (1) and (4) are slightly offset.

Figure 5A:
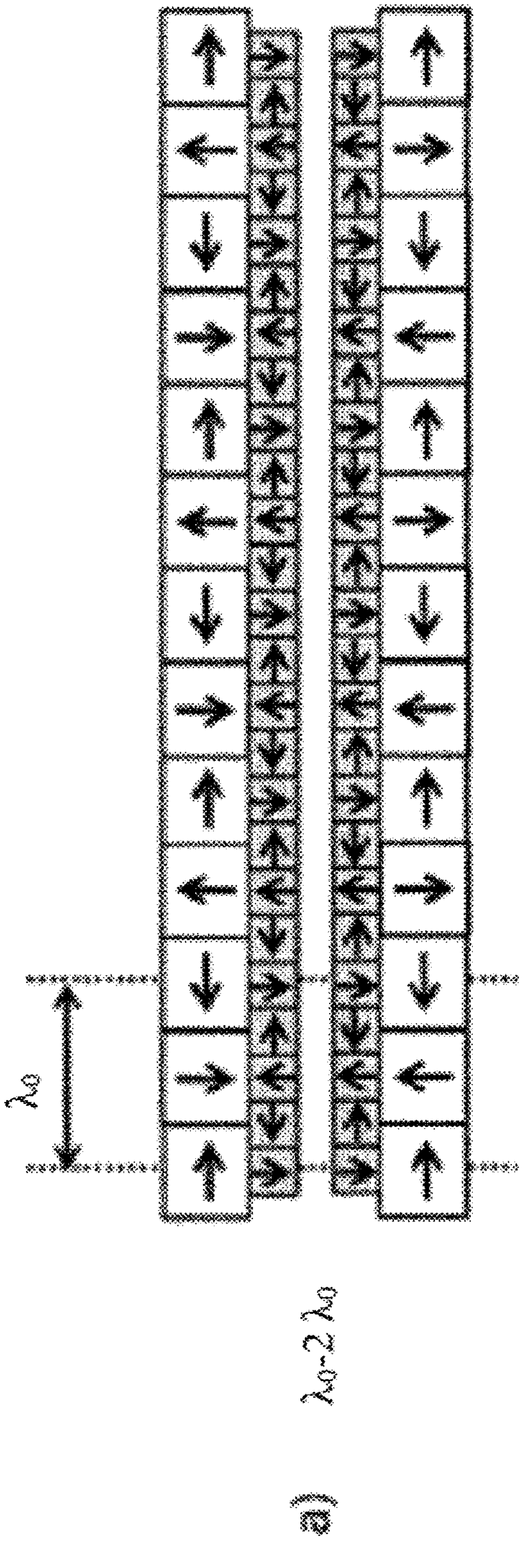
FIG. 5 is a profile cross section view of a fifth 105 (on parts a and b of the figure), sixth 106 (on parts c and d of the figure) and seventh 107 (on parts e and f of the figure) embodiment of an undulator according to the invention, functioning on the left from top to bottom at the periodicity $\lambda_0$ (parts a, c and e of the figure). On the right, from top to bottom, switchover respectively to the periodicity $2\lambda_0$ (part b of the figure), $4\lambda_0$ (part d of the figure) and $6\lambda_0$ (part f of the figure) by offsetting the upper jaw respectively by $\lambda_0/2$ (part b of the figure), $3\lambda_0/2$ (part d of the figure) and $5\lambda_0/2$ (part f of the figure); the arrows indicate the direction of magnetization of the permanent magnets.
Figure 5B:
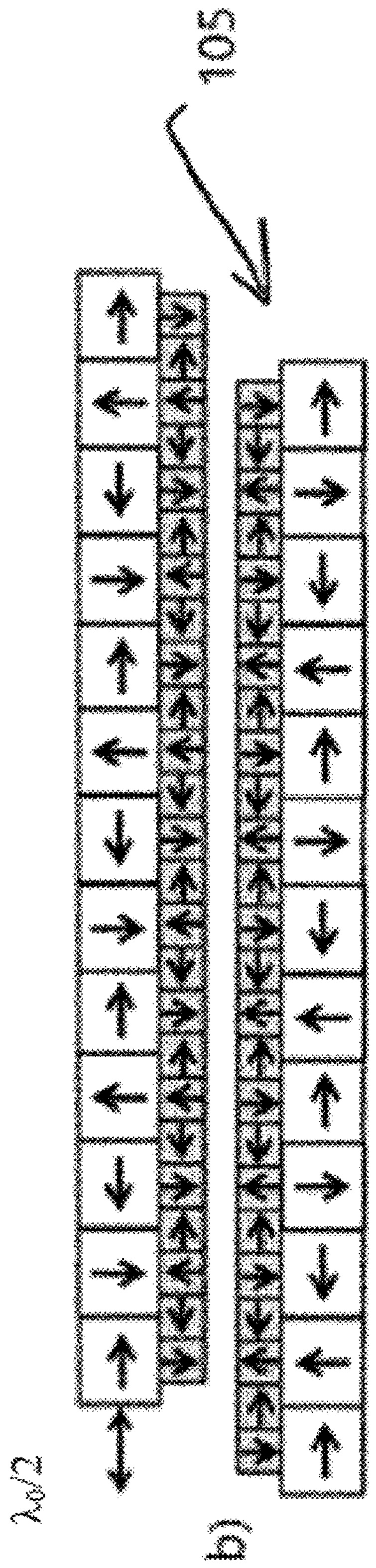
Figure 5C:
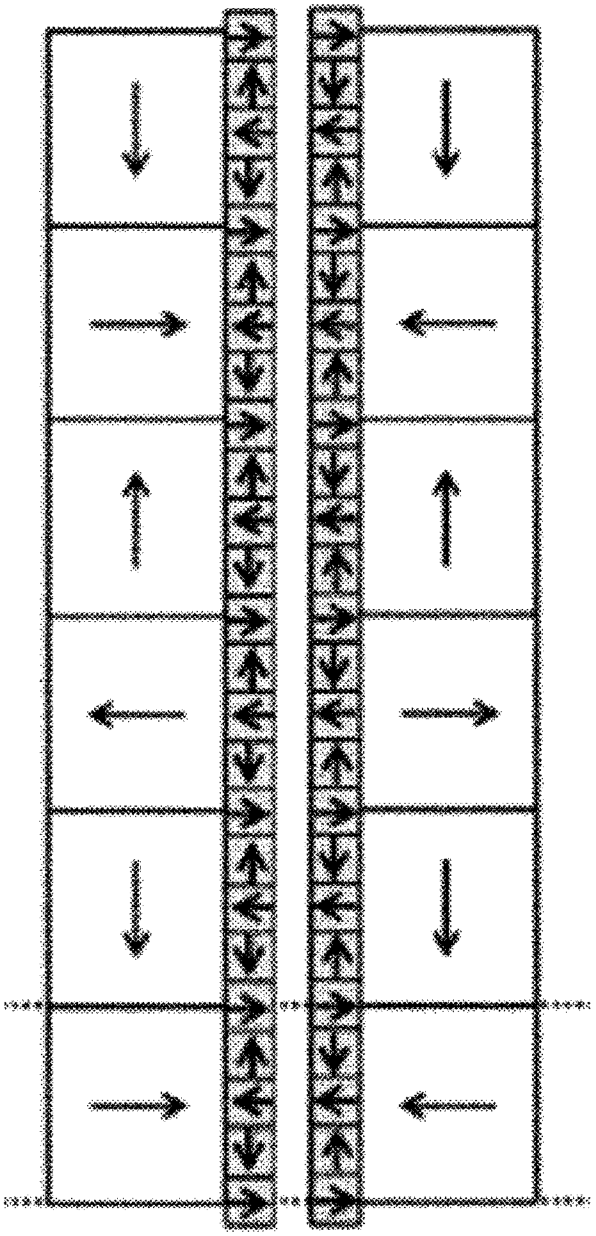
Figure 5D:
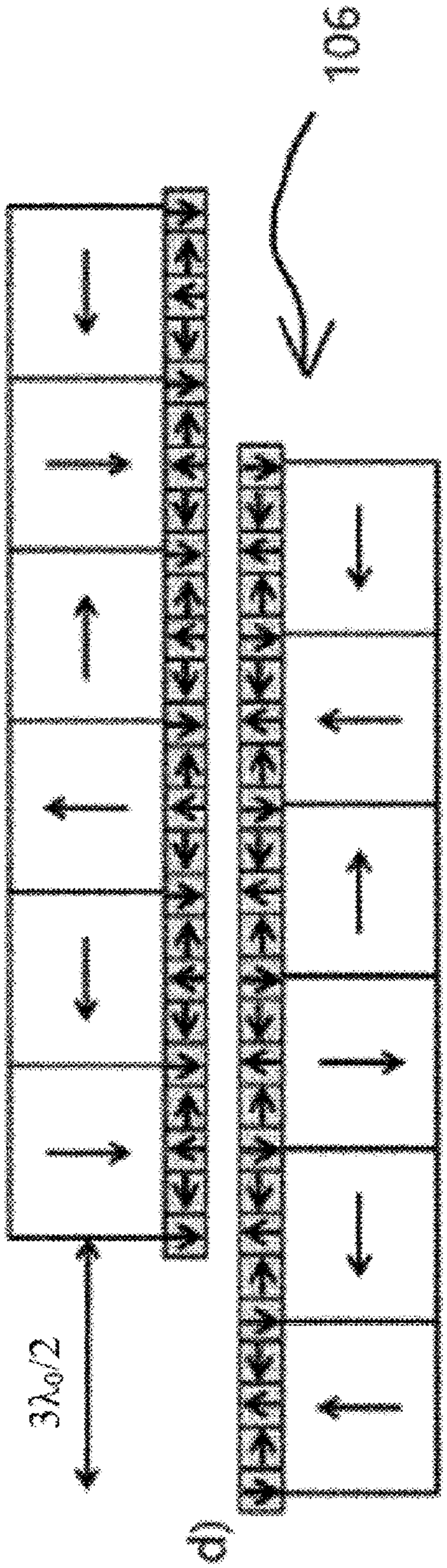
Figure 5E:
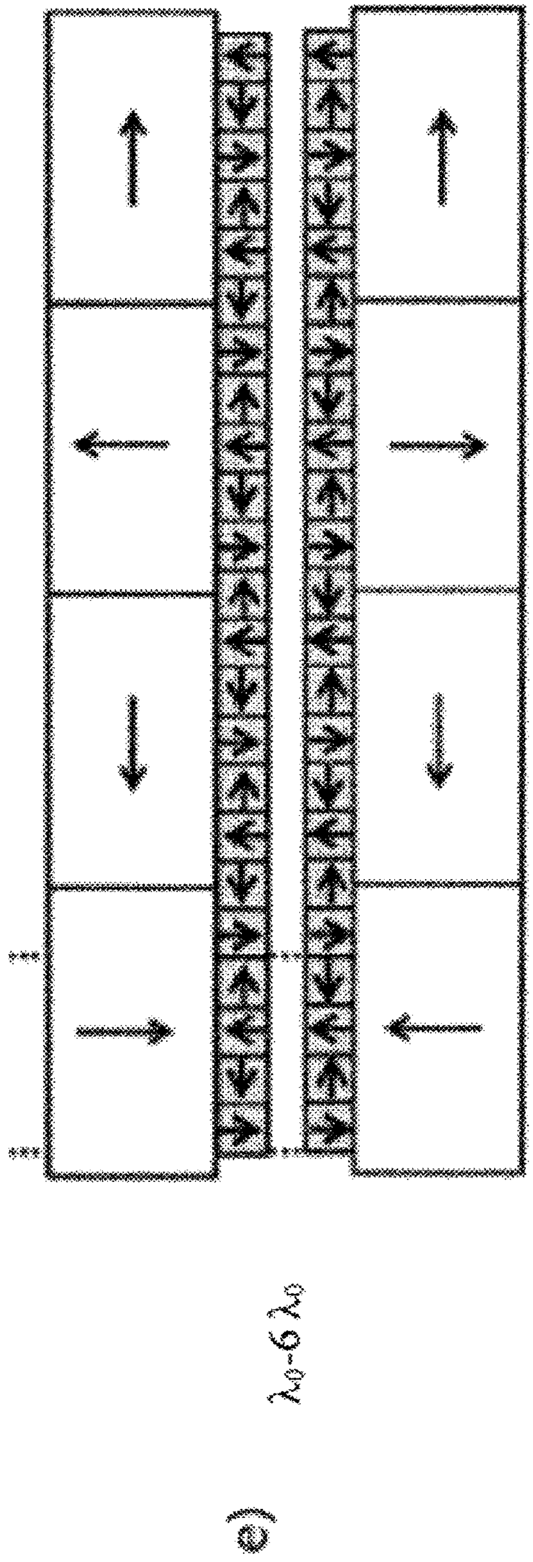
Figure 5F:
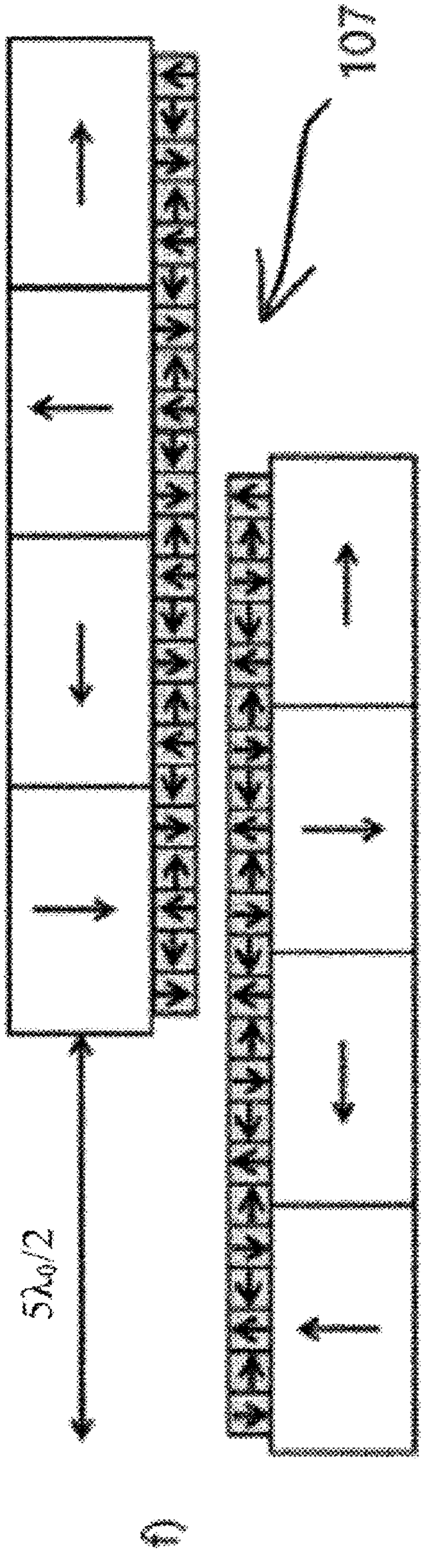

FIGS. 5 and 6 show respectively the arrangement of the jaws and the longitudinal distribution of magnetic field, considering for the illustration the case where $\lambda_0$=50 mm, for:

n=1 (FIGS. 5*a* and 6*a* for the reference position and FIGS. 5*b* and 6*b* for the offset position)

n=2 (FIGS. 5*c* and 6*c* for the reference position and FIGS. 5*d* and 6*d* for the offset position)

n=3 (FIGS. 5*e* and 6*e* for the reference position and FIGS. 5*f* and 6*f* for the offset position)

For each undulator 105, 106, 107, the four series comprise:

the first series (1) of permanent magnets according to a spatial periodicity of $2n\lambda_0$ along the longitudinal axis Y (7), where n is a positive integer, each period of the first series comprising $N_1$ permanent magnets successively along the axis Y, the magnetization of which rotates stepwise by $360/N_1$ degrees in the first direction about an axis X perpendicular to the axes Y and Z the second series (2) of permanent magnets according to a spatial periodicity of to along the longitudinal axis (7), each period of the second series comprising $N_2$ permanent magnets successively along the axis Y, the magnetization of which rotates stepwise by $360/N_2$ degrees in the second direction about the axis X the third series (3) of permanent magnets according to a spatial periodicity of to along the longitudinal axis (7), each period of the third series comprising $N_3$ permanent magnets successively along the axis Y, the magnetization of which rotates stepwise by $360/N_3$ degrees in the third direction about the axis X the fourth series (4) of permanent magnets according to a spatial periodicity respectively of $2\lambda_0$ along the longitudinal axis Y (7), each period of the fourth series comprising $N_4$ permanent magnets successively along the axis Y, the magnetization of which rotates stepwise by $360/N_4$ degrees in the fourth direction about the axis X the first displacement means being arranged to alter along the axis Y, with respect to the reference position along the axis Y, the relative position of the first and second series jointly with respect to the position of the third and fourth series jointly, by a distance of $(2n-1)\lambda_0/2$, such that the undulator is located in its offset position along the axis Y.

In the reference position of the undulator 105, 106 or 107:

along the axis Y, at least one or each position of a magnet with magnetization along the axis Z of the first series is centred on a position of a magnet with magnetization along the axis Z of the second series one time out of two in opposite directions then in the same direction, along the axis Y, at least one or each position of a magnet with magnetization along the axis Z of the fourth series is centred on a position of a magnet with magnetization along the axis Z of the third series respectively one time out of two in opposite directions then in the same direction, along the axis Y, at least one or each position of a magnet with magnetization along the axis Y of the first series is centred on a position of a magnet with magnetization along the axis Z of the second series, along the axis Y, at least one or each position of a magnet with magnetization along the axis Y of the fourth series is centred on a position of a magnet with magnetization along the axis Z of the third series.

There will now be described, with reference to FIGS. 9 to 16, variants of the first embodiment 101, referring only to the differences thereof with respect to FIGS. 1, 2 and 7.

All these variants effectively illustrate the great multiplicity of embodiments that can be envisaged making it possible to obtain the technical effects of the invention.

For example, in the reference position of the undulator 101 in FIG. 9*b:* the magnetizations along the axis Y of the magnets of the second and third series at one and the same position along the axis Y are in the same direction, the magnetizations along the axis Z of the magnets of the second and third series at one and the same position along the axis Y are in opposite directions, the magnetizations along the axis Y of the magnets of the first and fourth series at one and the same position along the axis Y are in opposite directions, the magnetizations along the axis Z of the magnets of the first and fourth series at one and the same position along the axis Y are in the same direction, In the offset position of the undulator 101 in FIG. 9*b:* the magnetizations along the axis Y of the magnets of the second and third series at one and the same position along the axis Y are in opposite directions, the magnetizations along the axis Z of the magnets of the second and third series at one and the same position along the axis Y are in the same direction.

In the offset position of the undulator 101 in FIG. 9*b:* the magnetizations along the axis Y of the magnets of the first and fourth series at one and the same position along the axis Y are in the same direction, the magnetizations along the axis Z of the magnets of the first and fourth series at one and the same position along the axis Y are in opposite directions.

In the reference position of the undulator 101 in FIG. 10*b:* along the axis Y, at least one or each position of a magnet with magnetization along the axis Z of the first series is centred on a position of a magnet with magnetization along the axis Z of the second series in the same direction, and along the axis Y, at least one or each position of a magnet with magnetization along the axis Z of the fourth series is centred on a position of a magnet with magnetization along the axis Z of the third series in opposite directions;

along the axis Y, at least one or each position of a magnet with magnetization along the axis Y of the first series is centred on a position of a magnet with magnetization along the axis Y of the second series in opposite directions, and along the axis Y, at least one or each position of a magnet with magnetization along the axis Y of the fourth series is centred on a position of a magnet with magnetization along the axis Y of the third series in the same direction.

Thus, it is possible to reverse the direction of the vertical and/or horizontal magnetizations, it being possible to reverse the first, second, third and/or fourth direction of rotation, etc.

There will now be described, with reference to FIG. 17, variants of the first embodiment 101, referring only to the differences thereof with respect to FIGS. 1, 2 and 7.

Moreover, for each of the embodiments and variants described above, alterations may be made to $N_1$, $N_2$, $N_3$ and/or $N_4$ Preferably:

$N_1=N_4$ $N_2=N_3$ $N_1$, $N_2$, $N_3$ and $N_4$, which are positive integers and are even numbers.

The variant in FIG. 17 illustrates the case where $N_1=N_2=N_3=N_4=6$

In this variant in FIG. 17, each of the first, second, third and fourth series comprises permanent magnets having at least one magnetization directed strictly along the axis Z.

In this variant in FIG. 17, each of the first, second, third and fourth series does not comprise permanent magnets having at least one magnetization directed strictly along the axis Y.

In this variant in FIG. 17, each of the first, second, third and fourth series comprises permanent magnets having at least one magnetization that is oblique with respect to the axis Y and with respect to the axis Z.

There will now be described, with reference to FIG. 8, a device 1000 comprising several crossed two-period undulators, each undulator corresponding to any one of the embodiments of an undulator described above, these undulators being mounted at different angular positions to one another about the axis Y and centred on one and the same vacuum chamber (8).

For example, as shown in FIG. 8, the device 1000 comprising two undulators mounted at 90° to one another about the axis Y and centred on one and the same vacuum chamber (8), each undulator corresponding to any one of the embodiments of an undulator described above, such that:

the axes Y of the two undulators are merged the axis X of the first undulator corresponds to the axis Z of the second undulator the axis Z of the first undulator corresponds to the axis X of the second undulator.

The trapezoidal shape of the supports 9 and 10 is merely indicative and could be rectangular in order to receive magnets 1, 2, 3 and 4 having greater widths in order to increase the magnetic field.

The trapezoidal geometry nevertheless makes it possible here, by virtue of the flats at 45°, to accommodate two further jaws identical to the jaws 5 and 6 equipped with their supports 9 and 10 and magnets 1, 2, 3 and 4. These supplementary jaws are turned at 90° with respect to the jaws 5 and 6 and can be displaced horizontally. This option makes it possible to produce a supplementary magnetic field in the horizontal plane ($B_H$ in FIG. 8), variable by virtue of the adjustment of the gap between the additional jaws (in the plane of the diagram in FIG. 8).

The addition of a supplementary perpendicular movement in the plane in FIG. 8 gives the possibility of adjusting the offset between the vertical magnetic component and the horizontal component. Such a magnetic system, forming an undulator with variable polarization, as well as making it possible to choose between two magnetic periodicities, has the advantage of producing photons with any type of polarization.

The invention also relates to an installation such as a particle accelerator comprising:

an undulator according to any one of the embodiments or variants such as described above and/or a device 1000 as described above.

The method according to the invention implemented by an undulator according to any one of the embodiments or variants such as described above and/or by a device 1000 as described above and/or by an installation such as described above comprises:

a displacement of all or part of the series 1, 2, 3 and 4, by the first displacement means, so as to alter along the axis Y, with respect to the reference position along the axis Y, the relative position of the first and second series jointly with respect to the position of the third and fourth series jointly, by a distance respectively of $(2n+1)\lambda_0/2$ in the case of FIGS. 1, 3 and 9 to 17 (or $(2n-1)\lambda_0/2$ in the case of FIG. 5) such that the undulator is located in the offset position along the axis Y, and/or a displacement of all or part of the series 1, 2, 3 and 4, by the second displacement means, altering, along the axis Z, the relative position of the first and second series jointly with respect to the position of the third and fourth series jointly, this displacement displaces along the axis Z, the first and second series of magnets on one side, and the third and fourth series of magnets on another side, symmetrically with respect to the chamber, such that the chamber still remains centred between the first and second series of magnets on one side, and the third and fourth series of magnets on another side.

Of course, the invention is not limited to the examples that have just been described, and numerous amendments can be made to these examples without departing from the framework of the invention, provided that it remains within the scope of the claims.

Of course, the different characteristics, forms, variants and embodiments of the invention can be combined with one another in various combinations.

CITED DOCUMENTS

[1] ID Workshop Proceeding (2017)—San Francisco.
[2] Shenoy, G. K., et al., J. Synchrotron Radiat., 2003, vol. 10, no. 3, p. 205.
[3] N. A. Vinokurov, O. A. Shevchenko and V. G. Tcheskidov, PRSTAB, 040701 (2011).
[4] P. Vagin et al., Synchrotron Radiation News, Vol. 31, 2018, Issue 3.

The invention claimed is:

1. A two-period undulator, comprising:

a vacuum chamber extending along a longitudinal axis Y;

four series of permanent magnets installed at regular intervals along the axis Y, including a first, second, third and fourth series, these four series and the vacuum chamber being superposed, along an axis Z of the undulator perpendicular to the longitudinal axis Y, in the following successive order: first series, second series, vacuum chamber, third series, fourth series, these four series comprising:

the first series of permanent magnets according to a spatial periodicity respectively of $(2n+1)\lambda_0$ or $2n\lambda_0$ along the longitudinal axis Y, where n is a positive integer, and where $\lambda_0$ is the spatial periodicity of the second series along the longitudinal axis, each period of the first series comprising $N_1$ permanent magnets successively along the axis Y, the magnetization of which rotates stepwise by $360/N_1$ degrees in a first direction about an axis X of the undulator perpendicular to the axes Y and Z;

the second series of permanent magnets according to a spatial periodicity of $\lambda_0$ along the longitudinal axis, each period of the second series comprising $N_2$ permanent magnets successively along the axis Y, the magnetization of which rotates stepwise by $360/N_2$ degrees in a second direction about the axis X;

the third series of permanent magnets according to a spatial periodicity of $\lambda_0$ along the longitudinal axis, each period of the third series comprising $N_3$ permanent magnets successively along the axis Y, the magnetization of which rotates stepwise by $360/N_3$ degrees in a third direction, preferably opposite to the second direction, about the axis X; and the fourth series of permanent magnets according to a spatial periodicity respectively of $(2n+1)\lambda_0$ or $2n\lambda_0$ along the longitudinal axis Y, each period of the fourth series comprising $N_4$ permanent magnets successively along the axis Y, the magnetization of which rotates stepwise by $360/N_4$ degrees in a fourth direction, preferably opposite to the first direction, about the axis X, the undulator also comprising first displacement means arranged to alter along the axis Y, with respect to a reference position along the axis Y, the relative position of the first and second series jointly with respect to the position of the third and fourth series jointly, by a distance respectively of $(2n+1)\lambda_0/2$ or $(2n-1)\lambda_0/2$, such that the undulator is located in an offset position along the axis Y.

2. The undulator according to claim 1, characterized in that each of the first, second, third and fourth series comprises permanent magnets having at least one magnetization directed strictly along the axis Z.

3. The undulator according to claim 2, characterized in that it comprises, between the reference position and the offset position:

a position for which the magnetizations along the axis Z of the magnets of the second and third series at one and the same position along the axis Y are in the same direction, and the magnetizations along the axis Z of the magnets of the first and fourth series at one and the same position along the axis Y are in opposite directions; and another position for which the magnetizations along the axis Z of the magnets of the second and third series at one and the same position along the axis Y are in opposite directions, and the magnetizations along the axis Z of the magnets of the first and fourth series at one and the same position along the axis Y are in the same direction.

4. The undulator according to claim 1, characterized in that n=1, 2 or 3.

5. The undulator according to claim 4, characterized in that n=1.

6. The undulator according to claim 1, characterized in that, in the reference position of the undulator:

along the axis Y, at least one or each position of a magnet of the first series corresponds to a position of a magnet of the fourth series, and/or along the axis Y, at least one or each position of a magnet with magnetization along the axis Z of the first series corresponds to a position of a magnet with magnetization along the axis Z of the fourth series, and/or along the axis Y, at least one or each position of a magnet with magnetization along the axis Y of the first series corresponds to a position of a magnet with magnetization along the axis Y of the fourth series, and/or along the axis Y, at least one or each position of a magnet of the second series corresponds to a position of a magnet of the third series, and/or along the axis Y, at least one or each position of a magnet with magnetization along the axis Z of the second series corresponds to a position of a magnet with magnetization along the axis Z of the third series, and/or along the axis Y, at least one or each position of a magnet with magnetization along the axis Y of the second series corresponds to a position of a magnet with magnetization along the axis Y of the third series.

7. The undulator according to claim 1, characterized in that, in the reference position of the undulator:

the magnetizations along the axis Y of the magnets of the second and third series at one and the same position along the axis Y are in opposite directions, and/or the magnetizations along the axis Z of the magnets of the second and third series at one and the same position along the axis Y are in the same direction, and/or the magnetizations along the axis Y of the magnets of the first and fourth series at one and the same position along the axis Y are in the same direction, and/or the magnetizations along the axis Z of the magnets of the first and fourth series at one and the same position along the axis Y are in opposite directions, or the magnetizations along the axis Y of the magnets of the second and third series at one and the same position along the axis Y are in the same direction, and/or the magnetizations along the axis Z of the magnets of the second and third series at one and the same position along the axis Y are in opposite directions, and/or the magnetizations along the axis Y of the magnets of the first and fourth series at one and the same position along the axis Y are in opposite directions, and/or the magnetizations along the axis Z of the magnets of the first and fourth series at one and the same position along the axis Y are in the same direction.

8. The undulator according to claim 1, characterized in that, in the offset position of the undulator:

along the axis Y, at least one or each position of a magnet with magnetization along the axis Z of the second series corresponds to a position of a magnet with magnetization along the axis Z of the third series, and/or along the axis Y, at least one or each position of a magnet with magnetization along the axis Y of the second series corresponds to a position of a magnet with magnetization along the axis Y of the third series.

9. The undulator according to claim 1, characterized in that, in the offset position of the undulator:

the magnetizations along the axis Y of the magnets of the second and third series at one and the same position along the axis Y are in the same direction, and/or the magnetizations along the axis Z of the magnets of the second and third series at one and the same position along the axis Y are in opposite directions, or the magnetizations along the axis Y of the magnets of the second and third series at one and the same position along the axis Y are in opposite directions, and/or the magnetizations along the axis Z of the magnets of the second and third series at one and the same position along the axis Y are in the same direction.

10. The undulator according to claim 1, characterized in that the four series comprise:

the first series of permanent magnets according to a spatial periodicity of $(2n+1)\lambda_0$ along the longitudinal axis Y, where n is a positive integer, each period of the first series comprising $N_1$ permanent magnets successively along the axis Y, the magnetization of which rotates stepwise by $360/N_1$ degrees in the first direction about an axis X perpendicular to the axes Y and Z;

the second series of permanent magnets according to a spatial periodicity of $\lambda_0$ along the longitudinal axis, each period of the second series comprising $N_2$ permanent magnets successively along the axis Y, the magnetization of which rotates stepwise by $360/N_2$ degrees in the second direction about the axis X;

the third series of permanent magnets according to a spatial periodicity of $\lambda_0$ along the longitudinal axis, each period of the third series comprising $N_3$ permanent magnets successively along the axis Y, the magnetization of which rotates stepwise by $360/N_3$ degrees in the third direction about the axis X; and the fourth series of permanent magnets according to a spatial periodicity respectively of $(2n+1)\lambda_0$ along the longitudinal axis Y, each period of the fourth series comprising $N_4$ permanent magnets successively along the axis Y, the magnetization of which rotates stepwise by $360/N_4$ degrees in the fourth direction about the axis X, the first displacement means being arranged to alter along the axis Y, with respect to the reference position along the axis Y, the relative position of the first and second series jointly with respect to the position of the third and fourth series jointly, by a distance of $(2n+1)\lambda_0/2$, such that the undulator is located in its offset position along the axis Y.

11. The undulator according to claim 10, characterized in that, in the reference position of the undulator:

along the axis Y, at least one or each position of a magnet with magnetization along the axis Z of the first series is centred on a position of a magnet with magnetization along the axis Z of the second series respectively in opposite directions or in the same direction, and along the axis Y, at least one or each position of a magnet with magnetization along the axis Z of the fourth series is centred on a position of a magnet with magnetization along the axis Z of the third series respectively in the same direction or in opposite directions; and/or along the axis Y, at least one or each position of a magnet with magnetization along the axis Y of the first series is centred on a position of a magnet with magnetization along the axis Y of the second series respectively in the same direction or in opposite directions, and along the axis Y, at least one or each position of a magnet with magnetization along the axis Y of the fourth series is centred on a position of a magnet with magnetization along the axis Y of the third series respectively in opposite directions or in the same direction.

12. The undulator according to claim 10, characterized in that, in the offset position of the undulator:

along the axis Y, at least one or each position of a magnet with magnetization along the axis Z of the first series corresponds to a position of a magnet with magnetization along the axis Z of the fourth series, and/or along the axis Y, at least one or each position of a magnet with magnetization along the axis Y of the first series corresponds to a position of a magnet with magnetization along the axis Y of the fourth series.

13. The undulator according to claim 10, characterized in that, in the offset position of the undulator:

the magnetizations along the axis Y of the magnets of the first and fourth series at one and the same position along the axis Y are in opposite directions, and/or the magnetizations along the axis Z of the magnets of the first and fourth series at one and the same position along the axis Y are in the same direction, or the magnetizations along the axis Y of the magnets of the first and fourth series at one and the same position along the axis Y are in the same direction, and/or the magnetizations along the axis Z of the magnets of the first and fourth series at one and the same position along the axis Y are in opposite directions.

14. The undulator according to claim 1, characterized in that the four series comprise:

the first series of permanent magnets according to a spatial periodicity of $2n\lambda_0$ along the longitudinal axis Y, where n is a positive integer, each period of the first series comprising $N_1$ permanent magnets successively along the axis Y, the magnetization of which rotates stepwise by $360/N_1$ degrees in the first direction about an axis X perpendicular to the axes Y and Z;

the second series of permanent magnets according to a spatial periodicity of $\lambda_0$ along the longitudinal axis, each period of the second series comprising $N_2$ permanent magnets successively along the axis Y, the magnetization of which rotates stepwise by $360/N_2$ degrees in the second direction about the axis X;

the third series of permanent magnets according to a spatial periodicity of $\lambda_0$ along the longitudinal axis, each period of the third series comprising $N_3$ permanent magnets successively along the axis Y, the magnetization of which rotates stepwise by $360/N_3$ degrees in a third direction about the axis X; and the fourth series of permanent magnets according to a spatial periodicity respectively of $2n\lambda_0$ along the longitudinal axis Y, each period of the fourth series comprising $N_4$ permanent magnets successively along the axis Y, the magnetization of which rotates stepwise by $360/N_4$ degrees in a fourth direction about the axis X, the first displacement means being arranged to alter along the axis Y, with respect to the reference position along the axis Y, the relative position of the first and second series jointly with respect to the position of the third and fourth series jointly, by a distance of $(2n-1)\lambda_0/2$, such that the undulator is located in its offset position along the axis Y.

15. The undulator according to claim 14, characterized in that, in the reference position of the undulator:

along the axis Y, at least one or each position of a magnet with magnetization along the axis Z of the first series is centred on a position of a magnet with magnetization along the axis Z of the second series one time out of two in opposite directions then in the same direction, and along the axis Y, at least one or each position of a magnet with magnetization along the axis Z of the fourth series is centred on a position of a magnet with magnetization along the axis Z of the third series one time out of two in opposite directions then in the same direction; and/or along the axis Y, at least one or each position of a magnet with magnetization along the axis Y of the first series is centred on a position of a magnet with magnetization along the axis Z of the second series, and along the axis Y, at least one or each position of a magnet with magnetization along the axis Y of the fourth series is centred on a position of a magnet with magnetization along the axis Z of the third series.

16. The undulator according to claim 1, characterized in that it also comprises second displacement means arranged to alter, along the axis Z, the relative position of the first and second series jointly with respect to the position of the third and fourth series jointly.

17. The undulator according to claim 1, characterized in that the vacuum chamber is delimited at least partially by walls situated between the second and third series, and/or at least partially by walls of the second and third series.

18. The undulator according to claim 1, characterized in that:

$N_1=N_4$, and/or
$N_2=N_3$, and/or
$N_1=N_2=N_3=N_4$, and/or
$N_1=4$, and/or
$N_2=4$, and/or
$N_3=4$, and/or
$N_4=4$.

19. A device comprising several undulators according to claim 1, mounted at different angular positions to one another about the axis Y and centred on one and the same vacuum chamber.

20. The device according to claim 19, comprising two of said undulators mounted at 90° to one another about the axis Y and centred on one and the same vacuum chamber, such that:

the axes Y of the two undulators are merged;

the axis X of the first undulator corresponds to the axis Z of the second undulator; and the axis Z of the first undulator corresponds to the axis X of the second undulator.

21. An installation such as a particle accelerator comprising an undulator according to claim 1.

22. A method implemented by means of a two-period undulator, said undulator comprising:

a vacuum chamber extending along a longitudinal axis Y; and four series of permanent magnets installed at regular intervals along the axis Y, including a first, second, third and fourth series, these four series and the vacuum chamber being superposed, along an axis Z of the undulator perpendicular to the longitudinal axis Y, in the following successive order: first series, second series, vacuum chamber, third series, fourth series, these four series comprising:

the first series of permanent magnets according to a spatial periodicity respectively of $(2n+1)\lambda_0$ or $2n\lambda_0$ along the longitudinal axis Y, where n is a positive integer, each period of the first series comprising $N_1$ permanent magnets successively along the axis Y, the magnetization of which rotates stepwise by $360/N_1$ degrees in a first direction about an axis X of the undulator perpendicular to the axes Y and Z;

the second series of permanent magnets according to a spatial periodicity of $\lambda_0$ along the longitudinal axis, each period of the second series comprising $N_2$ permanent magnets successively along the axis Y, the magnetization of which rotates stepwise by $360/N_2$ degrees in a second direction about the axis X;

the third series of permanent magnets according to a spatial periodicity of $\lambda_0$ along the longitudinal axis, each period of the third series comprising $N_3$ permanent magnets successively along the axis Y, the magnetization of which rotates stepwise by $360/N_3$ degrees in a third direction, preferably opposite to the second direction, about the axis X; and the fourth series of permanent magnets according to a spatial periodicity respectively of $(2n+1)\lambda_0$ or $2n\lambda_0$ along the longitudinal axis Y, each period of the fourth series comprising $N_4$ permanent magnets successively along the axis Y, the magnetization of which rotates stepwise by $360/N_4$ degrees in a fourth direction, preferably opposite to the first direction, about the axis X, a displacement of all or part of the series, by first displacement means, so as to alter along the axis Y, with respect to a reference position along the axis Y, the relative position of the first and second series jointly with respect to the position of the third and fourth series jointly, by a distance respectively of $(2n+1)\lambda_0/2$ or $(2n-1)\lambda_0/2$, such that the undulator is located in an offset position along the axis Y.

* * * * *